United States Patent
Itoyama et al.

(10) Patent No.: US 6,729,303 B2
(45) Date of Patent: May 4, 2004

(54) DIESEL ENGINE CONTROL

(75) Inventors: Hiroyuki Itoyama, Yokohama (JP); Kensuke Osamura, Yokosuka (JP); Nobusuke Toukura, Yokosuka (JP); Hiroshi Iwano, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/980,638

(22) PCT Filed: May 15, 2001

(86) PCT No.: PCT/JP01/04050
§ 371 (c)(1), (2), (4) Date: Dec. 5, 2001

(87) PCT Pub. No.: WO01/88360
PCT Pub. Date: Nov. 22, 2001

(65) Prior Publication Data
US 2002/0173898 A1 Nov. 21, 2002

(30) Foreign Application Priority Data
May 18, 2000 (JP) ......................................... 2000-146236

(51) Int. Cl.⁷ ................................................. F02D 9/00
(52) U.S. Cl. .................. 123/478; 123/568.21; 701/108; 701/104
(58) Field of Search ................................ 123/698, 478, 123/568.21; 701/104, 108

(56) References Cited

U.S. PATENT DOCUMENTS

| | | | | |
|---|---|---|---|---|
| 5,172,550 A | * | 12/1992 | Takeshima | .................. 123/698 |
| 6,073,073 A | * | 6/2000 | Kitamura et al. | ........... 701/104 |
| 6,230,697 B1 | * | 5/2001 | Itoyama et al. | ........ 123/568.21 |

FOREIGN PATENT DOCUMENTS

| | | |
|---|---|---|
| EP | 0 962 638 | 12/1999 |
| EP | 0 965 740 | 12/1999 |
| JP | 8-86251 | 4/1996 |
| JP | 9-303179 | 11/1997 |
| JP | 10-288043 | 10/1998 |
| JP | 10-288071 | 10/1998 |

* cited by examiner

*Primary Examiner*—Erick Solis
(74) *Attorney, Agent, or Firm*—Foley & Lardner

(57) ABSTRACT

A control unit (41) controls an opening of an exhaust recirculation valve (6) according to a running condition of a diesel engine (1). The control unit (41) calculates an equivalence ratio of the gas mixture supplied to the engine (1) and a target intake fresh air amount taking account of the air amount in the exhaust gas recirculated by the exhaust gas circulation valve (6), based on the opening of the valve (6) and a target excess air factor of the engine (1) set according to the running condition. By controlling a turbocharger (50) according to the target intake fresh air amount, and by controlling the fuel supply mechanism according to a fuel injection amount calculated from the equivalence ratio, the excess air factor of the engine (1) and an exhaust gas recirculation rate of the exhaust gas recirculation valve (6) are respectively controlled to optimum values.

11 Claims, 52 Drawing Sheets

36 WATER TEMPERATURE SENSOR
61 DIAPHRAGM ACTUATOR

DIESEL ENGINE CONTROL

FIELD OF THE INVENTION

This invention relates to a diesel engine for vehicles that is provided with a mechanism for regulating a flowrate in an intake passage and an exhaust gas recirculation device.

BACKGROUND OF THE INVENTION

Tokkai Hei 10-288043 published by the Japanese Patent Office in 1998 discloses a diesel engine for vehicles wherein the generation amount of smoke and particulates, and the generation amount of nitrogen oxides —(NOx), are suppressed by maintaining a ratio of an excess air factor and exhaust gas recirculation (EGR) rate of the engine at a constant value.

SUMMARY OF THE INVENTION

In a diesel engine provided with a trap for NOx in the exhaust passage, to reduce the NOx accumulated in the trap, it is necessary to reduce the excess air factor to less than one without changing the EGR rate, and supply hydrocarbons (HC) to the exhaust passage as a reducing agent. However, in this control device, it is impossible to vary one of the excess air factor and the EGR rate while keeping the other constant.

Further, the ratio of the excess air factor and EGR rate required to suppress the generation amount of smoke and particulates and the generation amount of nitrogen oxides (NOx), is not necessarily always constant.

It is therefore an object of this invention to make it possible to control the excess air factor and EGR rate independently as required.

It is a further object of this invention to precisely control the excess air factor.

In order to achieve the above objects, this invention provides a control device for such an engine that comprises an intake passage which aspirates fresh air, an adjusting mechanism which varies an aspirating amount of fresh air of the intake passage, an exhaust passage which discharges an exhaust gas of the engine, an exhaust gas recirculation valve which recirculates part of the exhaust gas into the intake passage and a fuel supply mechanism which supplies a fuel to the engine.

The engine burns the fuel with a mixture of fresh air aspirated by the intake passage and exhaust gas recirculated by the exhaust gas recirculation valve.

The control device comprises a sensor which detects a running condition of the engine, a sensor which detects the aspirating amount of the fresh air of the intake passage and a microprocessor. The microprocessor is programmed to determine a target exhaust gas recirculation value of the exhaust gas recirculation valve according to the running condition, control the exhaust gas recirculation valve based on the target exhaust gas recirculation value, calculate a first target value according to the running condition, calculate a second target value based on the first target value and the target exhaust gas recirculation value, control the adjusting mechanism based on the second target value, and control the fuel supply mechanism based on the second target value.

The first target value represents a relation between an amount of air and an amount of the fuel supplied to the engine while the second target value represents a relation between an amount of the fresh air aspirated by the intake passage and the amount of the fuel supplied to the engine, This invention also provides a control device for the engine, comprising a mechanism for detecting a running condition of the engine, a mechanism for detecting the aspirating amount of the fresh air of the intake passage, a mechanism for determining a target exhaust gas recirculation value of the exhaust gas recirculation valve according to the running condition, a mechanism for controlling the exhaust gas recirculation valve based on the target exhaust gas recirculation value, a mechanism for calculating a first target value according to the running condition, a mechanism for calculating a second target value based on the first target value and the target exhaust gas recirculation value, and the amount of the fuel supplied to the engine, a mechanism for controlling the adjusting mechanism based on the second target value; and a mechanism for controlling the fuel supply mechanism based on the second target value.

The first target value represents a relation between an amount of air and an amount of the fuel supplied to the engine while the second target value represents a relation between an amount of the fresh air aspirated by the intake passage and the amount of the fuel supplied to the engine, This invention also provides a control method for the engine, comprising detecting a running condition of the engine, detecting the aspirating amount of the fresh air of the intake passage, determining a target exhaust gas recirculation value of the exhaust gas recirculation valve according to the running condition, controlling the exhaust gas recirculation valve based on the target exhaust gas recirculation value, calculating a first target value according to the running condition, calculating a second target value based on the first target value and the target exhaust gas recirculation value, controlling the adjusting mechanism based on the second target value, and controlling the fuel supply mechanism based on the second target value.

The first target value represents a relation between an amount of air and an amount of the fuel supplied to the engine while the second target value represents, a relation between an amount of the fresh air aspirated by the intake passage and the amount of the fuel supplied to the engine, The details as well as other features and advantages of this invention are set forth in the remainder of the specification and are shown in the accompanying drawings.

DESCRIPTION OF THE PREFERRED EMBODIMENTS

Figure 1:
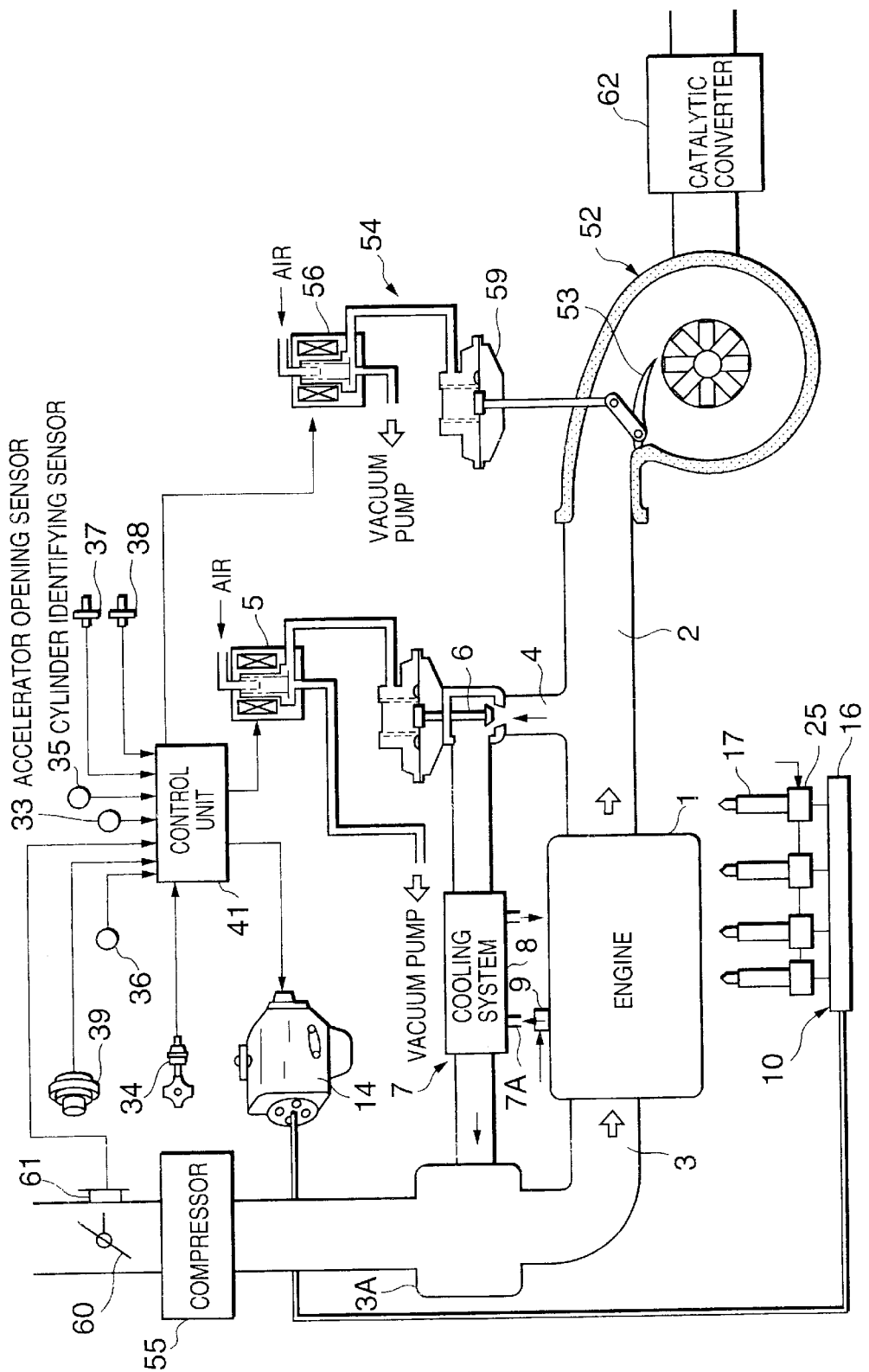
FIG. 1 is a schematic diagram of a control device for a diesel engine according to this invention.

Referring to FIG. 1 of the drawings, a diesel engine 1 comprises an intake passage 3 and exhaust passage 2. The diesel engine 1 is a multi cylinder diesel engine so constructed that the pattern of heat release is single stage combustion due to performing low temperature pre-mixture combustion. Such a diesel engine is disclosed by Tokkai Hei 8-86251 published by the Japanese Patent Office in 1999. Intake air of the intake air passage 3 is supplied to each cylinder of the diesel engine 1 via a collector 3A.

A compressor 55 of a turbocharger 50 and a intake throttle 60 driven by a throttle actuator 61 are installed In the intake passage 3 upstream of the collector 3A.

A swirl control valve is provided in an intake port leading from the intake passage 3 to each cylinder. When the diesel engine 1 is running at low rotation speed on low load, the swirl control valve closes part of the passage and sets up a swirl in the flow of air flowing into the combustion chamber of the diesel engine 1.

The combustion chamber comprises a large diameter toroidal combustion chamber. This is a combustion chamber wherein a cylindrical cavity of the same diameter is formed on a piston from a cap surface to a base. A conical part is formed at the base of the cavity. As a result, resistance to the swirl flowing in from the outside of the cavity is reduced, and mixing of air and fuel is promoted. Also, due to the shape of the cavity, the swirl diffuses from the center of the cavity to the outside as the piston descends.

The diesel engine 1 comprises a common rail type fuel injection mechanism 10.

Figure 2:
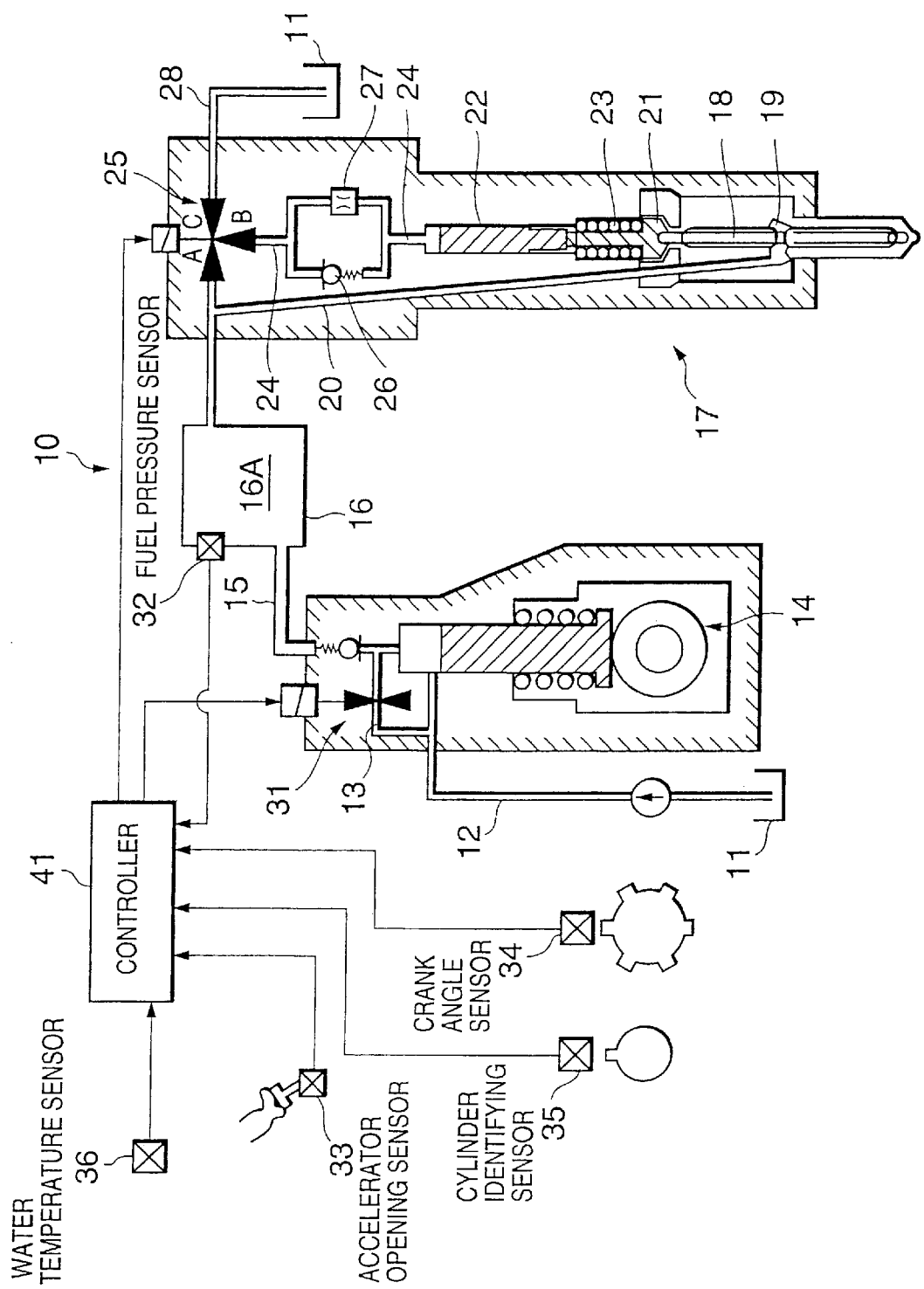
FIG. 2 is a schematic diagram of a common rail fuel injection mechanism with which the diesel engine is provided.

Referring to FIG. 2, a fuel injection mechanism 10 comprises a fuel tank 11, fuel supply passage 12, supply pump 14, pressure accumulating chamber 16A formed in a common rail 16, and a nozzle 17 which is provided ad for every cylinder. After the fuel supplied from the supply pump 14 is stored in a pressure accumulator 16A via a high pressure fuel passage 15, it is distributed to each of the nozzles 17.

The nozzle 17 comprises a needle valve 18, nozzle chamber 19, fuel passage 20 to the nozzle chamber 19, retainer 21, hydraulic piston 22, return spring 23, fuel passage 24 which leads high pressure fuel to the hydraulic piston 22, and three-way solenoid valve 25 interposed in the fuel passage 24. A check valve 26 and an orifice 27 are also provided in parallel in the fuel passage 24. The return spring 23 pushes the needle valve 18 in the closing direction of the lower part of the figure via the retainer 21. The hydraulic piston 22 comes in contact with the upper edge of the retainer 21.

The three-way valve 25 comprises a port A connected to the pressure accumulating chamber 16A, port B connected to the fuel passage 24 and port C connected to a drain 28. When the three-way valve 25 is OFF, ports A and B are connected and ports B and C are shut off. As a result, the fuel passages 20 and 24 are connected, and high pressure fuel is led to both the upper part of the hydraulic piston 22 and the nozzle chamber 19 from the pressure accumulating chamber 16A. As the pressure-receiving surface area of the hydraulic piston 22 is larger than the pressure-receiving surface area of the needle valve 18, in this state, the needle valve 18 sits in the valve seat, and the nozzle 17 is thereby closed.

In the state where the three-way valve 25 is ON, the ports A and B are shut off, and the ports B and C are connected.

Consequently, the fuel pressure of the fuel passage 24 which pushes the hydraulic piston 22 downward is released to the fuel tank 11 via the drain 28, the needle valve 18 lifts due to the fuel pressure of the nozzle chamber 19 which acts on the needle valve 18 in an upward direction, and the fuel of the nozzle chamber 19 is injected from the hole at the end of the nozzle 17. If the three-way valve 25 is returned to the OFF state, the fuel pressure of the pressure accumulating chamber 16A again acts downward on the hydraulic piston 22, the needle valve 18 sits in the valve seat, and fuel injection is terminated.

That is, fuel injection start timing is adjusted by the change-over timing from OFF to ON of the three-way valve 25, and fuel injection amount is adjusted by the duration of the ON state. Therefore, if the pressure of the pressure accumulating chamber 16A is the same, the fuel injection amount increases the longer the ON time of the three-way valve 25.

Further, to adjust the pressure of the pressure accumulating chamber 16A, the fuel injection mechanism 10 comprises a return passage 13 which returns the surplus fuel discharged by the supply pump 14 to the fuel supply passage 12. The return passage 13 is provided with a pressure regulating valve 31. The pressure regulating valve 31 opens and closes the return passage 13, and adjusts the pressure of the pressure accumulating chamber 16A by varying the fuel injection amount to the pressure accumulating chamber 16A.

The fuel pressure of the pressure accumulating chamber 16A is equal to the fuel injection pressure of the nozzle 17, and the fuel injection rate is higher the higher the fuel pressure of the pressure accumulating chamber 16. The three-way valve 25 and the pressure regulating valve 31 function according to the input signal from a control unit 41.

The above construction of the fuel injection mechanism 10 is disclosed and known from pp. 73–77, Lecture Papers of the 13th Symposium on the Internal Combustion Engine.

Now, referring again to FIG. 1, after the exhaust gas in the exhaust passage 2 drives an exhaust gas turbine 52 of the turbocharger 50, it is discharged into the atmosphere via a catalytic converter 62. The catalytic converter 62 traps nitrogen oxides (NOx) when the diesel engine 1 operates under a lean air-fuel ratio, and reduces the trapped NOx by hydrocarbon (HC) contained in the exhaust gas when the diesel engine 1 operates under a rich air-fuel ratio.

The turbocharger 50 comprises the exhaust gas turbine 52 and the compressor 55 which turbocharges the intake fresh air in the intake passage 3 according to the rotation of the exhaust gas turbine 52. The compressor 55 is provided in the middle of the intake passage 3, and the intake passage 3 supplies air compressed by the compressor 55 to the diesel engine 1. A variable nozzle 53 driven by a pressure actuator 54 is provided at an inlet to the exhaust gas turbine 52.

The pressure actuator 54 comprises a diaphragm actuator 59 which drives the variable nozzle 53 according to a signal pressure, and a pressure control valve 56 which generates the signal pressure according to a signal input from the control unit 41.

The control unit 41 controls the variable nozzle 53 to reduce the nozzle opening when the rotation speed of the diesel engine 1 is low. As a result, the flow velocity of exhaust gas introduced to the exhaust gas turbine 52 is increased so that a predetermined supercharging pressure is attained. On the other hand, the control unit 41 controls the variable nozzle 53 to fully open, when the rotation speed of the diesel engine 1 is high, in order to introduce exhaust gas into the exhaust gas turbine 52 without resistance.

When the air-fuel mixture is burnt in the diesel engine 1, noxious NOx are formed. The NOx amount largely depends on the combustion temperature, and the generation amount of NOx can be suppressed by making the combustion temperature low. This diesel engine 1 reduces the oxygen concentration in the combustion chamber by exhaust recirculation (EGR), and thereby realizes low-temperature combustion. For this purpose, the diesel engine 1 comprises an exhaust gas recirculation (EGR) passage 4 which connects the exhaust passage 2 upstream of the exhaust gas turbine 52 and a collector 3A of the intake passage 3. The EGR passage 4 is provided with a diaphragm type exhaust gas recirculation (EGR) valve 6 which responds to a control negative pressure provided from a negative pressure control valve 5 and a cooling system 7.

The negative pressure control valve 5 generates a negative pressure in response to a duty signal input from the controller 41, and thereby varies the rate of exhaust gas recirculation (EGR rate) via the EGR valve 6.

For example, in the low rotation speed, low load range of the diesel engine 1, the EGR rate is a maximum 100 percent, and as the rotation speed and load of the diesel engine 1 increase, the EGR rate is decreased. On high load, since the exhaust gas temperature is high, intake air temperature will rise if a large amount of EGR is performed. If the intake air temperature rises, NOx will no longer decrease, the ignition delay of injected fuel becomes shorter, and it becomes impossible to achieve pre-mixture combustion. Therefore, the EGR rate is made to decrease in stages as the rotation speed and load of the diesel engine 1 increase.

The cooling system 7 leads part of the engine cooling water to a water jacket 8 surrounding the EGR passage 4, and cools the recirculated exhaust gas in the EGR passage 4. A cooling water inlet 7A of the water jacket 8 is provided with a flow control valve 9 which adjusts the recirculating amount of cooling water according to a signal from the control unit 41.

A pressure regulating valve 31, the three-way valve 25, the negative pressure control valve 5, the pressure actuator 54 and the flow control valve 9 are respectively controlled by signals from the control unit 41. The control unit 41 comprises a microcomputer equipped with a central processing unit (CPU), random access memory (RAM), read-only memory (ROM) and input/output interface (I/O interface).

Signals corresponding to detection values are input to the control unit 41 from a pressure sensor 32 which detects a fuel pressure of the pressure accumulating chamber 16A, an accelerator opening sensor 33 which detects an opening Cl of a vehicle accelerator pedal, a crank angle sensor 34 which detects a rotation speed Ne and crank angle of the diesel engine 1, a cylinder identifying sensor 35 which identifies cylinders of the diesel engine 1, a water temperature sensor 36 which detects a cooling water temperature Tw of the diesel engine 1, an intake air temperature sensor 37 which detects an intake air temperature Ta, an atmospheric pressure sensor 38 which detects an atmospheric pressure Pa and an air flow meter 39 which detects an intake air flowrate of the intake passage 3 upstream of the compressor 55. The intake air temperature sensor 37, atmospheric pressure sensor 38 and air flow meter 39 are installed in the intake passage 3 upstream of the intake throttle 60.

Based on the rotation speed of the diesel engine 1 and accelerator opening, the control unit 41 calculates a target fuel injection amount of the nozzle 17 and target pressure of the pressure accumulating chamber 16A. The fuel pressure of the pressure accumulating chamber 16A is feedback controlled by opening and closing the pressure regulating valve 31 so that the actual pressure of the pressure accumulating chamber 16A detected by the pressure sensor 32 coincides with the target pressure.

The control unit 41 also controls an ON time of the three-way valve 25 according to the calculated target fuel injection amount, and a fuel injection start timing in response to the running conditions of the diesel engine 1 by the change-over timing to ON of the three-way valve 25. For example, when the diesel engine 1 is in a low rotation speed, low load state under a high EGR rate, the fuel injection start timing is delayed near top dead center (TDC) of the piston so that the ignition delay of injected fuel is long. Due to this delay, the combustion chamber temperature at the time of ignition is lowered, and the generation of smoke due to the high EGR rate is suppressed by increasing the pre-mixture combustion ratio. On the other hand, the injection start timing is advanced as the rotation speed and load of the diesel engine 1 increase. This is due to the following reason. Specifically, even if the ignition delay period is constant, the ignition delay crank angle obtained by converting the ignition delay period increases in proportion to the increase in engine speed. Therefore, in order to fire the injected fuel at a predetermined crank angle, the injection start timing needs to be advanced at high rotation speed.

The control unit 41 also controls the excess air factor and EGR rate of a diesel engine 1.

The control unit 41 controls the EGR valve 6 based on a target EGR rate Megr determined from the running conditions of the diesel engine 1. Likewise, a target excess air factor Tlamb, which is a first target value, is determined from the running conditions of the diesel engine 1. A target intake fresh air amount tQac and a target equivalence ratio Tfbya which is a second target value, are determined from the target excess air factor Tlamb and real EGR rate Megrd corresponding to an EGR rate at an intake valve position of the engine 1. The opening of the variable nozzle 53 of the turbocharger 50 is determined according to a target intake fresh air amount tQac. On the other hand, a final target fuel injection amount Qfin is determined from the equivalence ratio Tfbya and a cylinder intake fresh air amount Qac.

The excess air factor and the EGR rate are set independently to preferred values corresponding to the running conditions of the diesel engine 1, and a turbocharging pressure and fuel injection amount are controlled so that the set excess air factor and EGR rate are achieved.

The equivalence ratio is defined by stoichiometric air-fuel ratio (=14.7)/air-refuel ratio of air-fuel mixture. The excess air factor is defined by the air-fuel ratio of the air-fuel mixture/stoichiometric air-fuel ratio. The air-fuel ratio of the air-fuel mixture is the ratio of air and fuel supplied to the diesel engine 1. Under a lean air-fuel ratio, the equivalence ratio is less than 1, and the excess air factor is larger than 1. Under a rich air-fuel ratio, the equivalence ratio is larger than 1, and the excess air factor is less than 1. Here, the air-fuel ratio is the ratio of air to fuel, and in a diesel engine which performs exhaust gas recirculation under a large excess air factor, there is a considerable amount of fresh air in recirculated exhaust gas. Therefore the control unit 41, to precisely control the equivalence ratio and excess air factor, controls the fuel injection amount of a fuel injection device 10 and the fresh air supplied via the turbocharger 50 taking account of the air amount contained in the recirculated exhaust gas.4

Next, the control of the EGR valve 6 performed by the control unit 41 will be described. FIG. 3, FIG. 4 and FIGS. 8–14 are known from Tokkai Hei 10-288071 published by the Japanese Patent Office in 1998.

The routine for calculating common parameters used for control of turbocharging pressure and the EGR amount will first be described. The common parameters are a target fuel injection amount Qsol of a fuel injection device 10, a target EGR rate Megr of the EGR valve 6, a time constant equivalent value Kkin, a real EGR rate Megrd, the cylinder intake fresh air amount Qac, intake fresh air flowrate Qas0 of the intake passage, a real EGR amount Qec and a target intake fresh air amount tQac.

The time constant equivalent value Kkin is a value representing an EGR control delay due to a collector 3A interposed between the EGR valve 6 and the intake valve of the diesel engine 1. The real EGR rate Megrd shows the EGR rate of the intake air which passes through the intake valve of the diesel engine 1. The real EGR rate Megrd varies with a first order delay relative to the target EGR rate Megr. The calculation of these parameters is performed independently of the turbocharging pressure control routine, and the EGR amount control routine.

Figure 3:
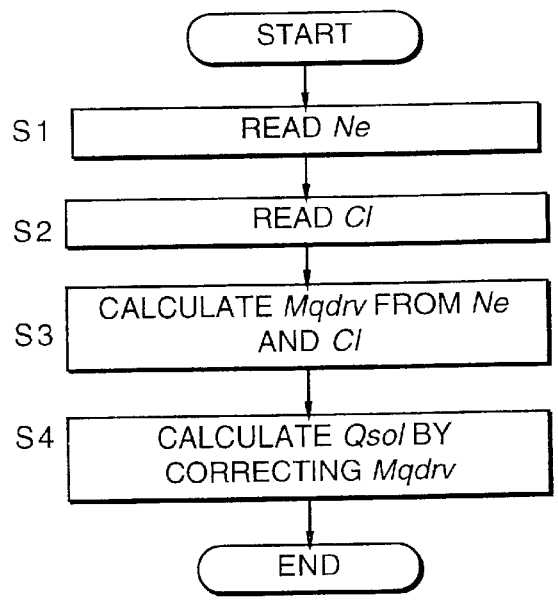
FIG. 3 is a flowchart describing a routine for calculating a target fuel injection amount Qsol performed by a controller according to this invention.

First, referring to FIG. 3, the routine for calculating the target fuel injection amount Qsol will be described. This routine is performed in synchronism with a REF signal output by the crank angle sensor 34 for each reference position of the combustion cycle of each cylinder. In the case of a four-stroke cycle engine, the REF signal is output every 180 degrees for a four cylinder engine, and every 120 degrees for a six cylinder engine.

First, in a step S1, the engine speed Ne is read, and in a step S2, the accelerator opening Cl is read.

Figure 4:
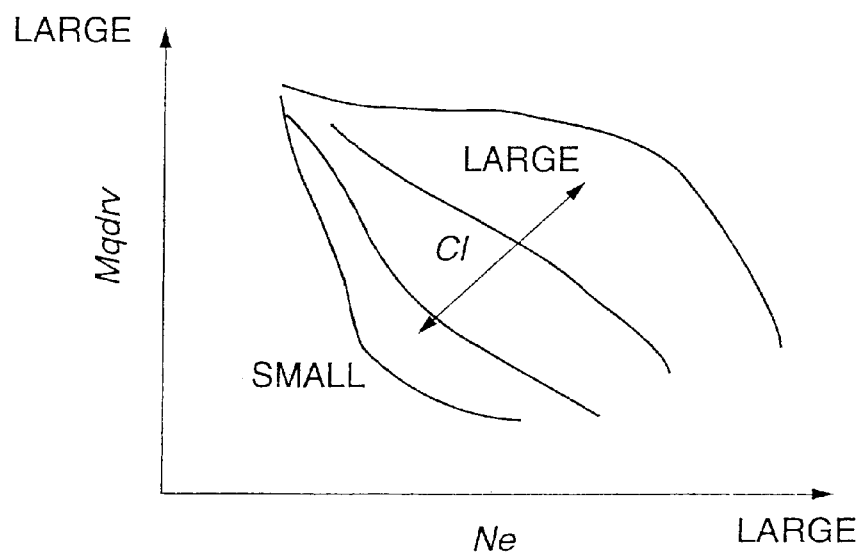
FIG. 4 is a diagram describing the contents of a basic fuel injection amount map stored by the controller.

In a step S3, a basic fuel injection amount Mqdrv is calculated by looking up a map shown in FIG. 4 based on the engine rotation speed Ne and the accelerator opening Cl. This map is stored beforehand in the memory of the control unit 41.

In a step S4, the target fuel injection amount Qsol is calculated by adding an increase correction based on an engine cooling water temperature Tw, etc., to the basic fuel injection amount Mqdrv.

It should be noted however that the above routine does not consider the residual air amount in the EGR gas. So, according to this invention, the actual fuel injection amount by the fuel injection device 10 is not necessarily equal to the target fuel injection amount Qsol calculated in the above routine, but to a final target fuel injection amount Qfin described later.

Figure 11:
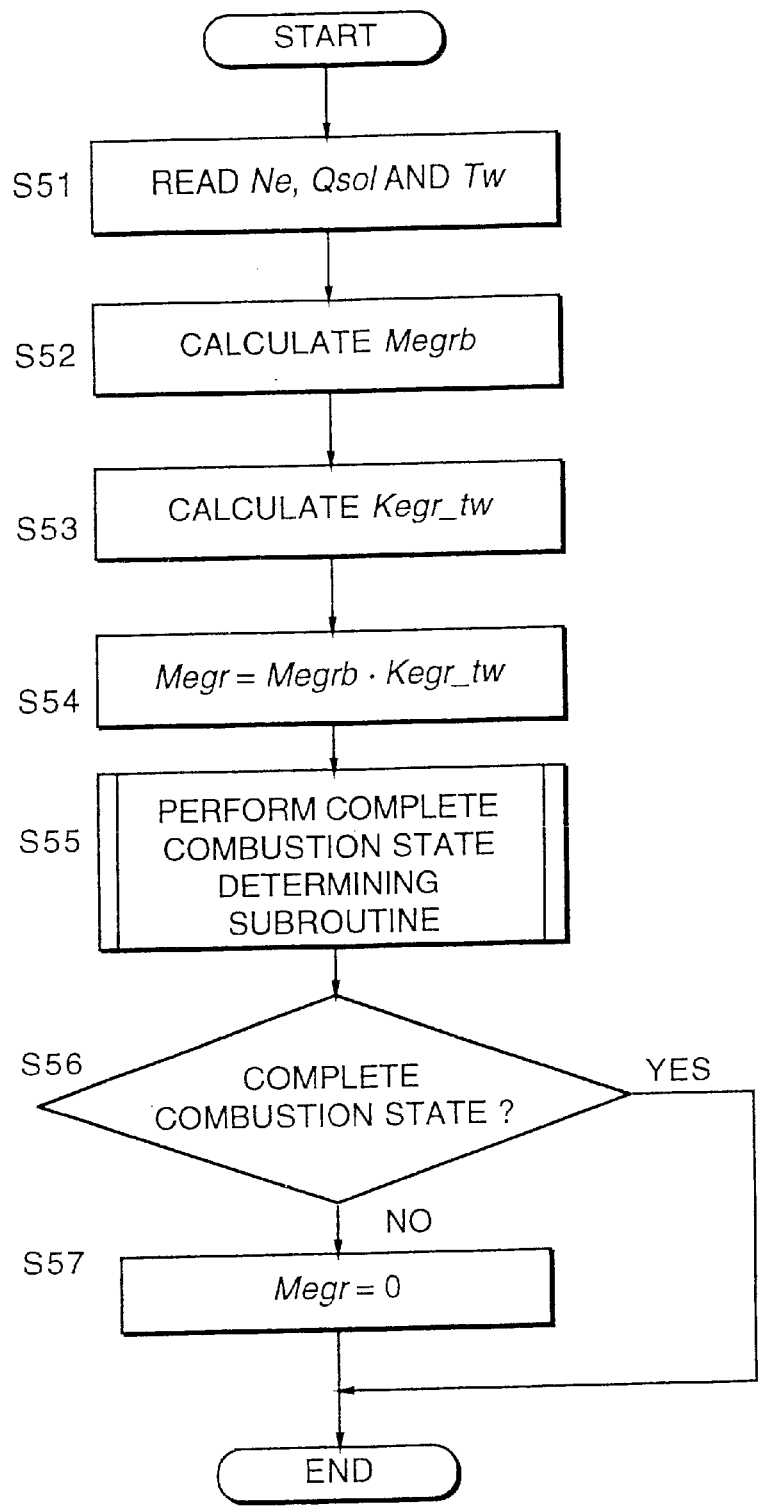
FIG. 11 is a flowchart describing a routine for calculating a target EGR rate Megr performed by the controller.

Next, referring to FIG. 11, a routine for calculating the target EGR rate Megr will be described. This routine is also performed in synchronism with the REF signal.

The control unit 41 first reads the engine rotation speed Ne, the target fuel injection amount Qsol and the engine cooling water temperature Tw in a step S51.

Figure 12:
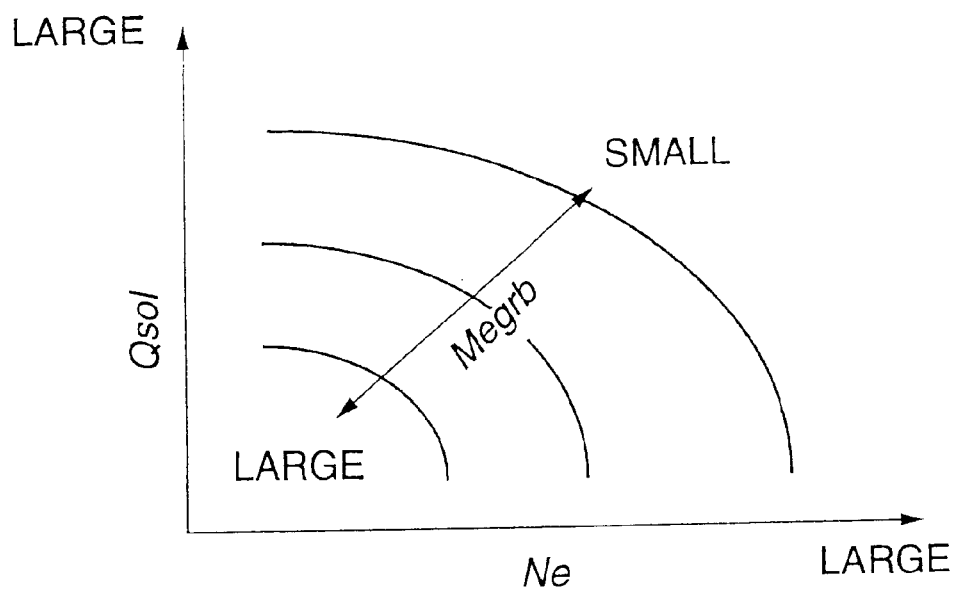
FIG. 12 is a diagram describing the contents of a map of a basic target EGR rate Megrb stored by the controller.

In a step S52, referring to a map shown in FIG. 12, the basic target EGR rate Megrb is calculated from the engine rotation speed Ne and the target fuel injection amount Qsol. This map is stored beforehand in the memory of the control unit 41. In this map, the basic target EGR rate Megrb is set larger in a region where the operating frequency of the engine is higher. This region corresponds to a region where both the rotation speed Ne and the load are small. In this map, the load is represented by the target fuel injection amount Qsol. When the engine output is high, smoke tends to be generated, so in such a region, the basic target EGR rate Megrb is set to have small values.

Figure 13:
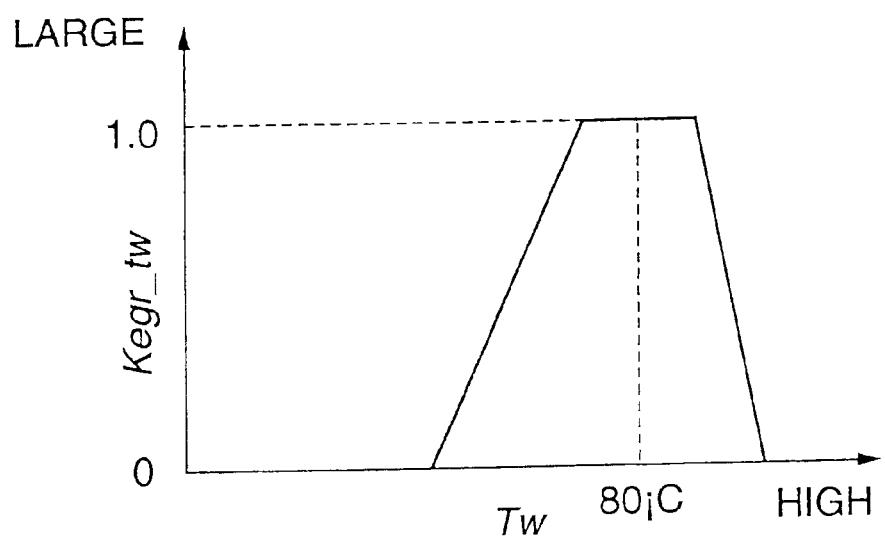
FIG. 13 is a diagram describing the contents of a map of a water temperature correction coefficient Kegr_tw stored by the controller.

In a step S53, referring to a map shown in FIG. 13, a water temperature correction coefficient Kegr_Tw of the basic target EGR rate Megrb is calculated from the cooling water temperature Tw. This map is also stored beforehand in the memory of the control unit 41.

In a step S54, the target EGR rate Megr is calculated by the following equation (1) from the basic target EGR rate Megrb and water temperature correction coefficient Kegr_Tw.

$$Megr = Megrb \cdot Kegr\_tw \tag{1}$$

Figure 14:
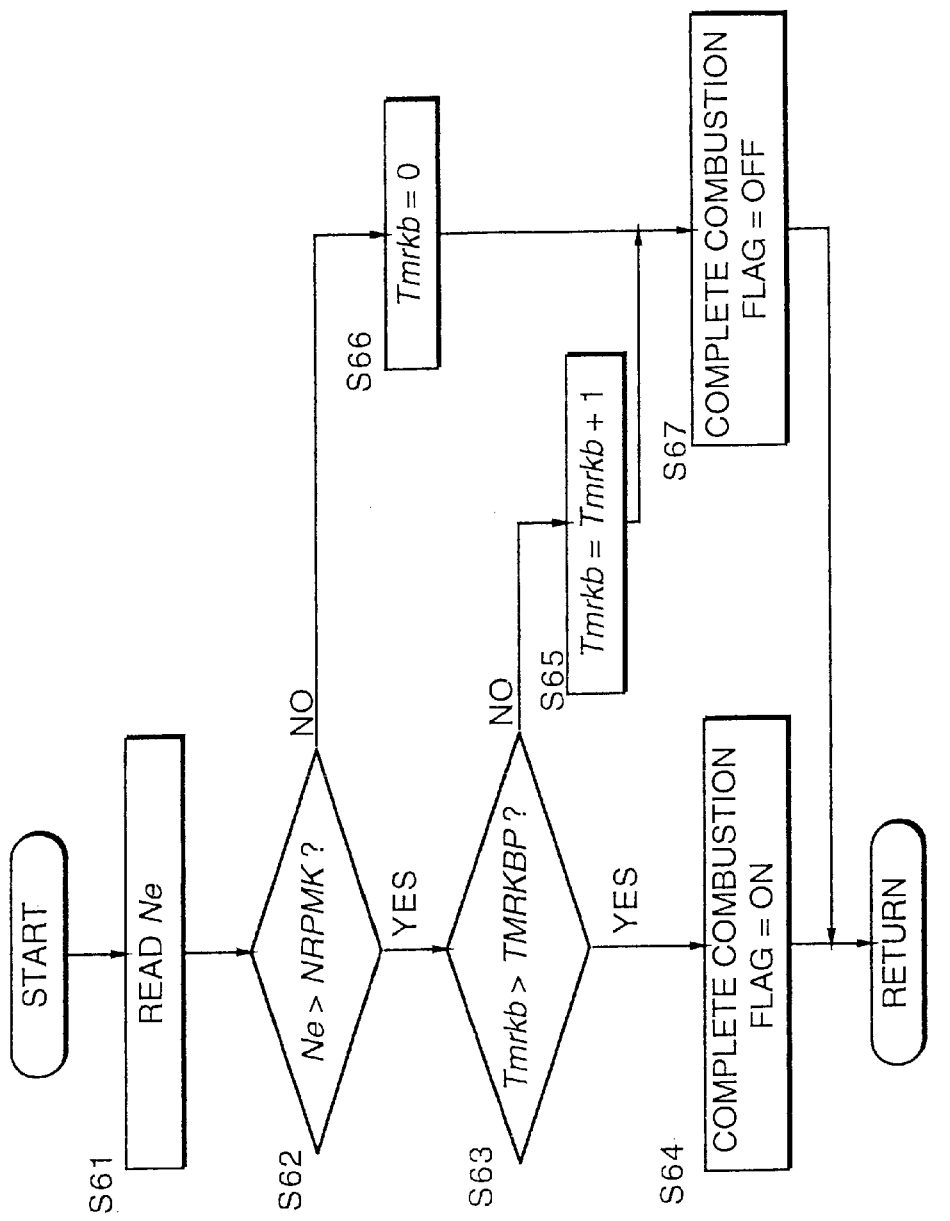
FIG. 14 is a flowchart describing a complete combustion determining routine performed by the controller.

In a step S55, a subroutine shown in FIG. 14 which determines whether or not the diesel engine 1 is in a complete combustion state, is performed.

Describing this subroutine, firstly in a step S61, the engine rotation speed Ne is read, and in a step S62, the engine rotation speed Ne and a complete combustion determining slice level NRPMK corresponding to a complete combustion rotation speed are compared.

The slice level NRPMK is set, for example, to 400 rpm. When the engine rotation speed Ne exceeds the slice level NRPMK, the routine proceeds to a step S63.

Here, a counter value Tmrkb is compared with a predetermined time TMRKBP, and when the counter value Tmrkb is larger than the predetermined time TMRKBP, a complete combustion flag is turned ON in a step S64, and the subroutine is terminated.

When the engine rotation speed Ne is below the slice level NRPMK in the step S62, the subroutine proceeds to a step S66. Here, the counter value Tmrkb is cleared to 0, the complete combustion flag is turned OFF in a next step S67, and the subroutine is terminated.

When the counter value Tmrkb is below the predetermined time TMRKBP in the step S63, the counter value Tmrkb is incremented in a step S65 and the subroutine is terminated.

In this subroutine, even if the engine rotation speed Ne exceeds the slice level NRPMK, the complete combustion flag does not turn ON immediately, and the complete combustion flag only changes to ON after this state has continued for the predetermined time TMRKBP.

Referring again to FIG. 11, after performing the subroutine of FIG. 14, the control unit 41 determines the complete combustion flag in a step S56. When the complete combustion flag is ON, the routine of FIG. 11 is terminated. When the complete combustion flag is OFF, the target EGR rate Megr is reset to 0 in a step S57, and the routine of FIG. 11 is terminated.

Next, referring to FIGS. 17 and 18, a routine for calculating the time constant equivalent value Kkin and the real EGR rate Megrd will now be described. The real EGR rate Megrd varies with a first order delay relative to the target EGR rate Megr. As the calculations of the time constant equivalent value Kkin and the real EGR rate Megrd are inter-related, they will be described together.

Figure 18:
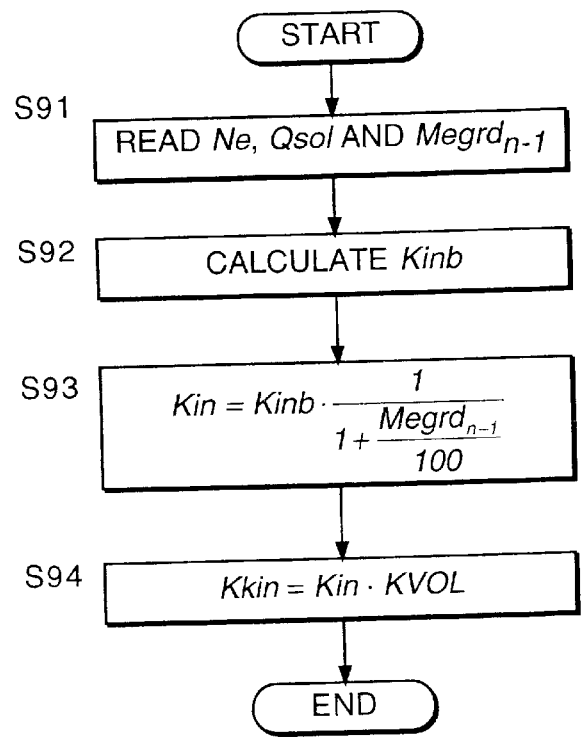
FIG. 18 is a flowchart describing a routine for calculating a time constant equivalent value Kkin performed by the control unit.

FIG. 18 shows a routine for calculating the time constant equivalent value Kkin. This routine is performed in synchronism with the REF signal.

The control unit 41 reads the engine rotation speed Ne, the target fuel injection amount Qsol and the immediately preceding value $Megrd_{n-1}$ (%) of the real EGR rate in a step S91. The immediately preceding value $Megrd_{n-1}$ is a value of Megrd calculated on the immediately preceding occasion when the routine was performed.

Figure 19:
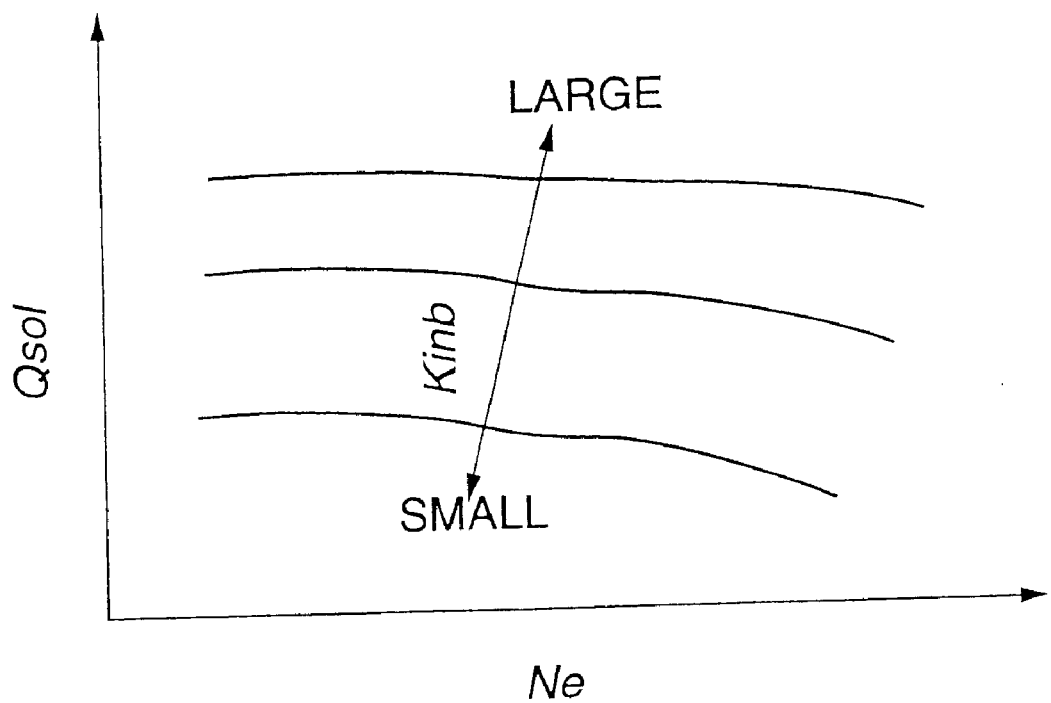
FIG. 19 is a flowchart describing the contents of a map of a volume efficiency equivalent basic value Kinb performed by the control unit.

In a step S92, a volume efficiency equivalent basic value Kinb is calculated from the engine rotation speed Ne and the target fuel injection amount Qsol by looking up a map shown in FIG. 19 previously stored in the memory of the control unit 41.

In a step S93, a volume efficiency equivalent value Kin is calculated from the following equation (2). When EGR is performed, the proportion of fresh air in the intake air falls, and the volume efficiency decreases. This reduction is reflected in the calculation of the volume efficiency equivalent value Kin via the volume efficiency equivalent basic value Kinb.

$$Kin = Kinb \cdot \frac{1}{1 + \frac{Megrd_{n-1}}{100}} \qquad (2)$$

In a step S94, the time constant equivalent value Kkin corresponding to the capacity of the collector 3A is calculated by multiplying the volume efficiency equivalent value Kin by a constant KVOL.

The constant KVOL is expressed by the following equation (3).

$$KVOL = (VEINC)/VM \qquad (3)$$

where,
  VE=displacement of diesel engine 1,
  NC=number of cylinders of diesel engine 1, and
  VM=capacity of passage from collector 3A to the intake valve.

Figure 17:
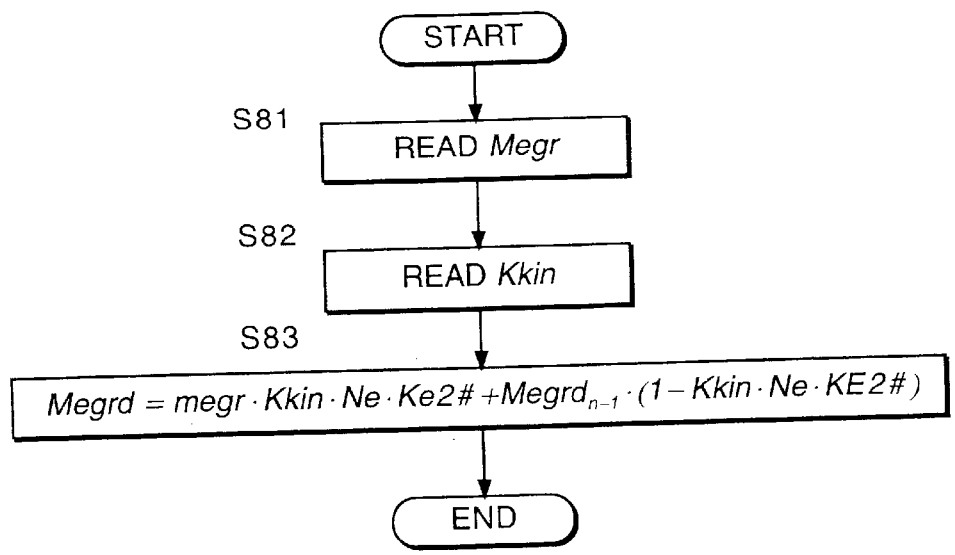
FIG. 17 is a flowchart describing a routine for calculating an EGR rate Megrd of an intake valve position performed by a control unit.

FIG. 17 shows the routine for calculating the real EGR rate Megrd. This routine is performed at an interval of 10 milliseconds.

The control unit 41 first reads the target EGR rate Megr in a step S81.

In a following step S82, the time constant equivalent value Kkin is read. The routine of FIG. 18, which calculates the time constant equivalent value Kkin, is performed in synchronism with the REF signal, and this routine which calculates the real EGR rate Megrd is performed at an interval of 10 milliseconds. Therefore, the time constant equivalent value Kkin read here is the time constant equivalent value Kkin calculated by the routine of FIG. 18 immediately before the execution of the routine of FIG. 17. Likewise, the immediately preceding value $Megrd_{n-1}$ of the real EGR rate read by the routine of FIG. 18 is the real EGR rate calculated by the routine of FIG. 17 just before the execution of the routine of FIG. 18.

In a step S83, the real EGR rate Megrd is calculated from the following equation (4) using the target EGR rate Megr, immediately preceding value $Megrd_{n-1}$, and time constant equivalent value Kkin.

$$Megrd = megr \cdot Kkin \cdot Ne \cdot Ke2\# + Megrd_{n-1} \cdot (1 - Kkin \cdot Ne \cdot KE2\#) \qquad (4)$$

where,
  KE2#=constant.

In this equation, Ne·KE2# is a value to convert the EGR rate per intake stroke of each cylinder, to an EGR rate per unit time.

Next, referring to FIG. 8, a routine for calculating the cylinder intake fresh air amount Qac will be described. This routine is performed in synchronism with the REF signal. The cylinder intake fresh air amount Qac expresses the intake fresh air amount in the intake valve position of one cylinder of the diesel engine 1. The cylinder intake fresh air amount Qac is calculated from the fresh air flowrate Qas0 of the intake passage 3 detected by the air flow meter 39, but as the air flow meter 39 is situated upstream of the compressor 55, the cylinder intake fresh air amount Qac is calculated considering the time until the air which has passed through the air flow meter 39 is taken into the cylinder via the collector 3A.

First, in a step S31, the control unit 41 reads the engine rotation speed Ne and the fresh air flowrate Qas0 of the intake passage 3.

In a step S32, the intake fresh air flowrate Qas0 is converted into an intake fresh air amount Qac0 per cylinder by the following formula (5).

$$Qac0 = \frac{Qas0}{Ne} \cdot KCON\# \qquad (5)$$

where,
  KCON#=constant.

The constant KCON# is a constant for converting the intake fresh air flowrate Qas0 of the intake passage 3 into the intake fresh air amount Qac0 per cylinder. In a four-cylinder engine, two cylinders perform air intake in each rotation, so the constant KCON# is 30. In a six-cylinder engine, three cylinders perform air intake in each rotation, so the constant KCON# is 20.

A considerable time is required until the air which has passed through the air flow meter 39 is actually taken into the cylinder. In order to correct for this time difference, the control unit 41 performs the processing of steps S33, S34.

In the step S33, considering the time required from the air flow meter 39 to the inlet of the collector 3A, a value Qac0n–L of Qac0 which was EGR flow velocity feedback correction coefficient the routine executed L times ago, is set as an intake fresh air amount Qacn per cylinder at the inlet of the collector 3A. The value of L is determined experimentally.

In the step S34, considering the time difference from the collector 3A to the intake valve of each cylinder of the diesel engine 1, the cylinder intake fresh air amount Qac is calculated by equation (6) of first order delay.

$$Qac = Qac_{n-1} \cdot (1 - Kkin) + Qacn \cdot Kkin \quad (6)$$

where,

Kkin = time constant equivalent value, and $Qac_{n-1}$ = Qac calculated on the immediately preceding occasion the routine was executed.

Figure 9:
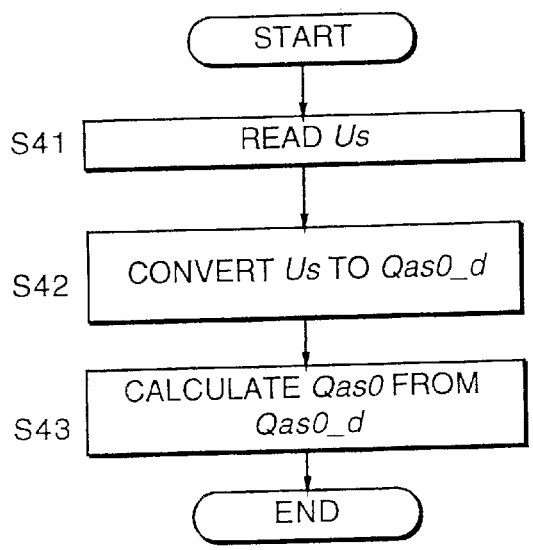
FIG. 9 is a flowchart describing a routine for calculating an intake fresh air flowrate Qas0 of the intake passage performed by the controller.
Figure 10:
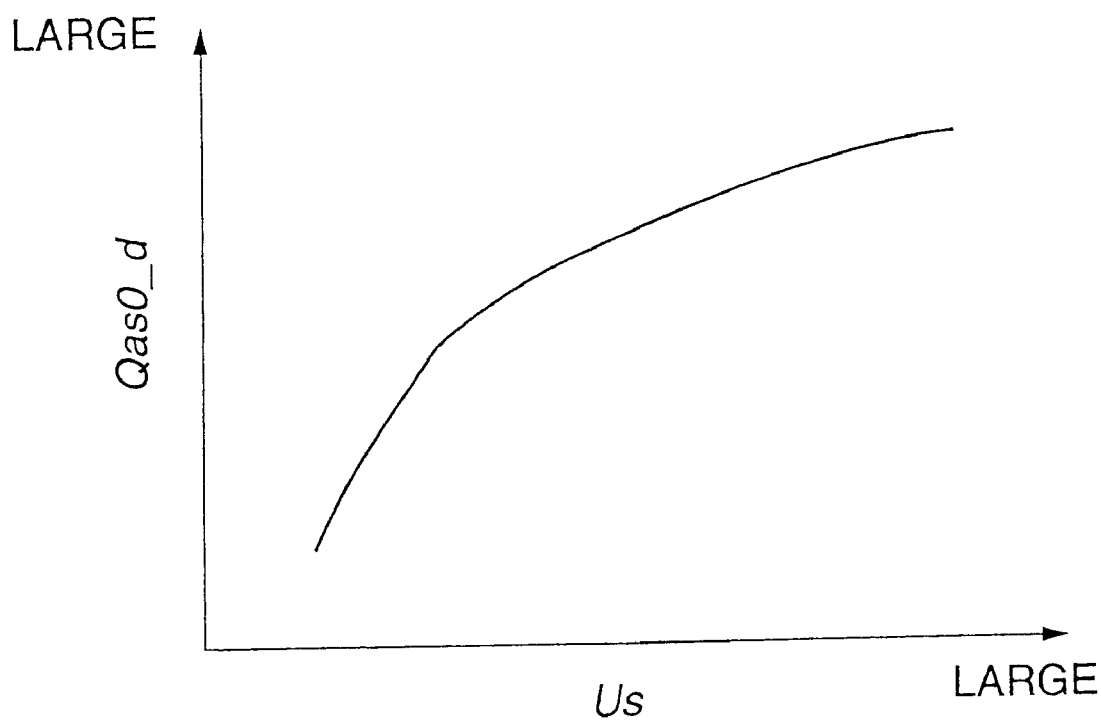
FIG. 10 is a diagram describing the contents of an intake fresh air volume map stored by the controller.

The signal input into the control unit 41 from the air flow meter 39 is an analog voltage signal Us, and the control unit 41 converts the analog voltage signal Us into the intake air flowrate Qas0 of the intake passage 3 by the routine shown in FIG. 9. This routine is performed at an interval of 4 milliseconds. In a step S41, the control unit 41 reads the analog voltage signal Us, and in a step S42, converts this into a flowrate Qas0_d by looking up a map shown in FIG. 10. This map is stored beforehand in the memory of the control unit 41.

Further, in a step S43, weighted average processing is performed on the flowrate Qas0_d, and the value obtained is taken as the intake fresh air flowrate Qas0 of the intake passage 3.

Next, referring to FIG. 24, a routine for calculating the real EGR amount Qec will be described. The real EGR amount Qec corresponds to an EGR amount per cylinder in the intake valve position. This routine is performed at an interval of 10 milliseconds.

Firstly in a step S111, the control unit 41 reads the intake fresh air amount Qacn per cylinder at the inlet of the collector 3A, the target EGR rate Megr, and the time constant equivalent value Kkin corresponding to the collector capacity. For the intake fresh air amount Qacn per cylinder at the inlet of the collector 3A, a value calculated by the routine of FIG. 8 is used, and for the time constant equivalent value Kkfn, a value calculated by the routine of FIG. 18 is used.

In a next step S112, an EGR amount Qec0 per cylinder at the inlet of the collector 3A is calculated by the following equation (7).

$$Qec0 = Qacn \cdot Mger \quad (7)$$

In a next step S113, real EGR amount Qec is calculated by the following equation (8) and the routine is terminated.

$$Qec = Qec0 \cdot Kkin \cdot Ne \cdot KE\# + Qec_{n-1} \cdot (1 - Kkin \cdot Ne \cdot KE\#) \quad (8)$$

Figure 20:
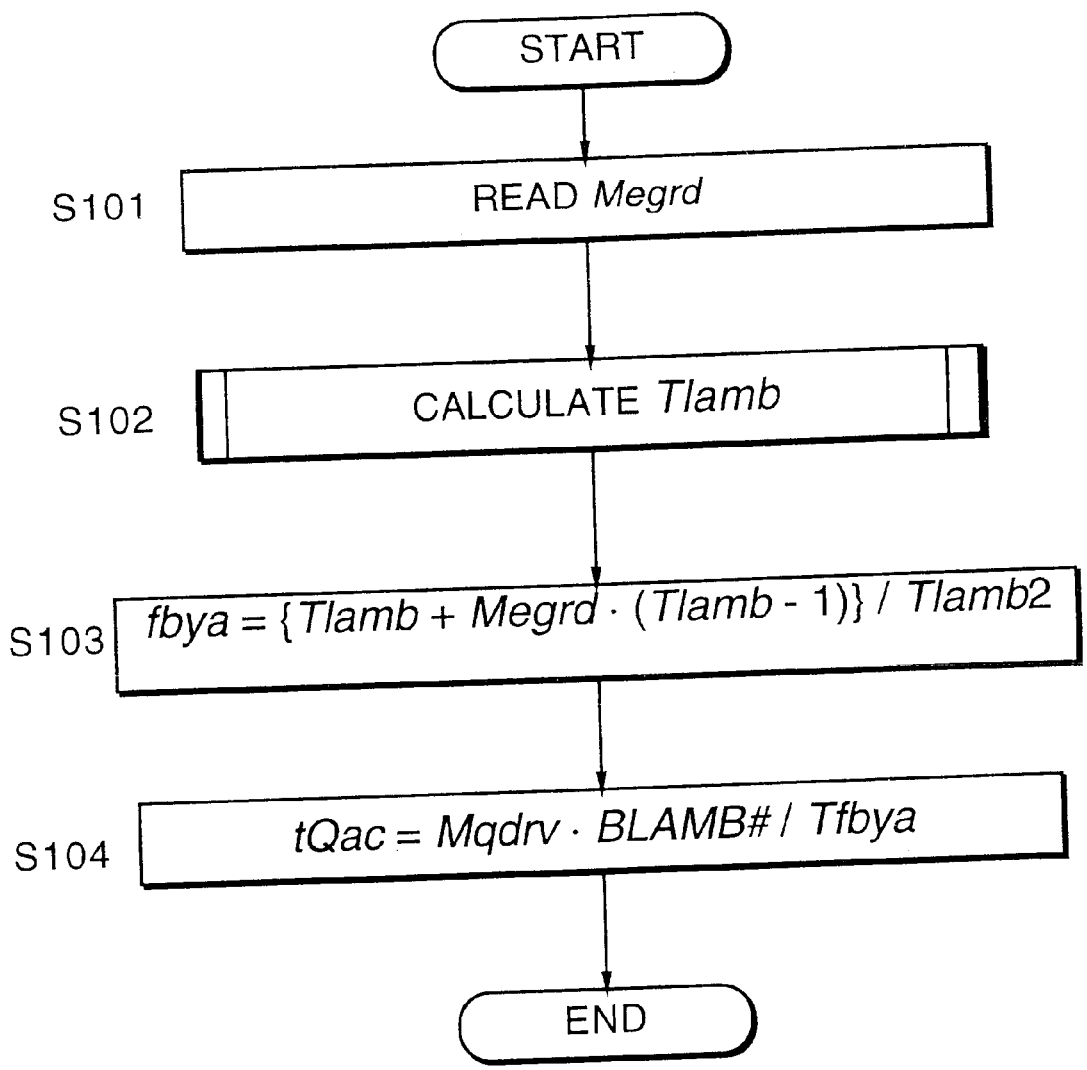
FIG. 20 is a flowchart describing a subroutine for calculating a target intake fresh air amount tQac performed by the control unit.

FIG. 20 shows a routine for calculating the target intake fresh air amount tQac. The target intake fresh air amount tQac corresponds to a target fresh air amount at the inlet of the collector 3A This routine is performed at an interval of 10 milliseconds.

Referring to FIG. 20, firstly in a step S101, the control unit 41 reads the real EGR rate Megrd.

Figure 21:
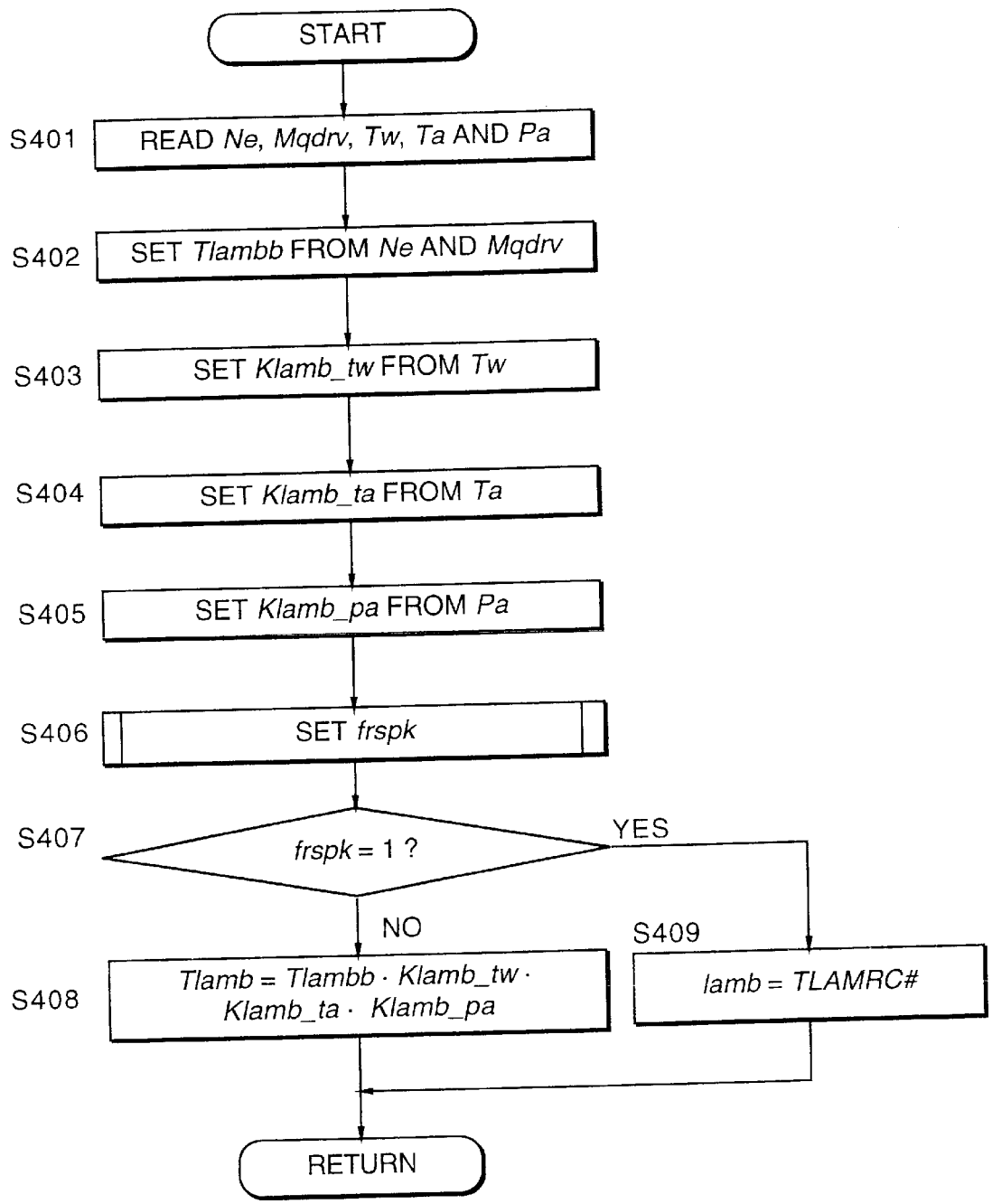
FIG. 21 is a flowchart describing a subroutine for calculating a target excess air factor Tlamb performed by the control unit.

In a step S102, by a subroutine shown in FIG. 21, the target excess air factor Tlamb is calculated.

Referring to FIG. 21, in a step S401, the engine rotation speed Ne, basic fuel injection amount Mqdrv, cooling water temperature Tw, intake air temperature Ta and atmospheric pressure Pa are read. The basic fuel injection amount Mqdrv is a value calculated by the step S3 of FIG. 3.

Figure 22:
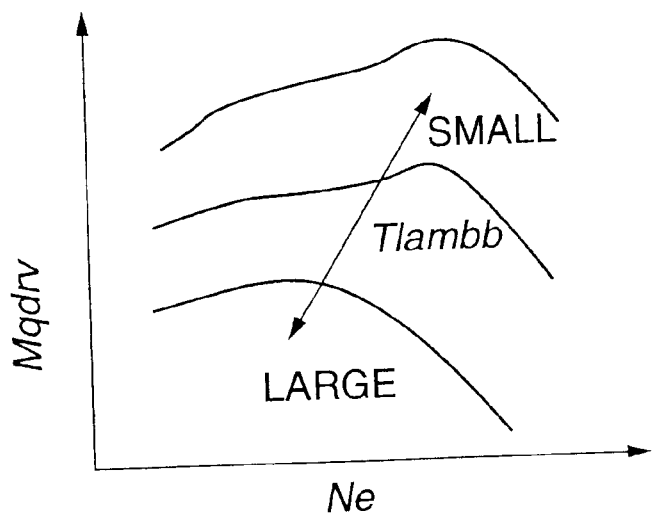
FIG. 22 is a diagram describing the contents of a map of a target excess air factor basic value Tlambb stored by the control unit.

In a step S402, a target excess air factor basic value Tlambb is calculated by looking up a map shown in FIG. 22 based on the engine rotation speed Ne and basic fuel injection amount Mqdrv. This map is previously stored in the memory of the control unit 41.

Here, the characteristics of this map will be described.

In the prior art, to prevent generation of smoke, a limit was applied to the excess air factor only in the high load region of the diesel engine 1. On the other hand, according to this invention, an optimum excess air factor is set in all regions of the engine rotation speed Ne and basic fuel injection amount Mqdrv.

Specifically, the target excess air factor basic value Tlambb is set to be smaller the larger the basic fuel injection amount Mqdrv.

Further, the excess air factor basic value Tlambb is set smaller the higher the rotation speed Ne in the high rotation speed region.

Figure 23:
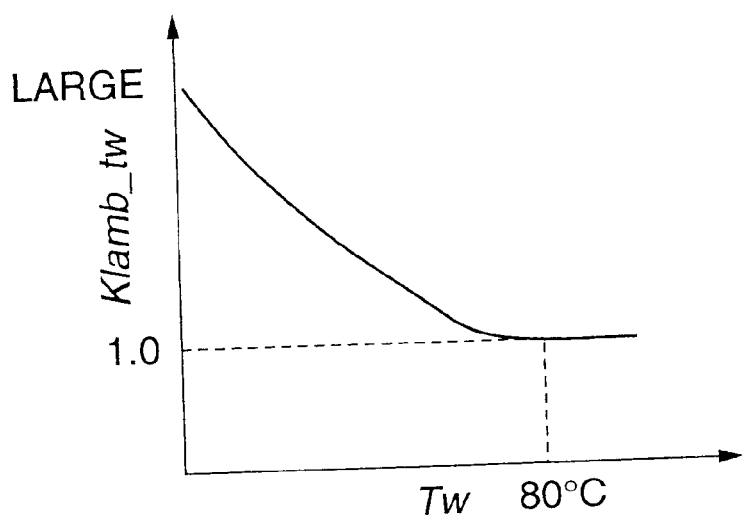
FIG. 23 is a diagram describing the contents of a map of a water temperature correction coefficient Klamb_tw stored by the control unit.

In a step S403, a water temperature correction coefficient Klamb_tw is calculated by looking up a map shown in FIG. 23 based on the cooling water temperature Tw. This map is previously stored in the memory of the control unit 41.

Figure 65:
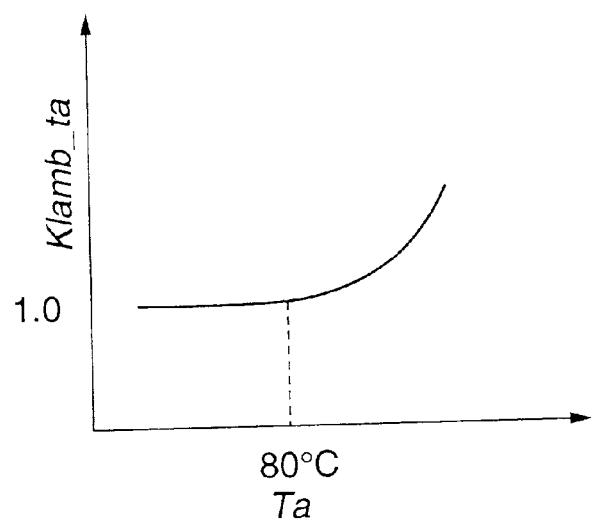
FIG. 65 is a diagram describing the contents of a map of an intake air temperature correction coefficient Klamb_ta stored by the control unit.

In a step S404, an intake air temperature correction coefficient Klamb_ta is calculated by looking up a map shown in FIG. 65 based on the intake air temperature Ta.

This map is previously stored in the memory of the control unit 41.

Figure 66:
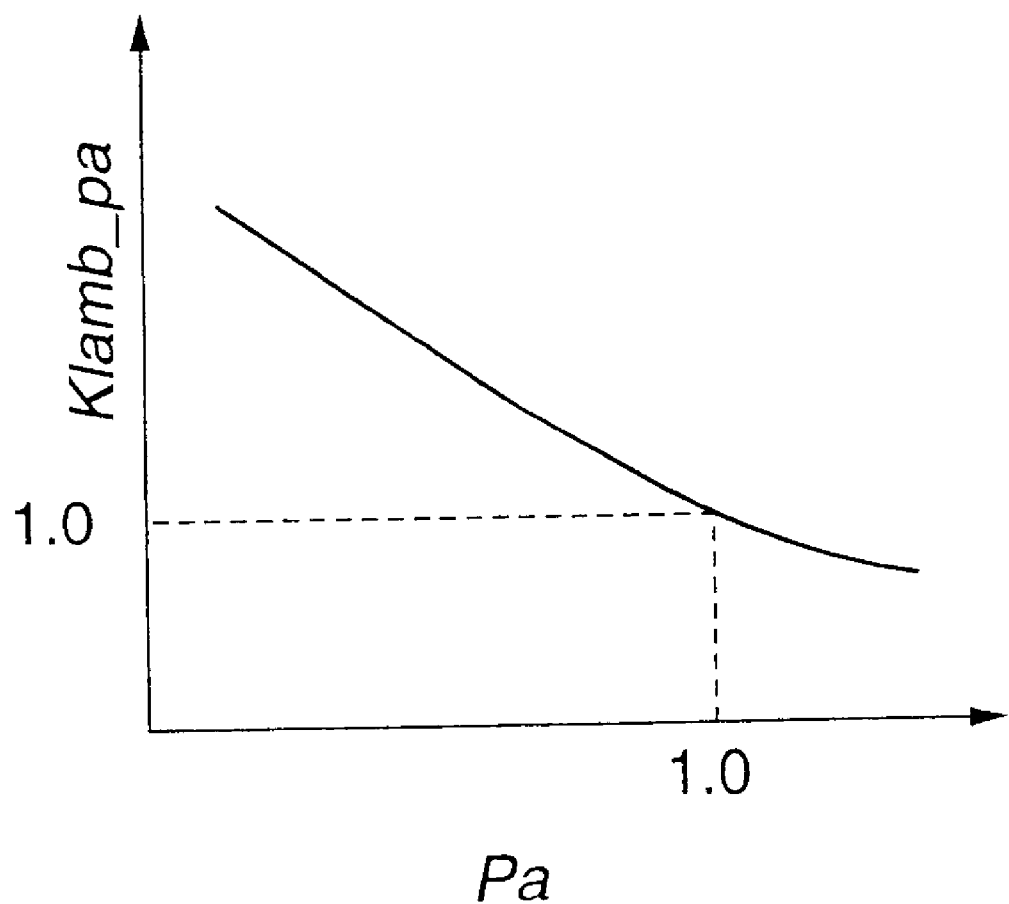
FIG. 66 is a diagram describing the contents of a map of an atmospheric correction coefficient Klamb_pa stored by the control unit.

In a step S405, an atmospheric correction coefficient Klamb_pa is calculated by looking up a map shown in FIG. 66 based on the atmospheric pressure Pa. This map is previously stored in the memory of the control unit 41.

Figure 67:
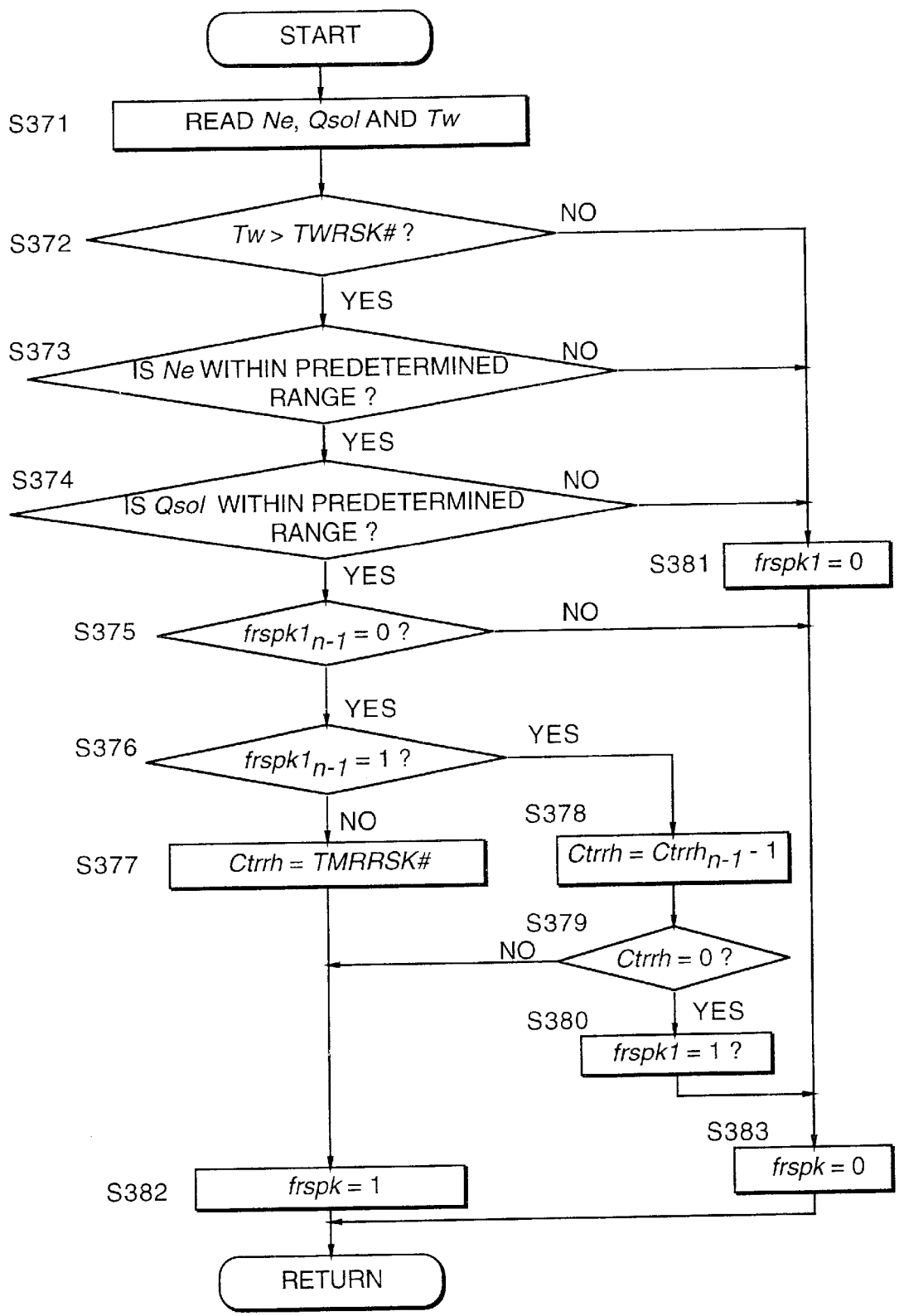
FIG. 67 is a flowchart describing a routine for setting a rich spike flag frspk performed by the control unit.

In a step S406, a rich spike flag frspk is set using a subroutine shown in FIG. 67.

The rich spike flag frspk is a flag which determines whether or not rich spike is allowed. As described above, the catalytic converter 62 reduces trapped nitrogen oxides (NOx) by discharged hydrocarbons (HC) under a rich airfuel ratio. For this purpose, the air-fuel ratio of the diesel engine 1 is temporarily set to rich, i.e., the setting of the excess air factor to less than 1. This operation is referred to as rich spike. When the rich spike flag frspk=1, it shows that rich spike conditions are satisfied. When the rich spike flag frspk=0, it shows that rich spike conditions are not satisfied.

Referring to FIG. 67, firstly in a step S381, the control unit 41 reads the engine rotation speed Ne, target fuel injection amount Qsol and cooling water temperature Tw.

In steps S372 to S374, it is determined whether or not rich spike conditions are satisfied. Specifically, when the cooling water temperature Tw is higher than a predetermined temperature TWRSK#, the engine rotation speed Ne is in a predetermined rotation speed region and the target fuel injection amount Qsol is in a predetermined injection amount region, it is determined that rich spike conditions are satisfied. For example, when the exhaust gas temperature is low such as in the low load region, reduction of an NOx by HC does not proceed very well, and in this case, as the target fuel injection amount Qsol is below the predetermined injection region, rich spike conditions are not satisfied.

When any of the conditions of the steps S372–S374 is not satisfied, in the step S381, the subroutine resets a rich spike termination flag frspk1 to 0, and in a step S383, the rich spike flag frspk is reset to 0 and the subroutine is terminated. The rich spike termination flag frspk1 is a flag which shows whether or not rich spike has terminated. When frspk1=1, it shows that rich spike has terminated, and when frspk1=0, it shows that rich spike has not terminated, On the other hand, when all the conditions of the steps S372–S374 are satisfied, it is determined that rich spike conditions are satisfied, and the subroutine proceeds to a step S375.

In the step S375, it is determined whether or not the immediately preceding value $frspk1_{n-1}$ is 0. $frspk1_{n-1}$ is the rich spike termination flag set on the immediately preceding occasion when the subroutine was performed. When the immediately preceding value $frspk1_{n-1}$ is zero, in a step S376, it is determined whether or not the immediately preceding value of the rich spike flag $frspk_{n-1}$ is 1. If the immediately preceding value $frspk_{n-1}$ is not 1, rich spike flag conditions are satisfied for the first time due to the present execution of the subroutine. In this case, in a step S377, a timer value Ctrrh is set to a predetermined value TMRRSK#, and in a step S382, the rich spike flag frspk is set to 1 and the subroutine is terminated.

In the step S375, if the immediately preceding value $frspk1_{n-1}$ of the rich spike termination flag is not 0, i.e., if it is 1, rich spike has already terminated. In this case, in the step S383, the rich spike flag frspk is reset to 0 and the subroutine is terminated.

In the step S376, when the immediately preceding value $frspk1_{n-1}$ of the rich spike flag is 1, it shows that rich spike conditions are satisfied continuously from the last execution of the subroutine. In this case, the subroutine proceeds to a step S378, and the timer value Ctrrh is decremented. In a next step S379, it is determined whether or not the timer value Ctrrh is 0.

In the step S379, and if the timer value Ctrrh is not 0, the control unit 40 sets the rich spike flag frspk to 1 in the step S382, and the subroutine is terminated. If the timer value Ctrrh is 0 in the step S379, the control unit 41 sets the rich spike termination flag frspk1 to 1 in a step S380, resets the rich spike flag frspk to 0 in the step S383, and the subroutine is terminated.

In this subroutine, when rich spike conditions are satisfied, if rich spike has not yet been performed, the rich spike flag frspk is set to 1 for a time corresponding to the predetermined value TMRRSK#. After termination of rich spike, the rich spike flag frspk is not set to 1 even if rich spike conditions continue, and the rich spike flag frspk is again set to 1 only when the rich spike conditions have once been unsatisfied and again become satisfied. In this way, rich spike is not performed unnecessarily. Due to this processing, as unnecessary rich spike is not performed, deterioration of fuel cost-performance or exhaust gas composition due to rich spike is suppressed to the minimum.

Now, returning to the subroutine of FIG. 21, in a step S407, the control unit 41 determines whether or not the rich spike flag frspk set in the step S406, is 1.

When frspk is 1, i.e., when rich spike conditions are satisfied, in a step S409, the target excess air factor Tlamb is set to a fixed value TLAMRC# less than 1.0, and the subroutine is terminated.

On the other hand, when frspk is not 1, i.e., when rich spike conditions are not satisfied, in a step S408, a value obtained by multiplying the target excess air factor basic value Tlambb by three correction coefficients Klamb_tw, Klamb_ta and Klamb_Pa is set as the target excess air factor Tlamb, and the subroutine is terminated.

Here, the water temperature correction coefficient Klamb_tw corrects the excess air factor in the increasing direction to cope with friction which increases at low temperature, and stabilize combustion.

The intake air temperature correction coefficient Klamb_ta corrects the excess air factor in the increasing direction, compensates for a drop in air density and decreases the combustion temperature when the intake air temperature is in the high region. The high temperature region for the intake air temperature Ta is the region for example above 80° C.

The atmospheric pressure correction coefficient Klamb_Pa increases the excess air factor and compensates for a drop in air density at high ground level where the atmospheric pressure Pa is less than one atmosphere.

Rich spike may be performed not only to reduce NOx, but also to increase the exhaust gas temperature. In this case, a fixed value TLABRC# used in the step S409 is set from 1.1 to 1.2, and the conditions for setting the rich spike flag frspk to 1 in the flowchart of FIG. 67 may be modified to have another step for determining if rich spike for raising the exhaust gas temperature is required.

In this way, after setting the target excess air factor Tlamb by the subroutine of FIG. 21, in a step S103 of FIG. 20, the control unit 41 calculates a target equivalence ratio Tfbya by the following equation (9) using the target excess air factor Tlamb and real EGR rate Megrd.

$$Tfbya=\{Tlamb+Megrd\cdot(Tlamb-1)\}/Tlamb^2 \qquad (9)$$

Equation (9) is an approximation based on the following concept. The excess air factor lamb is a value obtained by dividing the air-fuel ratio by 14.7 which is the stoichiometric air-fuel ratio, and is generally defined by the following equation (10).

$$lamb=Ga/(Gf\cdot14.7) \qquad (10)$$

where,

Ga=fresh air amount, and

Gf=fuel injection amount.

However, in the diesel engine 1 which is often run with excess air, part of the fresh air is discharged without contributing to combustion. As a result, when exhaust gas recirculation is performed in the excess air state, a certain amount of fresh air is contained in the exhaust gas recirculated into the intake air via the EGR valve 6.

The excess air factor lamb taking account of the fresh air contained in the exhaust gas recirculated into the intake air, may be expressed by the following equation (11):

$$lamb=\{Ga+Ge\cdot(lamb-1)/lamb\}/(Gf\cdot14.7) \qquad (11)$$

where,

Ga=EGR amount.

(lamb−1)/lamb in equation (11) shows the proportion of fresh air in the EGR gas.

Equation (11) may be rewritten as the following equation (12).

$$lamb=Ga\cdot\{1+(Ge/Ga)\cdot(lamb-1)/lamb\}/(Gf\cdot14.7)=\{Ga/(Gf\cdot14.7)\}\cdot\{1+(Ge/Ga)\cdot(lamb-1)/lamb\} \qquad (12)$$

Here, Ge/Ga corresponds to the EGR rate.

On the other hand, in the control device according to this invention, an equivalence ratio fbya is defined by the following equation (13).

$$fbya=Gf\cdot14.7/Ga \qquad (13)$$

In theory, this should be an amount obtained by adding the air amount contained in the exhaust gas due to EGR, to the fresh air amount Ga used in equation (13), but in this control device, the equivalence ratio fbya is defined by equation (13) as an approximate value.

Ga/(Gf*14.7) on the right-hand side of equation (12) is equal to 1/fbya. Substituting this in equation (12), the following equation (14) is obtained.

$$lamb=(1/Tbya) \cdot \{1+Megrd \cdot (lamb-1)/lamb\} \quad (14)$$

Rewriting equation (14) in terms of the equivalence ratio fbya, the following equation (15) is obtained.

$$fbya=(1/lamb) \cdot \{1+Megrd \cdot (lamb-1)/lamb\} \quad (15)$$

Equation (9) is obtained by respectively replacing the equivalence ratio fbya by the target equivalence ratio Tfbya, and the excess air factor lamb by the target excess air factor Tlamb, in equation (15).

The reason why the real EGR rate Megrd is used in the calculation of the target equivalence ratio Tfbya is as follows.

When the diesel engine 1 is in a transient running state, due to the time required until EGR gas flows into the combustion chamber of the diesel engine 1, the fuel injection amount based on the target equivalence ratio Tfbya and the amount of gas in the combustion chamber do not match and an error occurs in the control of the excess air factor. However, as the real EGR rate Megrd which takes account of this delay is used instead of the target EGR rate Megr in the calculation of the target equivalence ratio Tfbya, this error can be eliminated.

After calculating the target equivalence ratio Tfbya by the approximate equation (9) in this way, in the step S104 of FIG. 20, the control unit 41 calculates the target intake fresh air amount tQac by the following equation (16) using the target equivalence ratio Tfbya, and the subroutine is terminated.

$$tQac=Mqdrv \cdot BLAMB\#/Tfbya \quad (16)$$

where,

BLAMB#=14.7.

The control of the EGR valve 6 as well as the control of the intake fresh air amount and fuel injection amount by the control unit 41 are performed based on these common parameters, the target fuel injection amount Qsol, the time constant equivalent value Kkin, the target EGR rate Megr, the real EGR rate Megrd, the cylinder intake fresh air amount Qac, the real EGR amount Qec and the target intake fresh air amount tQac.

Next, referring to FIG. 5, the calculation of the target opening area Aev of the EGR valve 6 will be described. This routine is performed every time the REF signal is input.

Figure 7:
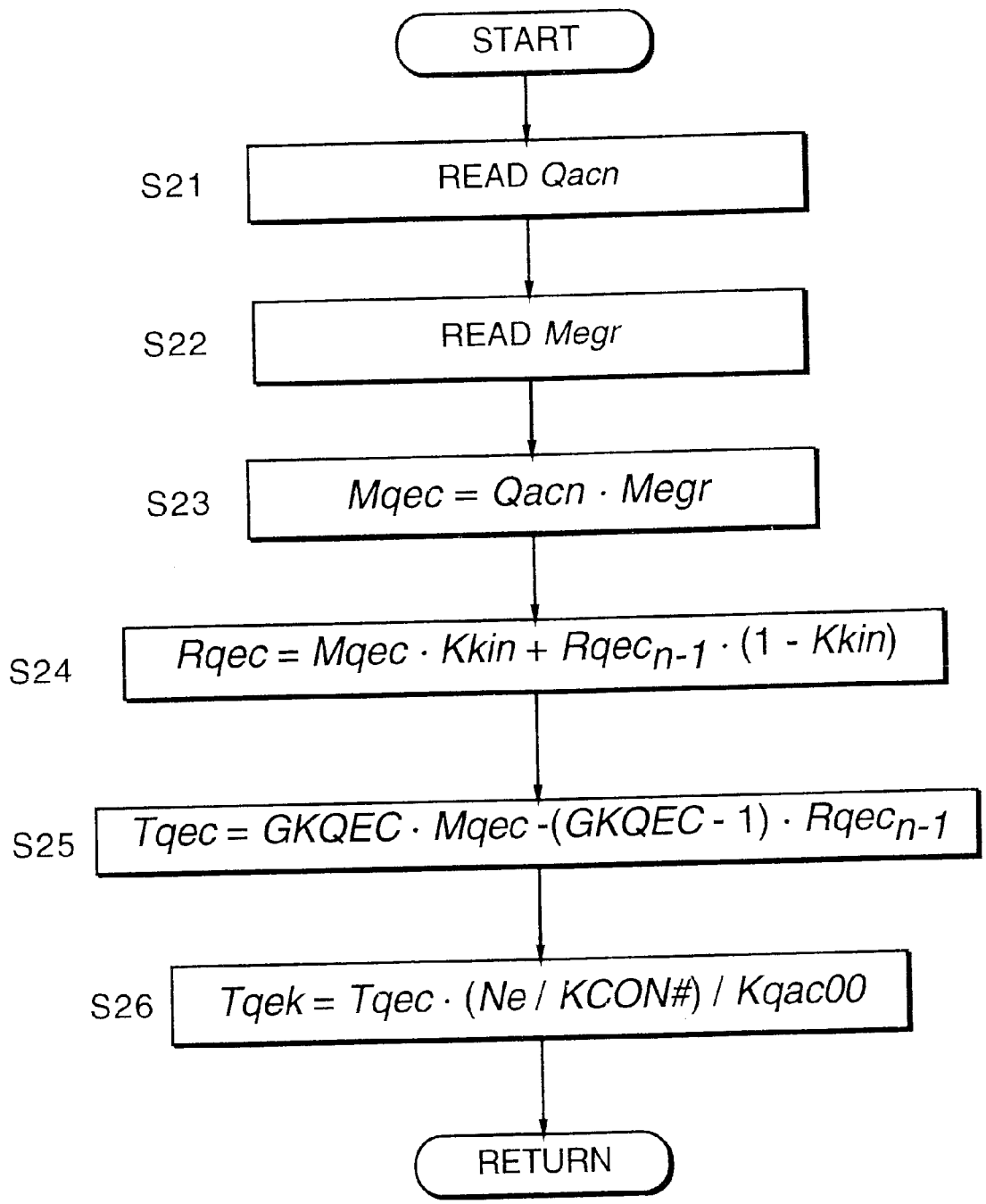
FIG. 7 is a flowchart describing a routine for calculating a target EGR amount Tqek performed by the controller.

First, in a step S11, the control unit 41 calculates a target EGR amount Tqec of the EGR valve 6 using a subroutine shown in FIG. 7.

Referring to FIG. 7, firstly in a step S21, the control unit 41 reads the intake fresh air amount Qacn at the inlet of a collector 3A. The intake fresh air amount Qacn per cylinder at the inlet of the collector 3A is a value calculated by the step S33 of FIG. 8.

Next, in a step S22, the target EGR rate Megr is read. The target EGR rate Megr is a value calculated by the routine of FIG. 11.

Next, in a step S23, a required EGR amount Mqec is calculated by equation (17).

$$Mqec=Qacn \cdot Megr \quad (17)$$

In a next step S24, delay processing is performed on the required EGR amount Mqec by the following equation (18) using a time constant equivalent value Kkin calculated by the routine of FIG. 18, and this is converted to an intermediate value corresponding to the required EGR amount per cylinder at the intake valve position of the diesel engine 1.

$$Rqec=Mqec \cdot Kkin+Rqec_{n-1} \cdot (1-Kkin) \quad (18)$$

where, $Rqec_{n-1}$=Rqec calculated on the immediately preceding occasion the subroutine was performed.

In a next step S25, advance processing is performed by the following equation (19) using the intermediate value Rqec and required EGR amount Mqec, to calculate a target EGR amount Tqec per cylinder at the position of the EGR valve 6.

$$Tqec=GKQEC \cdot Mqec-(GKQEC-1) \cdot Rqec_{n-1} \quad (19)$$

In a final step S26, the target EGR amount Tqec per cylinder is converted to a target EGR amount Tqek per unit time by the following equation (20).

$$Tqek=Tqec \cdot (Ne/KCON\#)/Kqac00 \quad (20)$$

where,

Kqac00=EGR amount feedback correction coefficient.

The EGR amount feedback correction coefficient Kqac00 will be described later.

Figure 63:
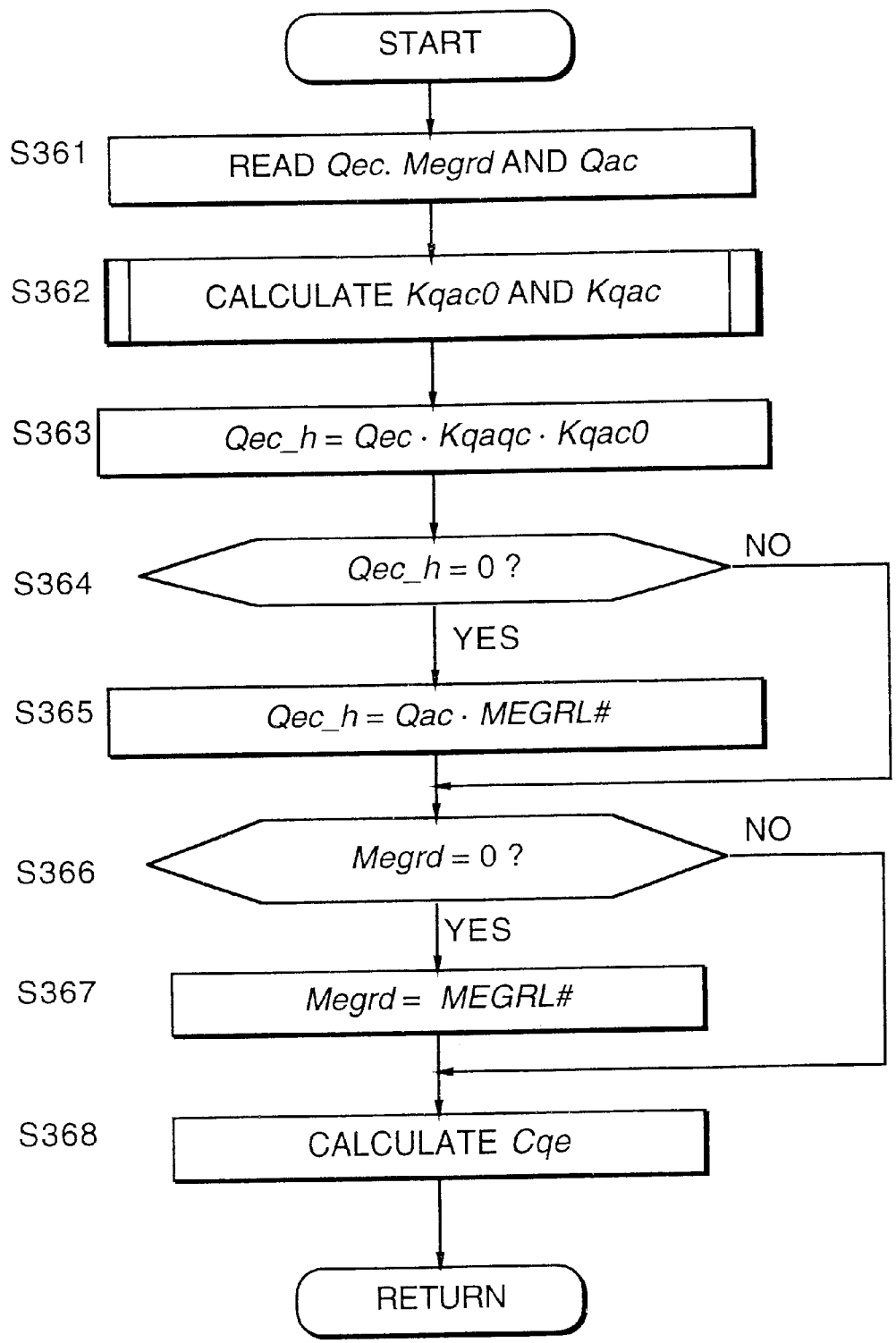
FIG. 63 is a flowchart describing a subroutine for calculating an EGR valve flow velocity Cqe performed by the control unit.

Next, referring again to FIG. 5, after calculating the target EGR amount Tqek per unit time, the control unit 41 calculates an EGR valve flow velocity Cqe in a step S12 by using a subroutine of FIG. 63.

Referring to FIG. 63, in a step S361, the control unit 41 reads the real EGR amount Qec, real EGR rate Megrd and cylinder intake fresh air amount Qac.

Figure 50:
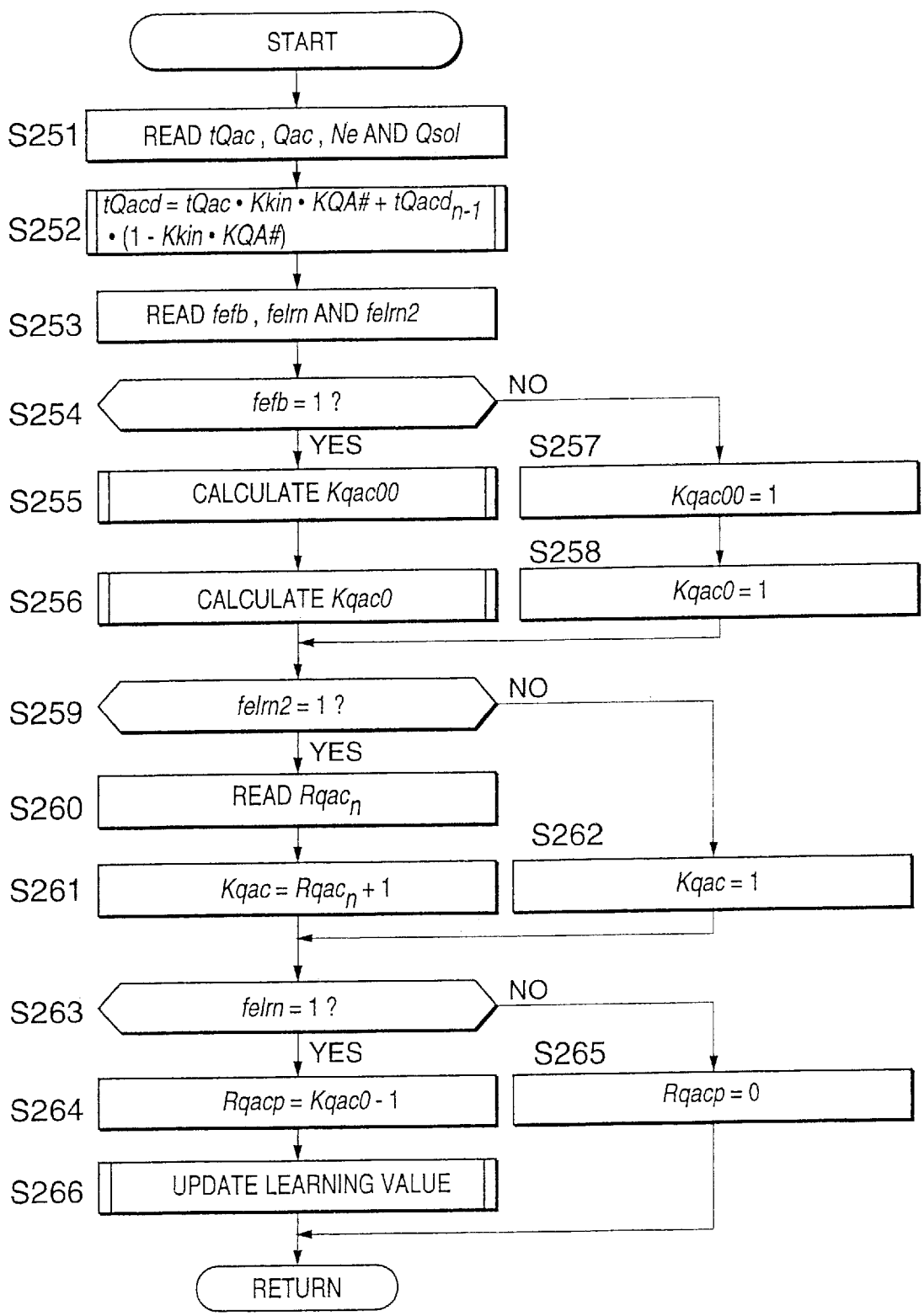
FIG. 50 is a flowchart describing a subroutine for calculating an EGR amount feedback correction coefficients Kqac00, an EGR flow velocity feedback correction coefficientKqac0, and an EGR flow velocity learning correction coefficient Kqac, performed by the control unit.

In a step S362, by a subroutine shown in FIG. 50, an EGR flow velocity feedback correction coefficient Kqac0, EGR flow velocity learning correction coefficient Kqac are calculated.

Referring to FIG. 50, in a step S251, the control unit 41 first reads the target intake fresh air amount tQac, cylinder intake fresh air amount Qac, engine rotation speed Ne and target fuel injection amount Qsol.

Figure 8:
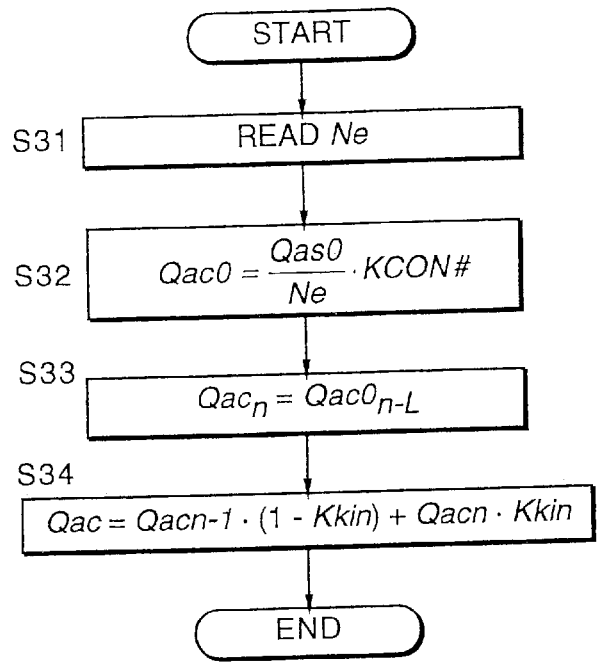
FIG. 8 is a flowchart describing a routine for calculating a cylinder intake fresh air amount Qac performed by the controller.

In a step S252, a delay processing value tQacd of the target intake fresh air amount tQac is calculated using the following equation (21), from the target intake fresh air amount tQac and the time constant equivalent value Kkin calculated by the routine of FIG. 8. This value corresponds to the target intake air amount in the intake valve position of the diesel engine 1.

$$tQacd=tQac \cdot Kkin \cdot KQA\#+tQacd_{n-1} \cdot (1-Kkin \cdot KQA\#) \quad (21)$$

where,

KQA#=constant, and $tQacd_{n-1}$=tQacd calculated on the immediately preceding occasion when the subroutine was executed.

In a following step S253, a feedback permission flag fefb, a learning permission flag felrn and a learning value reflection permission flag felrn2 which are related to the control of the EGR valve opening are read.

Figure 51:
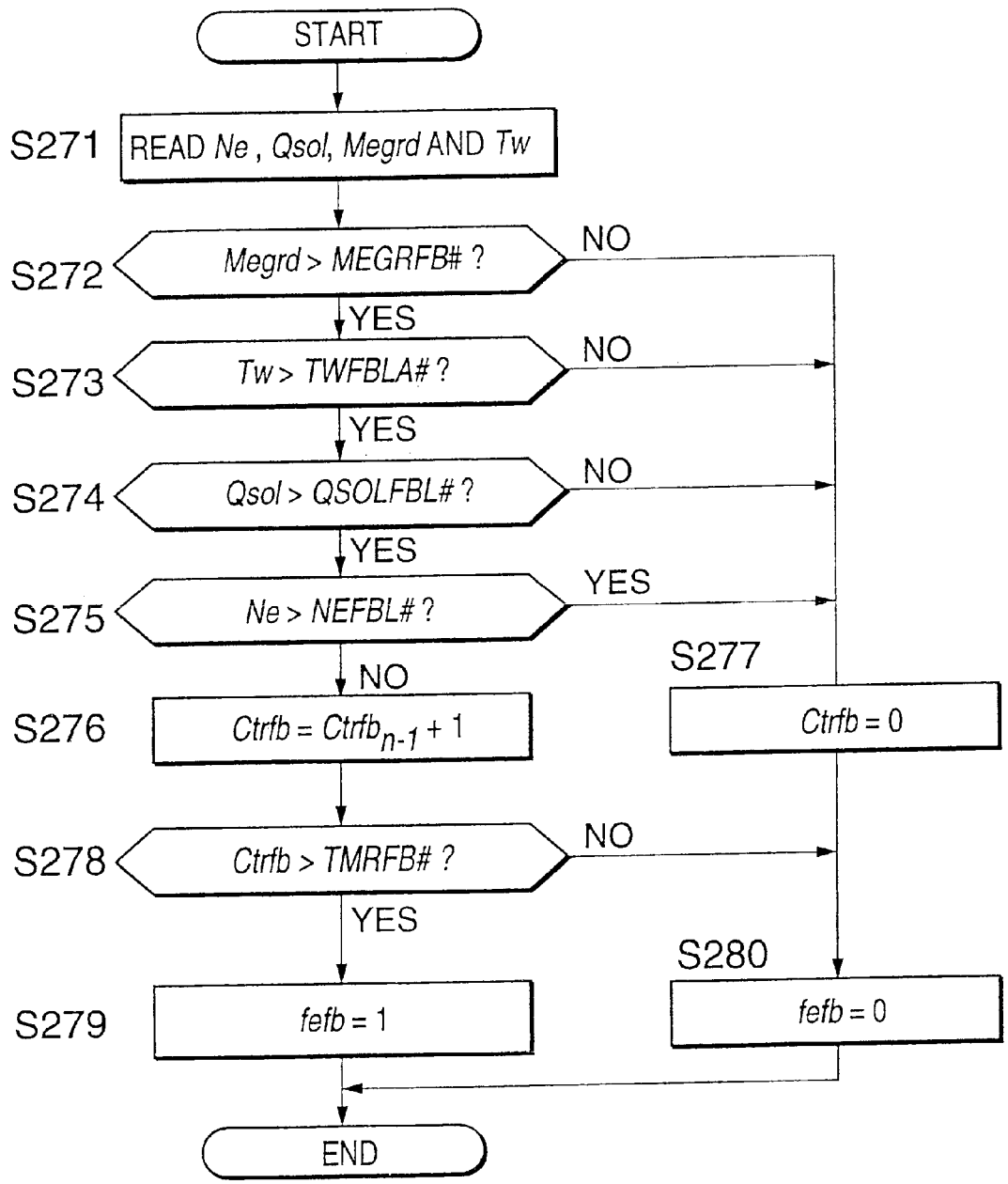
FIG. 51 is a flowchart describing a routine for setting a feedback permission flag fefb performed by the control unit.
Figure 52:
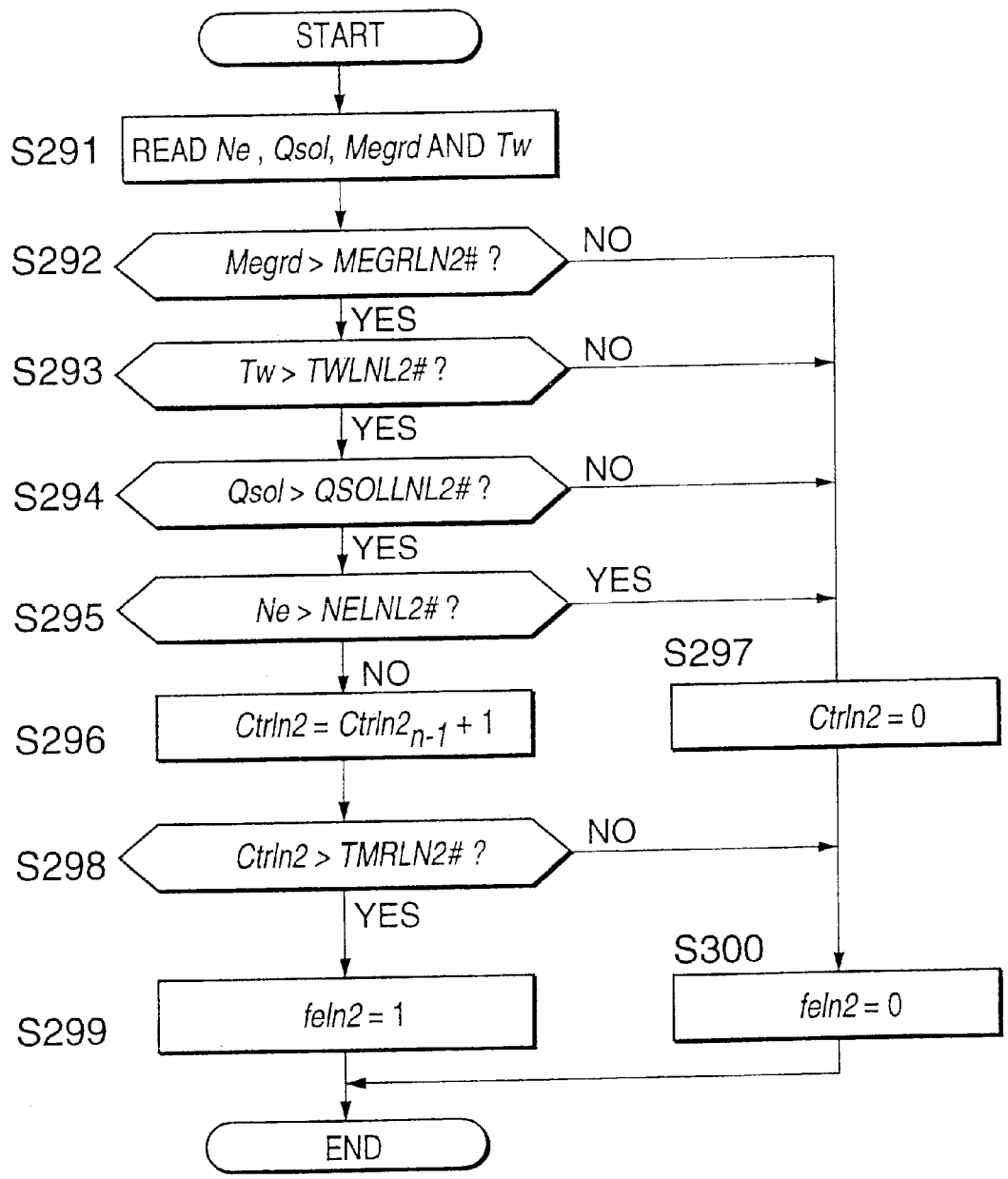
FIG. 52 is a flowchart describing a routine for setting a learning value reflection permission flag felrn2 performed by the control unit.
Figure 53:
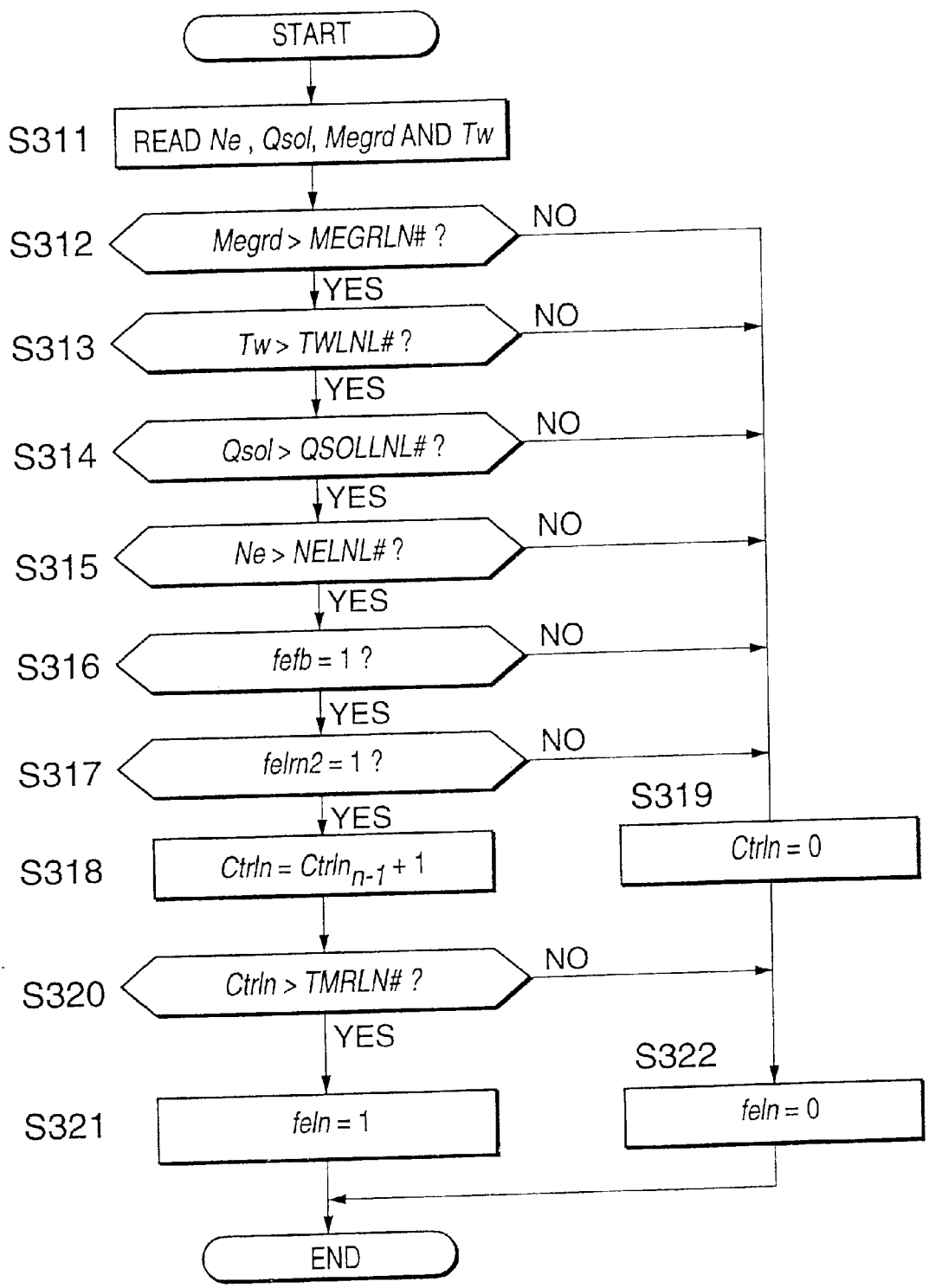
FIG. 53 is a flowchart describing a routine for setting a learning permission flag felrn performed by the control unit.

These flags are set by the independent routines shown in FIG. 51, FIG. 52 and FIG. 53, respectively.

FIG. 51 shows the routine for setting the feedback permission flag fefb. This routine is performed at an interval of 10 milliseconds.

Referring to FIG. 51, firstly in a step S271, the control unit 41 reads the engine rotation speed Ne, target fuel injection amount Qsol, real EGR rate Megrd and water temperature Tw.

In subsequent steps S272–S275, the EGR amount feedback control conditions are determined.

In the step S272, it is determined whether or not the real EGR rate Megrd exceeds a predetermined value MEGRFB#. The predetermined value MEGRFB# is a value for checking that exhaust gas recirculation is actually performed. In the step S273, it is determined whether or not the cooling water temperature Tw exceeds a predetermined value TwFBL#. The predetermined value TwFBL# is set to 30' C. In a step S274, it is determined whether or not the target fuel injection amount Qs of exceeds a predetermined value QSOLFBL#.

The predetermined value QSOLFBL# is a value for checking that the diesel engine 1 is not in a fuel cut state. In a step S275, it is determined whether or not the engine rotation speed Ne exceeds a predetermined value NeFBL#. The predetermined value NeFBL# is a value for checking that the vehicle is not in a low-speed region where the diesel engine 1 stops rotation.

When all of the conditions of step S272–5275 are satisfied, the subroutine proceeds to a step S276 and increments a timer value Ctrfb.

In a following step S278, it is determined whether or not the timer value Ctrtb is greater than a predetermined value TMRFB#. The predetermined value TMRFB# is set to, for example, a value less than 1 second. When the result of this determination is affirmative, the subroutine sets the feedback permission flag fefb to 1 in a step S279, and the subroutine is terminated. On the other hand, if any of the conditions of the steps S272–S275 is not satisfied, in a step S277, the subroutine resets the timer value Ctrfb to 0, and proceeds to a following step S280.

When the determination of the step S278 is negative, the subroutine also proceeds to the step S280.

In the step S280, the feedback permission flag fefb is reset to 0 and the subroutine is terminated.

According to this subroutine, the feedback permission flag fefb is set to 1 only when the state where all of the conditions of the steps S272–S275 were satisfied, continues for a time exceeding the predetermined value TMRFB#, and in other cases, the feedback permission flag fefb is reset to 0.

FIG. 52 shows a routine for setting the learning value reflection permission flag felrn2. This routine is also performed at an interval of 10 milliseconds.

Referring to FIG. 52, firstly in a step S291, the control unit 41 reads the engine rotation speed Ne, target fuel injection amount Qsol, real EGR rate Megrd and cooling water temperature Tw.

In subsequent steps S292–S295, EGR amount learning value reflection conditions are determined.

In the step S292, it is determined whether or not the real EGR rate Megrd exceeds a predetermined value MEGRLN2#. The predetermined value MEGRLN2# is a value for checking that exhaust gas recirculation is actually performed. In the step S293, it is determined whether or not the cooling water temperature Tw exceeds a predetermined value TwLNL2#. The predetermined value TwLNL2# is set to 20' C. In the step S294, it is determined whether or not the target fuel injection amount Qsol exceeds a predetermined value QSOLLNL2#. The predetermined value QSOLLNL2# is a value for checking that the diesel engine 1 is not in a fuel cut state. In the step S295, it is determined whether or not the engine rotation speed Ne exceeds a predetermined value NeLNL2#. The predetermined value NeLNL2# is a value for checking that the vehicle is not in a low-speed region where the diesel engine 1 stops rotation.

Only when all of the conditions of step S292–S295 are satisfied, the subroutine proceeds to a step S296 and increments a timer value Ctrln2.

In the following step S298 it is determined whether or not the timer value Ctrln2 exceeds a predetermined value TMRLN2#. The predetermined value TMRLN2# is set to 0.5 seconds. When the result of this determination is affirmative, the subroutine sets the learning value reflection permission flag felrn2 to 1 in a step S299, and the subroutine is terminated.

On the other hand, when any of the conditions of the steps S292–S295 is not satisfied, in a step S297, the subroutine resets the timer value Ctrln2 to 0, and proceeds to a following step S300. When the determination of the step S298 is negative, the subroutine also proceeds to the step S300.

In the step S300, the learning value reflection permission flag felrn2 is reset to 0 and the subroutine is terminated.

FIG. 53 shows the routine for setting the learning permission flag felrn. This routine is also performed at an interval of 10 milliseconds.

Referring to FIG. 53, firstly in a step S311, the control unit 41 reads the engine rotation speed Ne, target fuel injection amount Qsol, real EGR rate Megrd, and water temperature Tw.

In subsequent steps S312–S317, the EGR amount learning permission conditions are determined.

In the step S312, it is determined whether or not the real EGR rate Megrd exceeds a predetermined value MEGRLN#. The predetermined value MEGRLN# is a value for checking that exhaust gas recirculation is actually performed. In the step S313, it is determined whether or not the cooling water temperature Tw exceeds a predetermined value TwLNL#. The predetermined value TwLNL# is set to 70–80' C. In the step S314, it is determined whether or not the target fuel injection amount Qsol exceeds a predetermined value QSOLLNL#. The predetermined value QSOLLNL# is a value for checking that the diesel engine 1 is not in a fuel cut state. In the step S315, it is determined whether or not the engine rotation speed Ne exceeds a predetermined value NeLNL#. The predetermined value NeLNL# is a value for checking that the vehicle is not in a low-speed region where the diesel engine 1 stops rotation. In the step S316, it is determined whether or not the feedback permission flag fefb is 1. In the step S317, it is determined whether or not the learning value reflection permission flag felrn2 is 1.

Only when all of the conditions of the steps S2312–S317 are satisfied, the subroutine proceeds to a step S318 and increments a timer value Ctrln.

In a following step S320, it is determined whether or not the timer value Ctrln exceeds a predetermined value TMRLN#. The predetermined value TMRLN# is set to 4 seconds. When the result of this determination is affirmative, the subroutine sets the learning permission flag felrn to 1 in a step S321, and the subroutine is terminated. On the other hand, if any of the conditions of the steps S312–S317 are not satisfied, in a step S319, the subroutine resets the timer value Ctrln to 0, and proceeds to a following step S322. The subroutine also proceeds to the step S322 when the determination of the step S320 is negative. In the step S322, the learning permission flag felrn is reset to 0, and the subroutine is terminated.

Referring again to FIG. 50, after reading this feedback permission flag fefb, learning value reflection permission flag felrn2 and learning permission flag felrn, in a step S254, the control unit 41 determines whether or not the feedback permission flag fefb is 1.

When the feedback permission flag fefb is 1, after calculating the feedback correction coefficient Kqac00 of the EGR amount in a step S255, and the feedback correction coefficient Kqac0 of the EGR valve flow velocity Cqe in a step S256, the control unit 41 proceeds to a step S259.

On the other hand, when the feedback permission flag fefb is not 1 in the step S254, the control unit 41 sets the feedback correction coefficient Kqac00 of the EGR amount to 1 in a step S257, sets the feedback correction coefficient Kqac0 to 1 in a following step S258, and then proceeds to the step S259.

Now, the calculation of the feedback correction coefficient Kqac00 of the EGR amount performed in the step S255 and the calculation of the feedback correction coefficient Kqac0 of the EGR velocity performed in the step S256, will be described.

Figure 54:
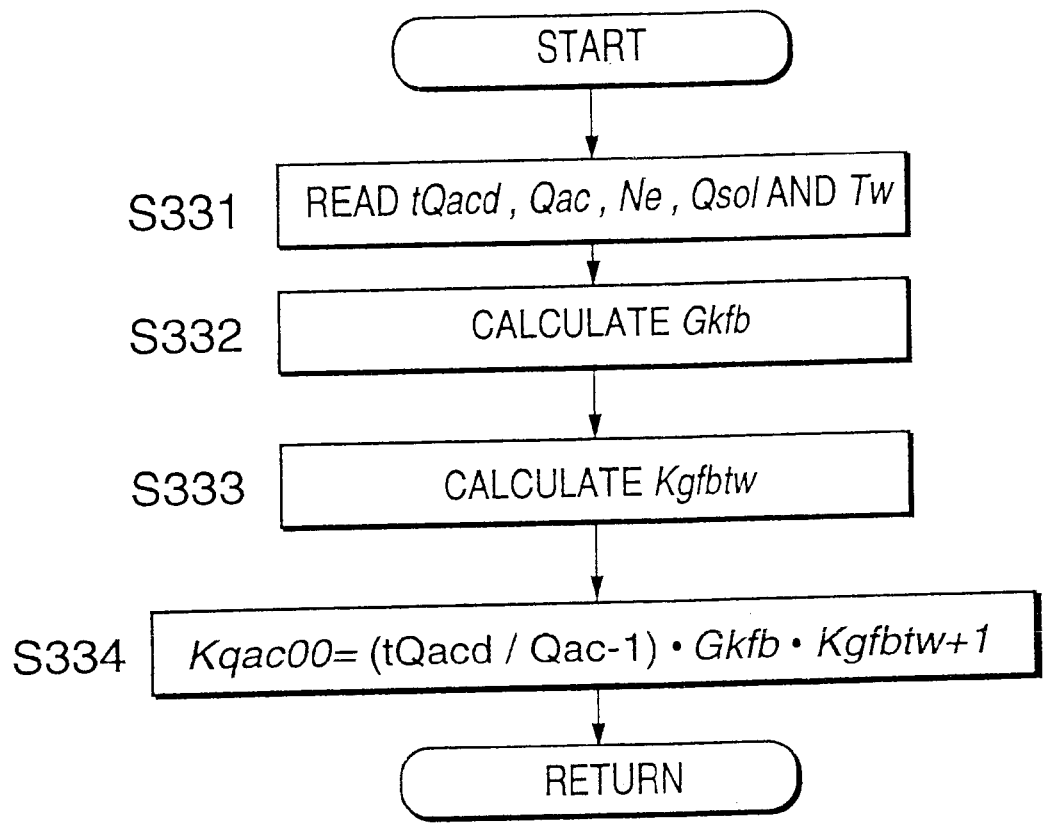
FIG. 54 is a flowchart describing a subroutine for calculating the EGR amount feedback correction coefficient Kqac00 performed by the control unit.

The calculation of the feedback correction coefficient Kqac00 of the EGR amount is performed by a subroutine of FIG. 54.

Referring to FIG. 54, in a step S331, the control unit 41 first reads the delay processing value tQacd of the target intake air amount, cylinder intake fresh air amount Qac, engine rotation speed Ne, target fuel injection amount Qsol and the cooling water temperature Tw. The delay processing value tQacd is a value calculated in the step S252 of FIG. 50.

Figure 55:
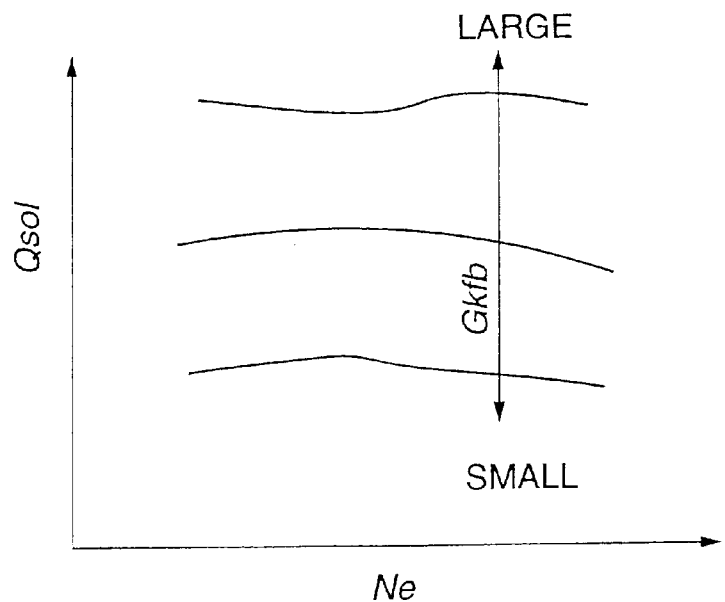
FIG. 55 is a diagram describing the contents of a map of a correction gain Gkfb of an exhaust gas recirculation flowrate stored by the control unit.
Figure 56:
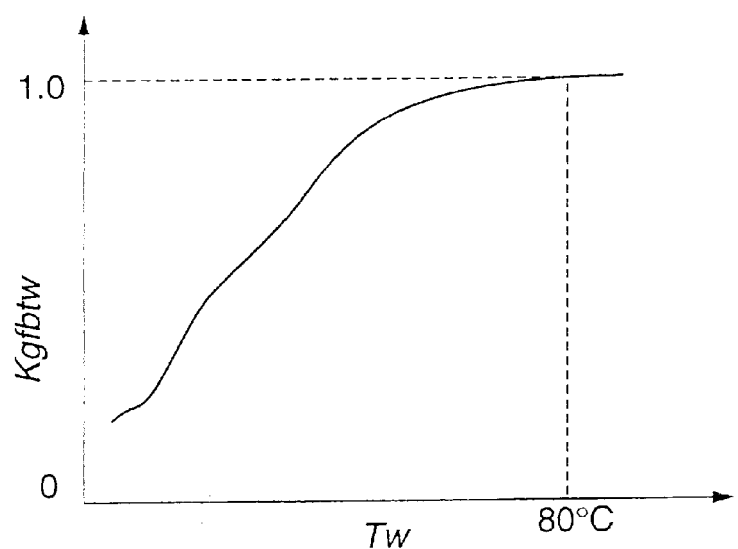
FIG. 56 is a diagram describing the contents of a map of a water temperature correction coefficient KgfbTw stored by the control unit.

In a step S332, a correction gain Gkfb of the EGR flowrate is calculated by looking up a map shown in FIG. 55 previously stored in the memory of the control unit 41, based on the engine rotation speed Ne and the target fuel injection amount Qsol. In a following step S333, a water temperature correction coefficient KgfbTw of the correction gain is calculated by looking up a map shown in FIG. 56 previously stored in the memory of the control unit 41, based on the cooling water temperature Tw.

In a final step S334, the feedback correction coefficient Kqac00 of the EGR amount is calculated by the following equation (22), using the correction gain Gkfb and the water temperature correction coefficient KgfbTw.

$$Kqac00=(tQacd/Qac-1)\cdot Gkfb\cdot Kgfbtw+1 \quad (22)$$

(tQacd/Qac−1), the first term on the right hand side of equation (22), is an error ratio of the target intake air amount delay processing value tQacd relative to the cylinder intake fresh air amount Qac. Therefore, the feedback correction coefficient Kqac00 of the EGR amount is a value centered on 1.

Figure 57:
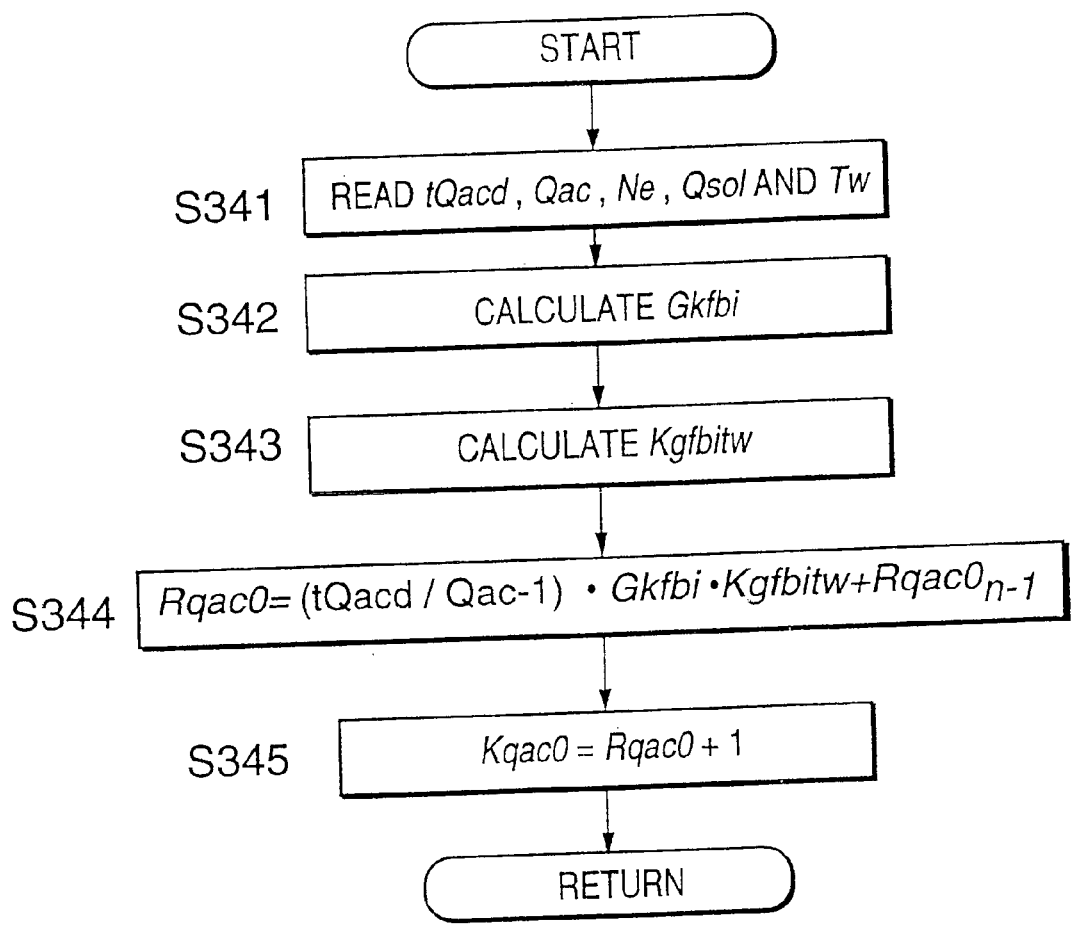
FIG. 57 is a flowchart describing a subroutine for calculating the EGR flow velocity feedback correction coefficient Kqac0 performed by the control unit.

The calculation of the feedback correction coefficient Kqac0 of the EGR valve flow velocity is performed by a subroutine shown in FIG. 57.

Referring to FIG. 57, in a step S341, the control unit 41 first reads the delay processing value tQacd, cylinder intake fresh air amount Qac, engine rotation speed Ne, target fuel injection amount Qsol and the cooling water temperature Tw.

Figure 58:
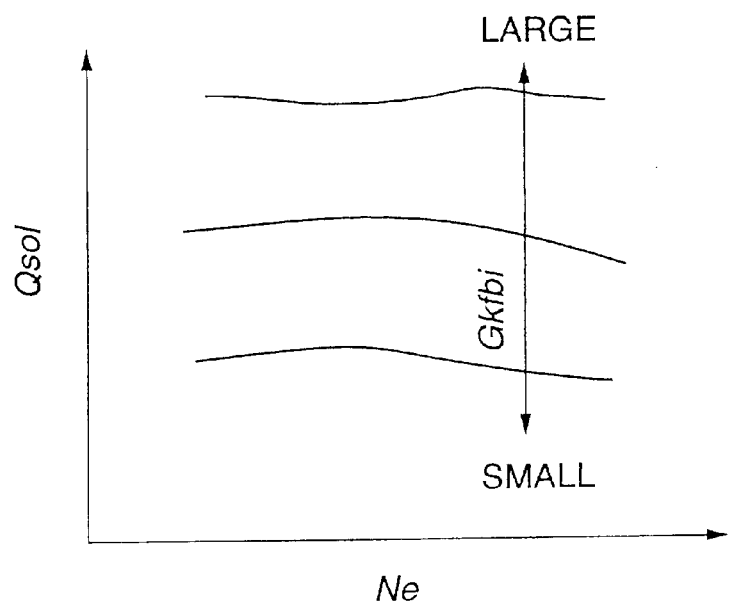
FIG. 58 is a diagram describing the contents of a map of a correction gain Gkfbi of the exhaust gas recirculation flow velocity stored by the control unit.

In a step S342, a correction gain Gkfbi of the EGR valve flow velocity is calculated by looking up a map shown in FIG. 58 previously stored in the memory of the control unit 41, based on the engine rotation speed Ne and the fuel injection amount Qsol.

Figure 59:
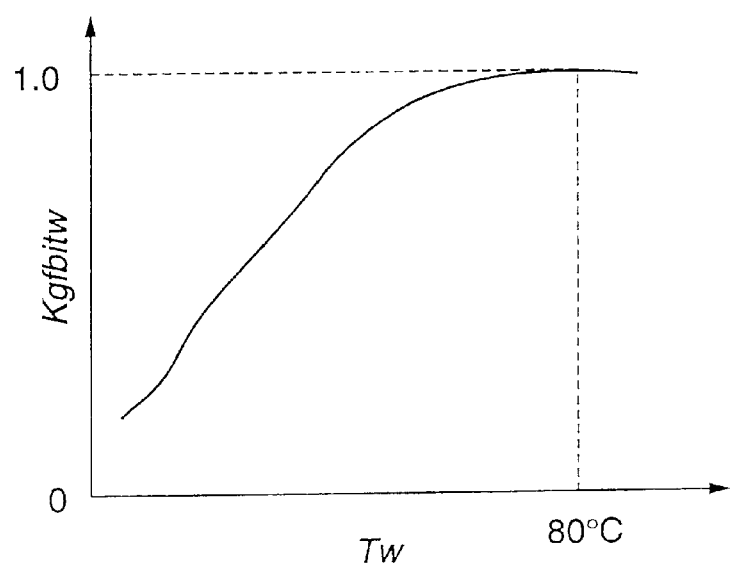
FIG. 59 is a diagram describing the contents of a map of a water temperature correction coefficient KgfbiTw stored by the control unit.

In a step S343, a water temperature correction coefficient KgfbiTw of the correction gain is calculated by looking up a map shown in FIG. 59 previously stored in the memory of the control unit 41, based on the cooling water temperature Tw.

In a following step S344, an error ratio Rqac0 is calculated by the following equation (23), using the correction gain Gkfbi and the water temperature correction coefficient KgfbiTw.

$$Rqac0=(tQacd/Qac-1)\cdot Gkfbi\cdot Kgfbitw+Rqac0_{n-1} \quad (23)$$

where, $Rqac0_{n-1}$=Rqac0 calculated on the immediately preceding occasion the subroutine was executed.

In a following step S345, by adding 1 to the error ratio Rqac0, the EGR flow velocity feedback correction coefficient Kqac0 is calculated. Therefore, the feedback correction coefficient Kqac0 of the EGR valve flow velocity is a value proportional to the integral of the error ratio.

Now, referring again to FIG. 50, after setting the feedback correction coefficient Kqac00 of the EGR amount and the feedback correction coefficient Kqac0 of the EGR valve flow velocity, in the step S259, the control unit 41 determines whether or not the learning value reflection permission flag felrn2 is 1.

Figure 60:
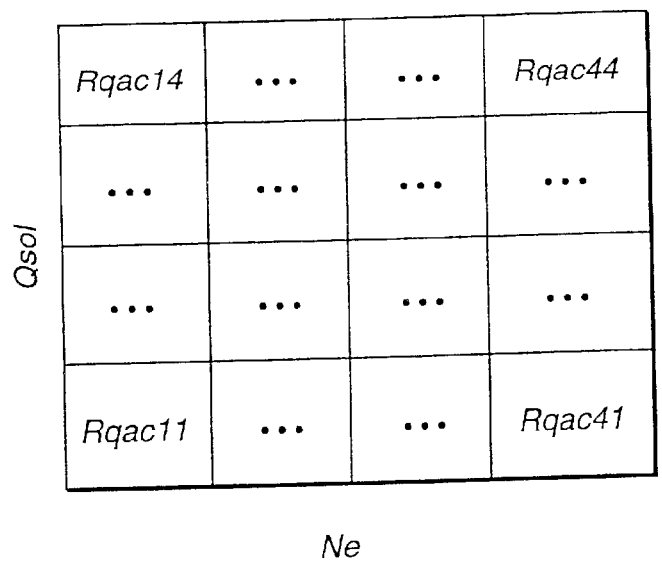
FIG. 60 is a diagram describing the contents of a map of an error rate learning value $Rqac_n$ stored by the control unit.

When the learning value reflection permission flag felrn2 is 1, i.e., when reflection in EGR amount control of the learning value is permitted, in a step S260, the control unit 41 reads the error ratio learning value $Rqac_n$ by looking up a map shown in FIG. 60 previously stored in the memory of the control unit 41, based on the engine rotation speed Ne and the target fuel injection amount Qsol. In a next step S261, the EGR flow velocity learning correction coefficient Kqac is calculated by adding 1 to the error ratio learning value $Rqac_n$.

When the learning value reflection permission flag felrn2 is not 1 in the step S259, the control unit 41 sets the EGR flow velocity learning correction coefficient Kqac to 1 in a step S262.

After the processing of the step S261 or step S262, in a step S263, the control unit 41 determines whether or not the learning permission flag felrn is 1.

When the learning permission flag felrn is 1, in a step S264, the control unit 41 subtracts 1 from the EGR flow velocity feedback correction coefficient Kqac0 to calculate the current value Rqacp of the error ratio. In a following step S266, the learning value is updated using the subroutine of FIG. 61, and the subroutine is terminated.

When the learning permission flag felrn is not 1, in a step S265, the control unit 41 resets the current value Rqacp of the error ratio to 0, and terminates the subroutine of FIG. 50.

Next, the updating of the learning value performed in the step S266 will be described.

Figure 61:
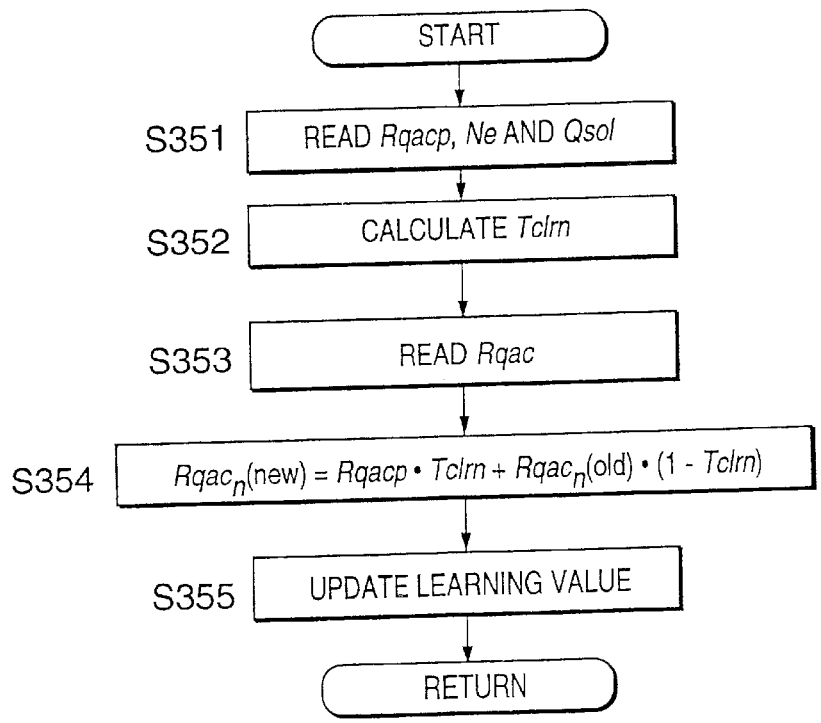
FIG. 61 is a flowchart describing a routine for updating a learning value performed by the control unit

Referring to FIG. 61, in a step S351, the control unit 41 first reads the engine rotation speed Ne, target fuel injection amount Qsol and error ratio Rqacp calculated in the step S264.

Figure 62:
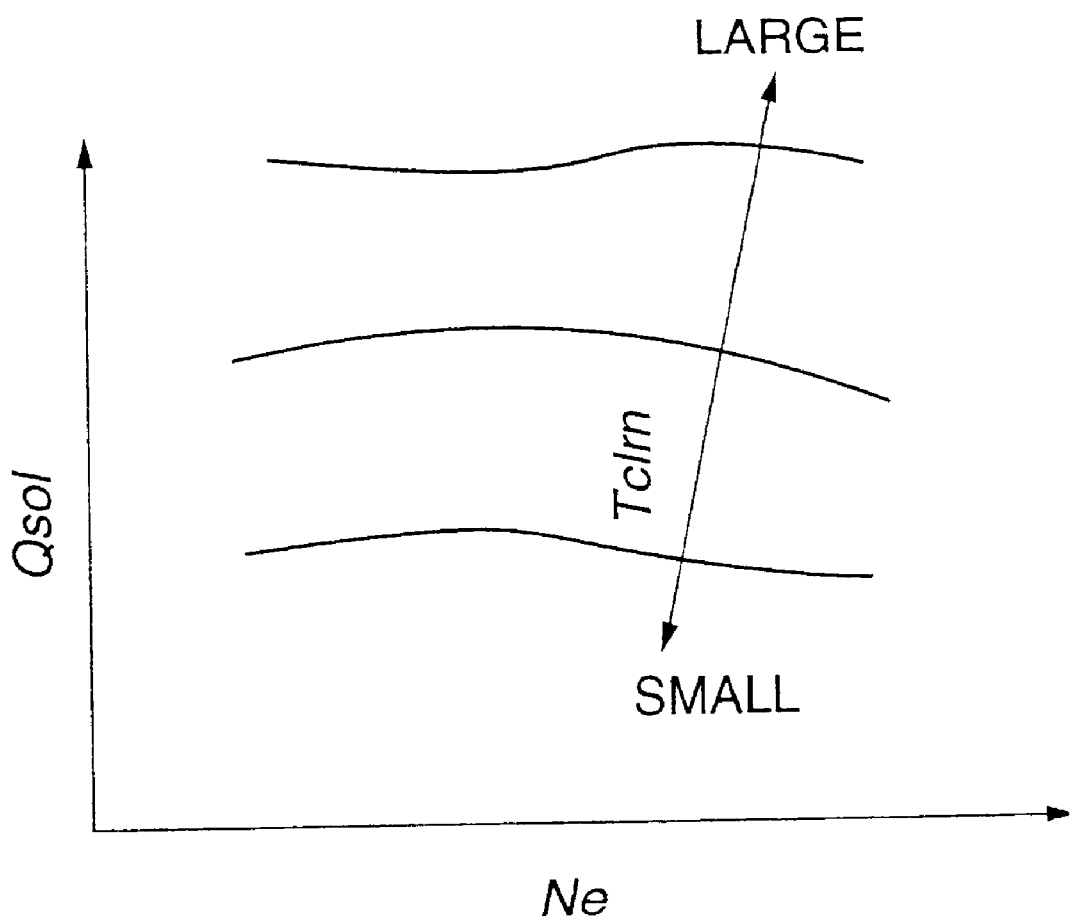
FIG. 62 is a diagram describing the contents of a map of a learning rate Tclrn stored by the control unit.

In a step S352, a learning rate Tclrn is calculated by looking up a map shown in FIG. 62 previously stored in the memory of the control unit 41, based on the engine rotation speed Ne and target fuel injection amount Qsol.

In a step S353, the error ratio learning value $Rqac_n$ is calculated by looking up the aforesaid map of FIG. 60, based on the engine rotation speed Ne and target fuel injection amount Qsol.

In a following step S354, weighted average processing by the following formula (24) is added to the error ratio Rqacp read in the step S351, and updating of the error ratio learning value is performed.

$$Rqac_n(\text{new})=Rqacp\cdot Tclrn+Rqac_n(\text{old})\cdot(1-Tclrn) \quad (24)$$

where,

Rqac$_n$(new)=error ratio learning value Rqac$_n$ to be written on the map,

Rqacp=error ratio read in the step S351, and

Rqac$_n$(old)=error ratio learning value Rqac$_n$ read from the map in the step S353.

In a next step S355, the stored value of the map of FIG. 60 is overwritten using the error ratio learning value Rqac$_n$ (new) calculated in this way.

By terminating the subroutine of FIG. 61, the control unit 41 terminates the processing of the subroutine of FIG. 50.

Referring again to FIG. 63, the control unit 41 calculates in a step S363 a corrected real EGR amount Qec_h by the following equation (25) using the EGR flow velocity feedback correction coefficient Kqac0 and EGR flow velocity learning correction coefficient Kqac calculated in the step S362.

$$Qec\_h = Qec \cdot Kqac \cdot Kqac0 \quad (25)$$

In steps S364–S367, an initial value of the corrected real EGR amount Qec_h when EGR operation begins, is set. In the step S364, it is determined whether or not the corrected real EGR amount Qec_h is 0. When Qec_h is 0, i.e. when EGR is not operating, the corrected real EGR amount Qec_h is set by the following equation (26) in a step S365, and the routine proceeds to a step S366. When the corrected real EGR amount is not 0 in the step S364, the routine bypasses the step S365 and proceeds to the step S366.

$$Qec\_h = Qac \cdot MEGRL\# \quad (26)$$

where,

MEGRL#=constant.

In the step S366, it is determined whether or not the real EGR rate Megrd is 0. When the real EGR rate Megrd is 0, the real EGR rate Megrd is set equal to the constant MEGRL# in the step S367, and the routine proceeds to a step S368. When the real EGR rate Megrd is not 0, the routine bypasses the step S367 and proceeds to the step S368.

When the EGR valve 6 is fully closed, the EGR valve flow velocity of the EGR valve 6 is 0, and equations (25) and (26) are equations for setting the initial value of parameters used for flow velocity calculations when EGR operation starts, i.e., when the EGR valve 6 begins to open. The constant MEGRL# may be set to, for example, 0.5.

The differential pressure upstream and downstream of the EGR valve 6 when EGR operation starts is different according to the running conditions of the diesel engine 1, and as a result, the EGR valve flow velocity when EGR operation starts also differs. The differential pressure upstream and downstream of the EGR valve 6 when the EGR valve 6 begins to open, depends on the cylinder intake fresh air amount Qac. Thus, the calculation precision of the EGR valve flow velocity when EGR operation starts, can be improved by making the initial value of Qec_h directly proportional to the cylinder intake fresh air amount Qac by equation (26).

Figure 64:
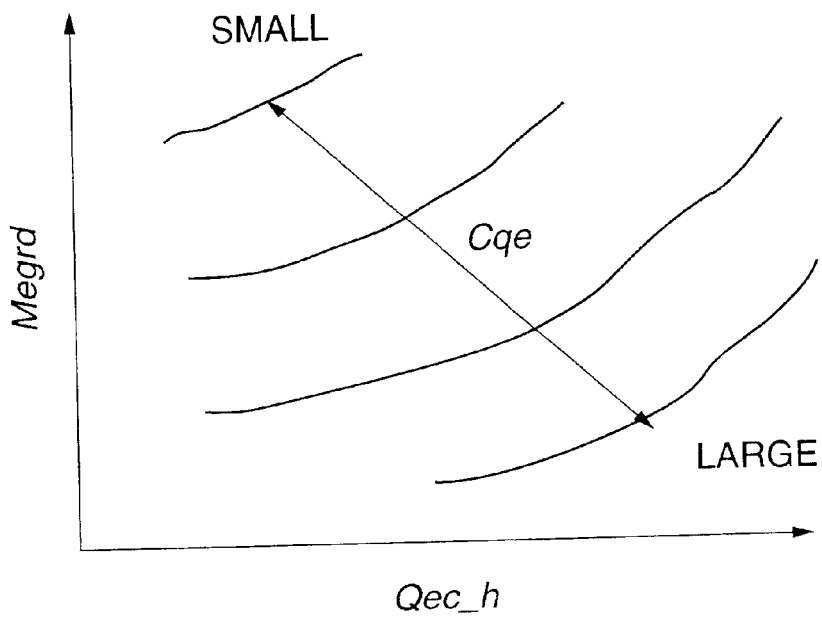
FIG. 64 is a diagram describing the contents of a map of the EGR valve flow velocity Cqe stored by the control unit.

Now, in the step S368, the control unit 41 calculates the EGR valve flow velocity Cqe by looking up a map shown in FIG. 64 which is previously stored in the memory of the control unit 41, based on the corrected real EGR amount Qec_h and real EGR rate Megrd, and the subroutine is terminated.

Figure 5:
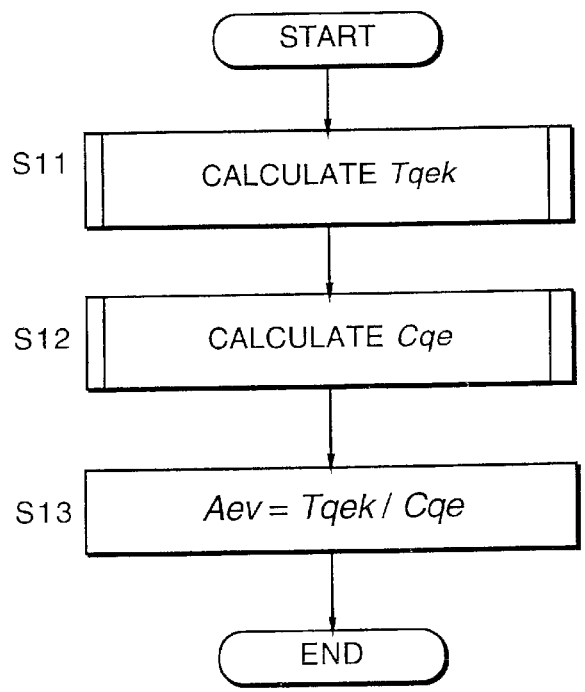
FIG. 5 is a flowchart describing a routine for calculating an EGR valve opening area Aev performed by the controller.

When the subroutine is terminated, the control unit 41 terminates processing of a step S12 in FIG. 5. In a subsequent step S13 of FIG. 5, the control unit 41 calculates an EGR valve opening surface area Aev by the following equation (27) using the target EGR amount TqeK per unit time calculated in the step S11, and the EGR valve flow velocity Cqe calculated min the step S12.

$$Aev = Tqek / Cqe \quad (27)$$

Figure 6:
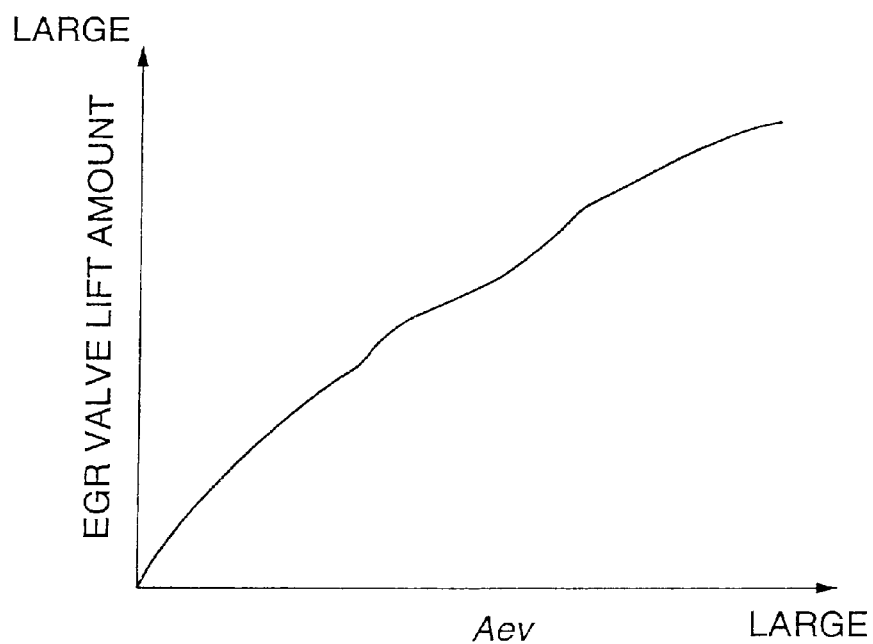
FIG. 6 is a diagram describing the contents of an EGR valve lift amount map stored by the controller.

The target EGR valve opening surface area Aev obtained is converted to a lift amount or a corresponding signal to the pressure control valve 5 using, for example, the map of FIG. 6. The control unit 41 controls the opening of the EGR valve 6 to the target EGR valve opening surface area Aev by outputting the signal to the pressure control valve 5 which drives the EGR valve 6, based on these parameters.

As shown in the map of FIG. 64, the characteristics of the EGR valve flow velocity Cqe are nonlinear, and the sensitivity of feedback control of the EGR valve flow velocity Cqe is also easily affected by the running conditions of the diesel engine 1. As a result, the value of the EGR valve flow velocity Cqe may be unstable if the feedback correction coefficient Kqac0 of the EGR valve flow velocity is immediately multiplied by the EGR valve flow velocity. Thus, the feedback correction coefficient Kqac0 of the EGR valve flow velocity is used in equation (25) for the calculation of the corrected real EGR rate Qec_h instead of multiplying by the EGR valve flow velocity Cqe. In this way, by calculating the EGR valve flow velocity Cqe using the map of FIG. 64 from the corrected real EGR amount Qec_h, redundancy of feedback control of the EGR valve flow velocity Cqe is maintained, and scatter in the sensitivity is suppressed.

Further, in the map of FIG. 64, in parts near the right edge where characteristics slope steeply, mismatches tend to occur in the calculation of the EGR valve flow velocity Cqe. If a mismatch occurs in the EGR valve flow velocity Cqe, an error will also occur in the EGR valve opening surface area Aev calculated by equation (27).

To suppress this error, the EGR amount feedback correction amount Kqac00 is applied to the calculation of the target EGR amount Tqek per unit time which is the numerator of equation (27). By equation (22), the EGR amount feedback correction amount Kqac00 is made to be directly proportional to an error rate of the target fresh air delay processing value tQacd relative to the cylinder intake fresh air amount Qac. Due to this proportional control, mismatches in the map of FIG. 64 can be immediately corrected.

In equation (14) for the calculation of the EGR amount feedback correction amount Kqac00, providing that the correction gain Gkfb=1 and warm-up of the diesel engine 1 is complete, equation (22) may be simplified as follows.

$$Kqac00 = (tQacd / Qac - 1) + 1$$

Here, if the cylinder intake fresh air amount Qac is less than the target value tQacd, Kqac00 is a value larger than 1, and the target EGR amount Tqec calculated by equation (20) immediately decreases. As a result, the fresh air amount taken In via the throttle 60 increases relatively, and the cylinder intake fresh air amount Qac converges to the target value tQacd.

This concludes the description of the control of the EGR valve 6.

Next, the control of the variable nozzle 53 of the turbocharger 50 will be described.

The turbocharging pressure is controlled by a duty value Dtyvnt of a signal output to the pressure control valve 56 of the turbocharger 50. When the duty value Dtyvnt is zero, the pressure control valve 56 fully opens, and when the duty value is 1, it is fully closed.

Figure 15:
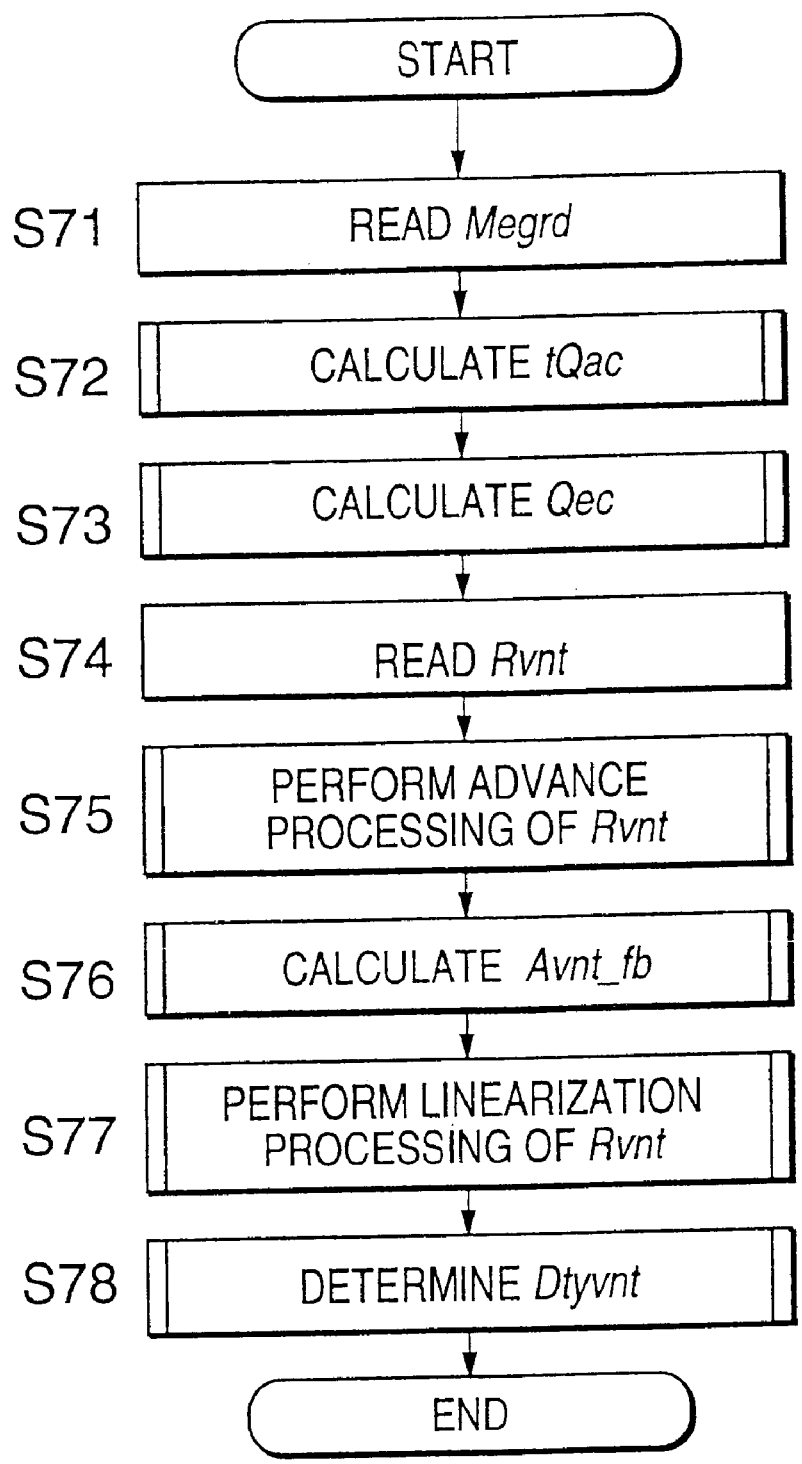
FIG. 15 is a flowchart describing a routine for calculating a duty value Dtyvnt of a pressure control valve of a turbo supercharger performed by a control unit.

The routine shown in FIG. 15 determines the duty value Dtyvnt. This routine is performed at an interval of 10 milliseconds.

First, the control unit 41 reads the real EGR rate Megrd in a step S71. In a step S72, the control unit 41 reads the target intake fresh air amount tQac calculated by the subroutine of FIG. 20.

Figure 24:
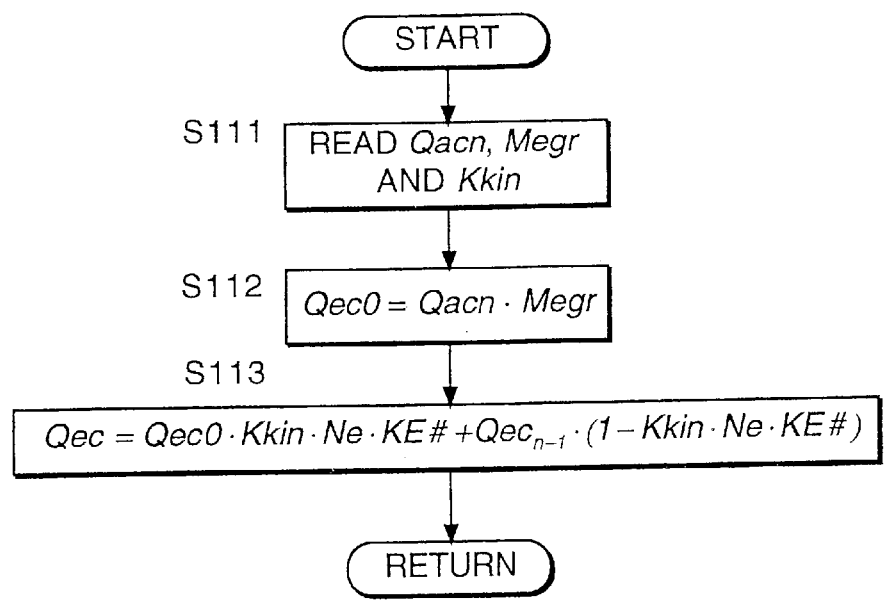
FIG. 24 is a flowchart describing a subroutine for calculating a real EGR amount Qec performed by the control unit.

In a next step S73, the control unit 41 reads the real EGR amount Qec calculated by the routine of FIG. 24.

In a next step S74, the control unit 41 reads a target opening Rvnt of the variable nozzle 53. Here, the opening is a value which expresses the opening area of the variable nozzle 53 as a percentage relative to the opening area when the nozzle is fully open. Therefore, the opening when the nozzle is fully open is 100%, and the opening when it is fully closed is 0%. The opening is used in order to express the opening of the variable nozzle 53 as a universal value which is not affected by the capacity of the turbocharger 50, but the opening area of the variable nozzle 53 may of course also be used.

Figure 25:
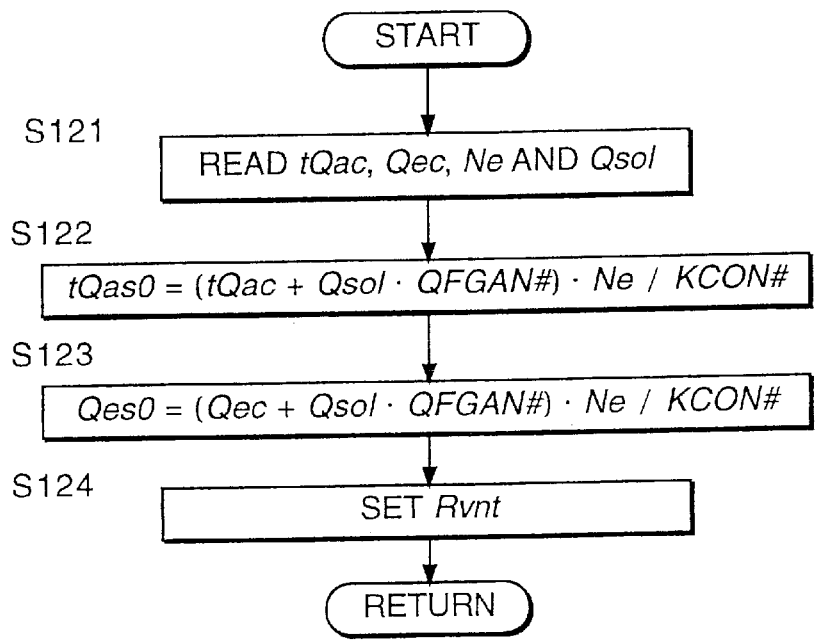
FIG. 25 is a flowchart describing a routine for calculating a target opening Rvnt of a variable fuel injection nozzle performed by the control unit.

The target opening Rvnt of the variable nozzle 53 is calculated by a routine shown in FIG. 25. This routine is performed independently of the main routine of FIG. 15 in synchronism with the REF signal.

Referring to FIG. 25, in a step S121, the control unit 41 first reads the target intake fresh air amount tQac, real EGR amount Qec, engine rotation speed Ne and target fuel injection amount Qsol. In a following step S122, an intake fresh air amount equivalent value tQas0 for calculating the target opening Rvnt of the variable nozzle 53 is calculated by the following equation (28).

$$tQas0=(tQac+Qsol\cdot QFGAN\#)\cdot Ne/KCON\# \quad (28)$$

where,

KCON#=constant.

In a step S123, an EGR amount equivalent value Qes0 is calculated by the following equation (29).

$$Qes0=(Qec+Qsol\cdot QFGAN\#)\cdot Ne/KCON\# \quad (29)$$

In equations (28) and (29), Ne/KCON# is a coefficient for converting the intake air amount per cylinder or the EGR amount into a value per unit time.

Moreover, in equations (28) and (29), Qsol·QFGAN# is added to the target intake fresh air amount tQac or the real EGR amount Qec in order to vary the target opening Rvnt according to the load of the diesel engine 1.

The effect of the target fuel injection amount Qsol, which represents the load of the diesel engine 1, is adjusted by the gain QFGAN#. In the following description, tQas0 calculated in this way is referred to as a set intake fresh air amount equivalent value, and Qes0 is referred to as a set EGR amount equivalent value.

Figure 26:
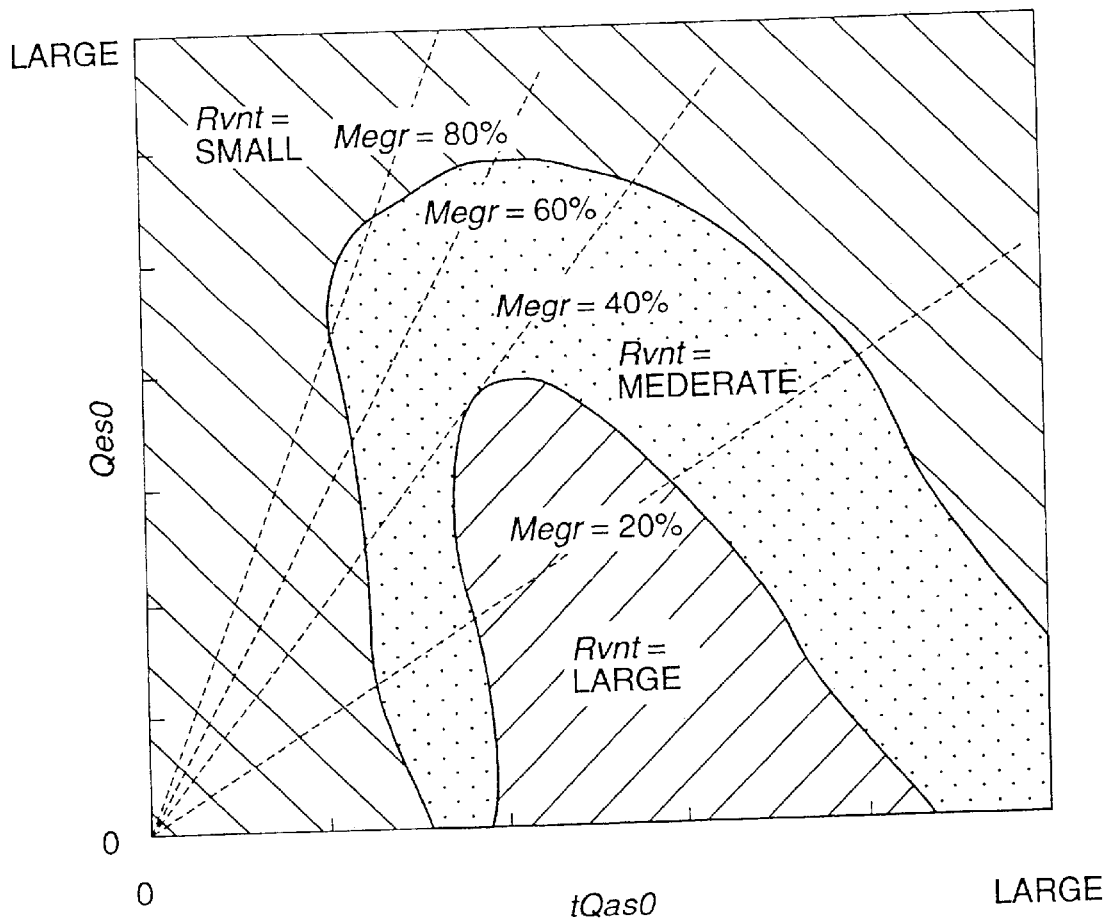
FIG. 26 is a diagram describing the contents of a map of the target opening Rvnt stored by the control unit.

In a following step S124, the target opening Rvnt of the variable nozzle 53 is calculated by looking up a map shown in FIG. 26 stored beforehand based on the set intake fresh air amount equivalent value tQas0 and the set EGR amount equivalent value Qes0. This map is stored beforehand in the memory of the control unit 41.

Describing the characteristics of the target opening Rvnt specified by this map, in the region on the right-hand side of the figure where the set intake fresh air amount equivalent value tQas0 is large, the target opening Rvnt decreases with increase of the set EGR amount equivalent value Qes0. This is due to the following reason. Fresh air decreases as the EGR amount increases, and as a result, the air-fuel ratio becomes rich and smoke is easily generated. To avoid this situation, the target opening Rvnt is decreased and the fresh air intake amount is increased by raising the turbocharging pressure of the turbocharger 50 the more the EGR amount increases.

In the region on the left-hand side of the figure where the set intake fresh air amount equivalent value tQas0 is small, the turbocharging efficiency of the turbocharger 50 is small. In this map, in this region, the target opening Rvnt is decreased as the set intake fresh air amount equivalent value tQas0 decreases. This is because the exhaust pressure required to rotate the exhaust gas turbine 52 is difficult to establish if the target opening Rvnt is increased in this region. It is also because, when the vehicle is accelerated by fully opening the accelerator pedal, the acceleration effect due to turbocharging is larger if the initial opening of the variable nozzle 53 is small. In the figure, the target opening Rvnt of the region indicated by Rvnt=Small is about 20%. The target opening Rvnt of the region indicated by Rvnt=Large is set to about 30% when fuel-cost performance is emphasized, and to about 60% when exhaust gas purification is emphasized.

Figure 29:
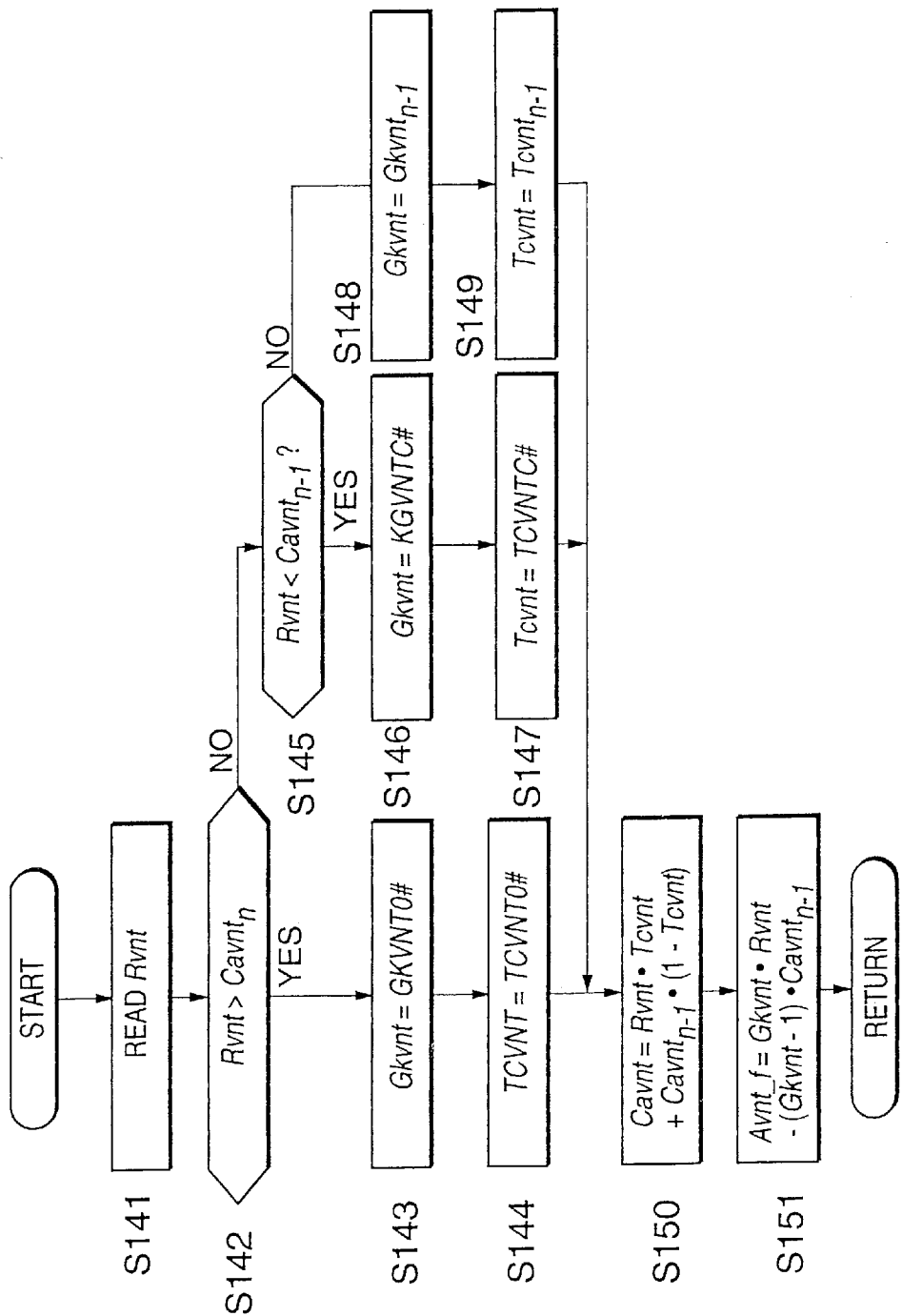
FIG. 29 is a flowchart describing a routine for calculating an open loop control amount Avnt_f of the target opening performed by the control unit.

Now, after reading the target opening Rvnt in the step S74 of FIG. 15, the control unit 41, in a step S75, adds advance processing to the target opening Rvnt using the subroutine shown in FIG. 29. This advance processing aims to compensate the operating delay based on the time required to operate the pressure actuator 54 which drives the variable nozzle 53. This processing is needed as the operation of the pressure actuator 54 using the pressure control valve 56 and the diaphragm actuator 59 has a large response delay compared to a step motor.

Referring to FIG. 29, the control unit 41 first reads the target opening Rvnt in a step S141.

In a step S142, an opening prediction value $Cavnt_{n-1}$ calculated on the immediately preceding occasion when the subroutine was executed, is compared with the target opening Rvnt. The opening prediction value $Cavnt_{n-1}$ will be described in a later step S150.

When Rvnt>$Cavnt_{n-1}$, the variable nozzle 53 is operating in the opening direction. In this case, in a step S143, the subroutine sets a advance correction gain Gkvnt as a predetermined value GKVNTO#, sets a advance correction time constant equivalent value Tcvnt as a predetermined value TCVNTO# in a step S144, and proceeds to the step S150.

Here, the time constant equivalent value Tcvnt is the inverse of a time constant, and shows that the response is faster for a larger value.

On the other hand, when Rvnt$\leq$$Cavnt_{n-1}$ in the step S142, the subroutine determines whether or not Rvnt<$Cavnt_{n-1}$ in a step S145.

When Rvnt<$Cavnt_{n-1}$, the variable nozzle 53 is operating in the closing direction. In this case, the subroutine sets the advance correction gain Gkvnt to a predetermined value GKVNTC# in a step S146, sets the advance correction time constant equivalent value Tcvnt to a predetermined value TCVNTC# in a step S147, and proceeds to the step S150. Herein, GKVNTO#<GKVNTC# and TCVNTO#<TCVNTC#.

The reason for this setting is that, when the variable nozzle 53 is being closed, the exhaust gas pressure works as a resistance force, hence it is desirable to set the gain larger and set the time constant smaller than when the nozzle is being opened to expedite the operation of the variable nozzle 53. Making the time constant small means making the time constant equivalent value Tcvnt large, as mentioned above.

In a step S145, when the target opening Rvnt is not smaller than the opening prediction value $Cavnt_{n-1}$, i.e., Rvnt is equal to $Cavnt_{n-1}$, the subroutine sets the advance correction gain Gkvnt equal to the immediately preceding value $Gkvn_{n-1}$ in a step S148, sets the advance correction time constant equivalent value Tcvnt equal to the immediately preceding value Tcvnt$_{n-1}$, and proceeds to the step S150.

In the step S150, an opening prediction value Cavnt is calculated from the equation (30) below using the advance correction time constant equivalent value Tcvnt and the target opening Rvnt.

$$Cavnt=Rvnt \cdot Tcvnt+Cavnt_{n-1} \cdot (1-Tcvnt) \tag{30}$$

where,

Cavnt$_{n-1}$=Cavnt calculated on the immediately preceding occasion the subroutine was executed.

In a subsequent step S151, an open loop control amount Avnt_f of the target opening is calculated by the following equation (31) using the opening prediction value Cavnt and the target opening Rvnt.

$$Avnt\_f=Gkvnt \cdot Rvnt-(Gkvnt-1) \cdot Cavnt_{n-1} \tag{31}$$

Figure 30:
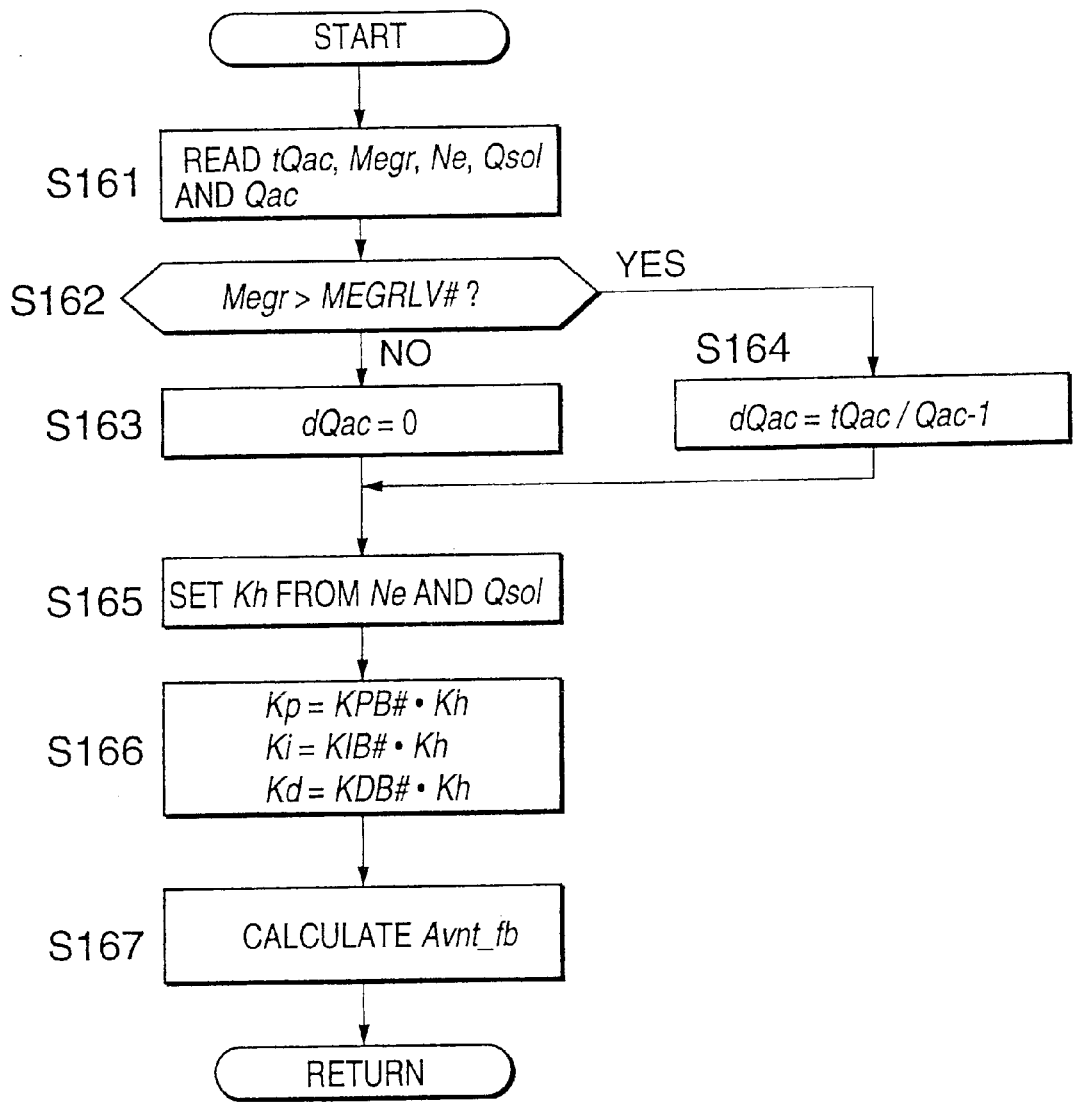
FIG. 30 is a flowchart describing a routine for calculating a feedback control amount Avnt_fb of the target opening performed by the control unit.

After executing the subroutine of FIG. 29, the control unit 41 returns to the routine of FIG. 15, and calculates a feedback correction amount Avnt_fb of the target opening Rvnt using the subroutine shown in FIG. 30 in a step S76.

Referring to FIG. 30, the control unit 41 first reads the target intake fresh air amount tQac, target EGR rate Megr, engine rotation speed Ne, target fuel injection amount Qsol and the cylinder intake fresh air amount Qac in a step S161.

In a step S162, the target EGR rate Megr is compared with the predetermined value MEGRLV#. The predetermined value MEGRLV# is the same as that which was used in the step S102 of FIG. 20. Herein, it is determined whether or not to perform exhaust gas recirculation by comparing the target EGR rate Megr with the predetermined value MEGRLV#.

Megr≧MEGRLV# is a region where exhaust gas recirculation should be performed. In this case, the subroutine proceeds to a step S164, and an error rate dQac of the target intake fresh air amount tQac is calculated relative to the cylinder intake fresh air amount Qac by the following equation (32).

$$dQac=(tQac/Qac)-1 \tag{32}$$

When the target intake fresh air amount tQac is larger than the cylinder intake fresh air amount Qac, the error rate doac takes a positive value, and when the target intake fresh air amount tQac is smaller than the cylinder intake fresh air amount Qac, the error rate doac takes a negative value.

If the target intake fresh air amount tQac is equal to the cylinder intake fresh air amount Qac, the error rate dQac is zero.

Megr<MEGRLV# is a region in which exhaust gas recirculation is not performed. In this case, the subroutine sets the error rate dQac to 0 in a step S163.

After setting the error rate dQac, the subroutine proceeds to a step S165.

In the step S165, a feedback gain correction coefficient Kh used for feedback control of the target opening Rvnt is calculated, from the engine rotation speed Ne and the target fuel injection amount Qsol, by looking up a map stored beforehand in the control unit 41. The map is set so as to increase the correction coefficient Kh the larger the load of the diesel engine 1 represented by the target fuel injection amount Qsol, and the larger the rotation speed Ne of the diesel engine 1.

In a following step S166, a proportional feedback gain Kp, integral feedback gain Ki and differential feedback gain Kd are calculated by multiplying the correction coefficient Kh by a proportion constant KPB#, integral constant KIB# and differential constant KDB#, respectively.

In a step S167, based on these gains, the feedback control amount Avnt_fb of the target opening Rvnt of the variable nozzle 53 is calculated using proportional/integral/differential control equations known in the art.

Figure 31:
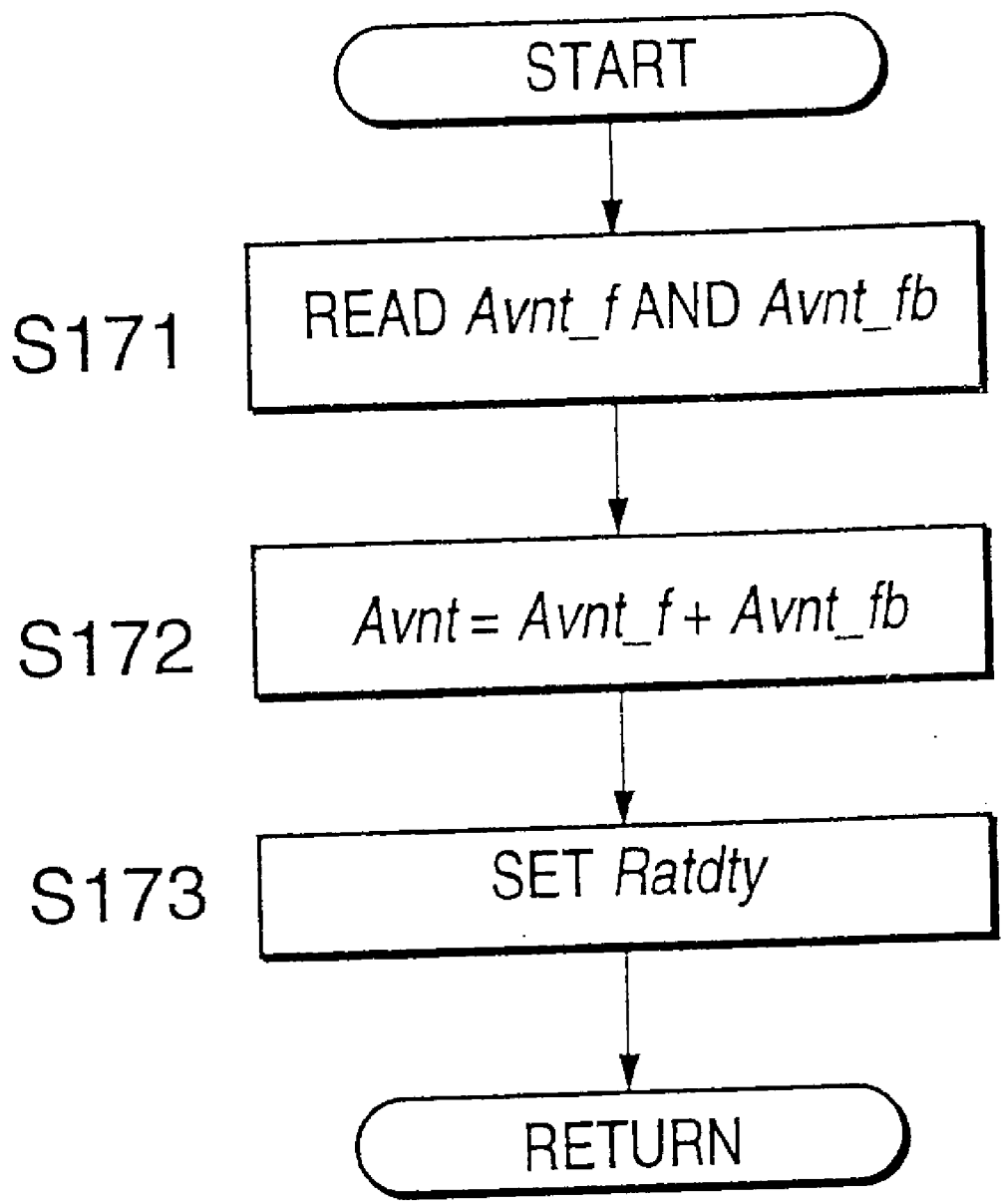
FIG. 31 is a flowchart describing a subroutine for performing linearization processing on the target opening performed by the control unit.

After the above calculation, the control unit 41 returns to the routine of FIG. 15, and performs linearization processing on the target opening Rvnt using a subroutine shown in FIG. 31 in a step S77.

Referring to FIG. 31, in a step 171, the control unit 41 reads the open loop control amount Avnt_f and the feedback control amount Avnt_fb of the target opening Rvnt.

In a next step S172, a command opening Avnt is calculated by summing these control amounts.

Figure 32:
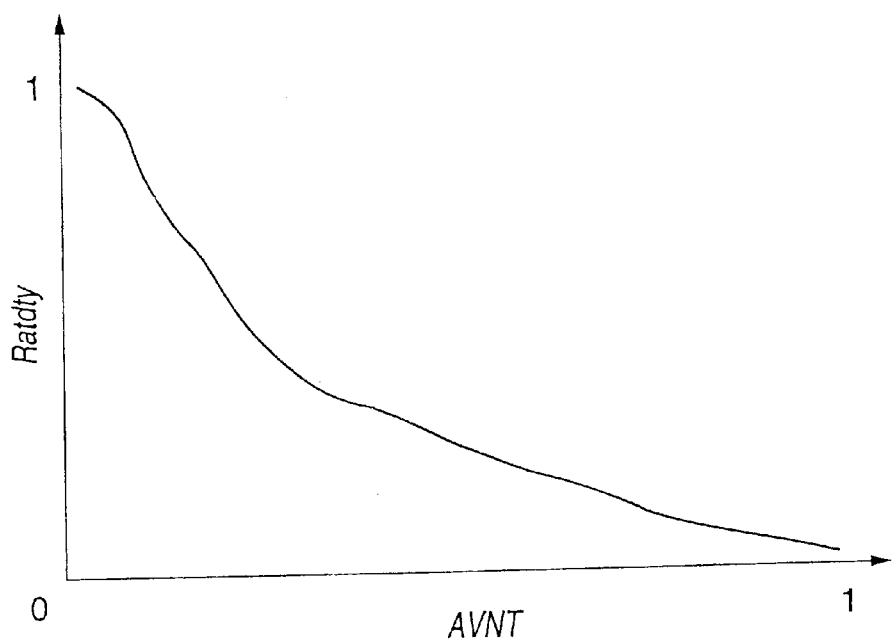
FIG. 32 is a diagram describing the contents of a map of the target opening Rvnt stored by the control unit.

In a following step S173, a linearization processing value Ratdty of the command opening Avnt is calculated from the command opening Avnt by looking up a map of FIG. 32 previously stored in the memory of the control unit 41.

Figure 34:
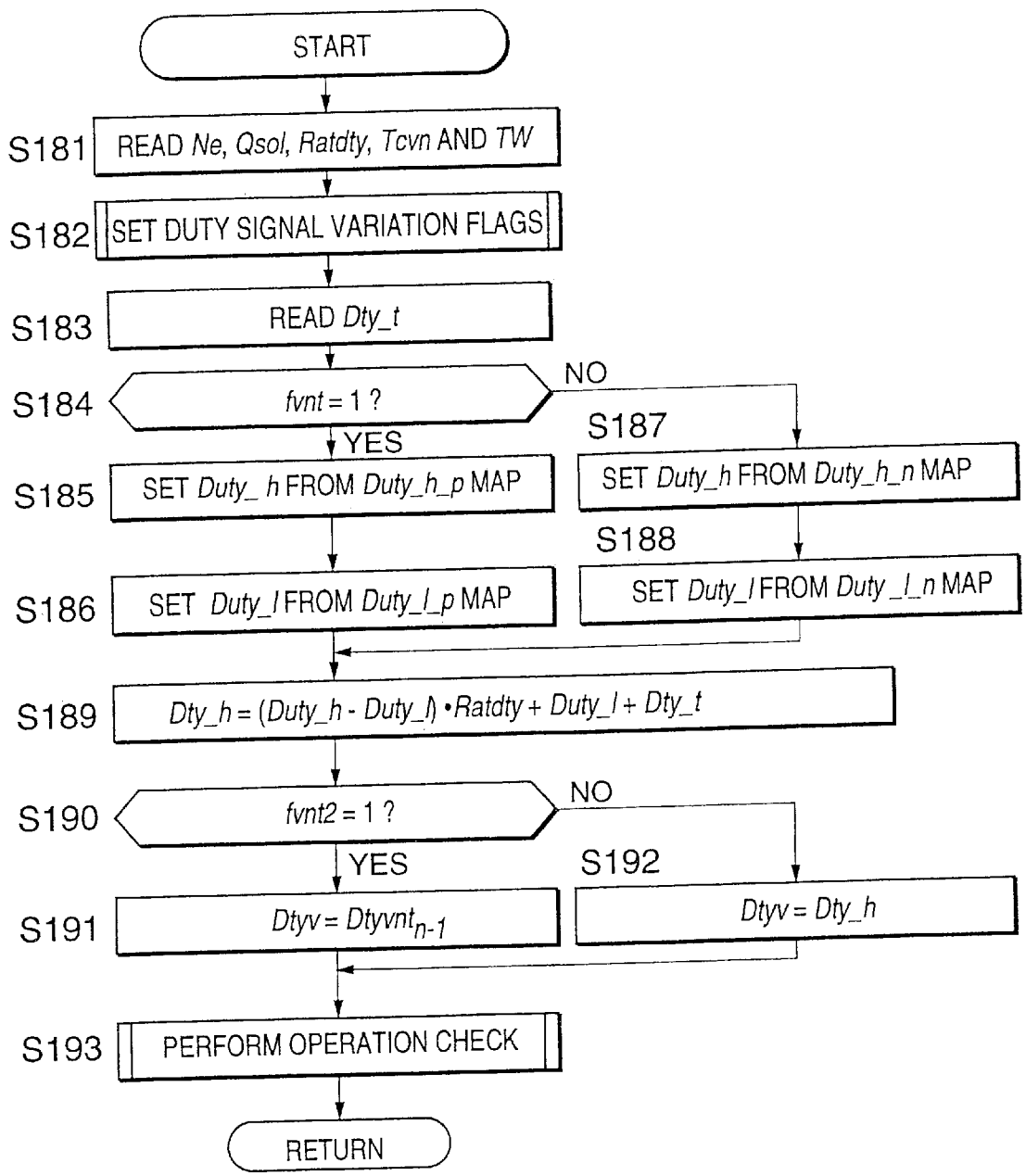
FIG. 34 is a flowchart describing a subroutine for setting the duty value Dtyvnt of the pressure control valve of the turbocharger performed by the control unit.

After this processing, the control unit 41 returns again to the routine of FIG. 15, and determines the duty value Dtyvnt using a subroutine shown in FIG. 34 in a step S78.

Figure 33:
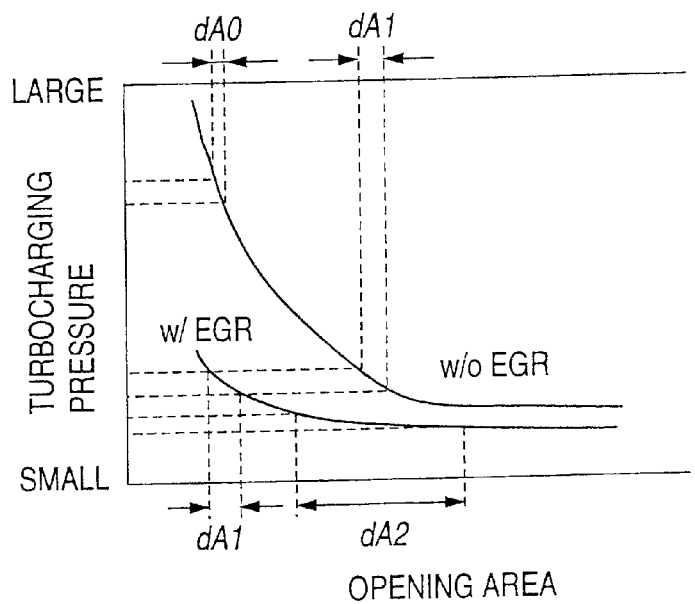
FIG. 33 is a diagram describing a relation between an opening area of a variable nozzle, and a turbocharging pressure.

The subroutine of FIG. 34 sets the duty value Dtyvnt of the signal output to the pressure control valve 56 of the variable nozzle 53. This linearization is required for the following reason. In FIG. 33, the opening area dA0 and dA1 are different while the variation width of turbocharging pressure is the same when EGR is not performed. When EGR is performed, this difference may be even larger. In other words, with a fixed feedback gain, it is difficult to control precisely the turbocharging pressure. In order to ensure the prompt response of the turbocharging pressure, the feedback gain Kh is set to vary according to running conditions.

Referring to FIG. 34, in a step S181, the control unit 41 reads the engine rotation speed Ne, target fuel injection amount Qsol, linearization processing value Ratdty of the command opening, advance correction time constant equivalent value Tcvnt and cooling water temperature Tw of the diesel engine 1.

Figure 35:
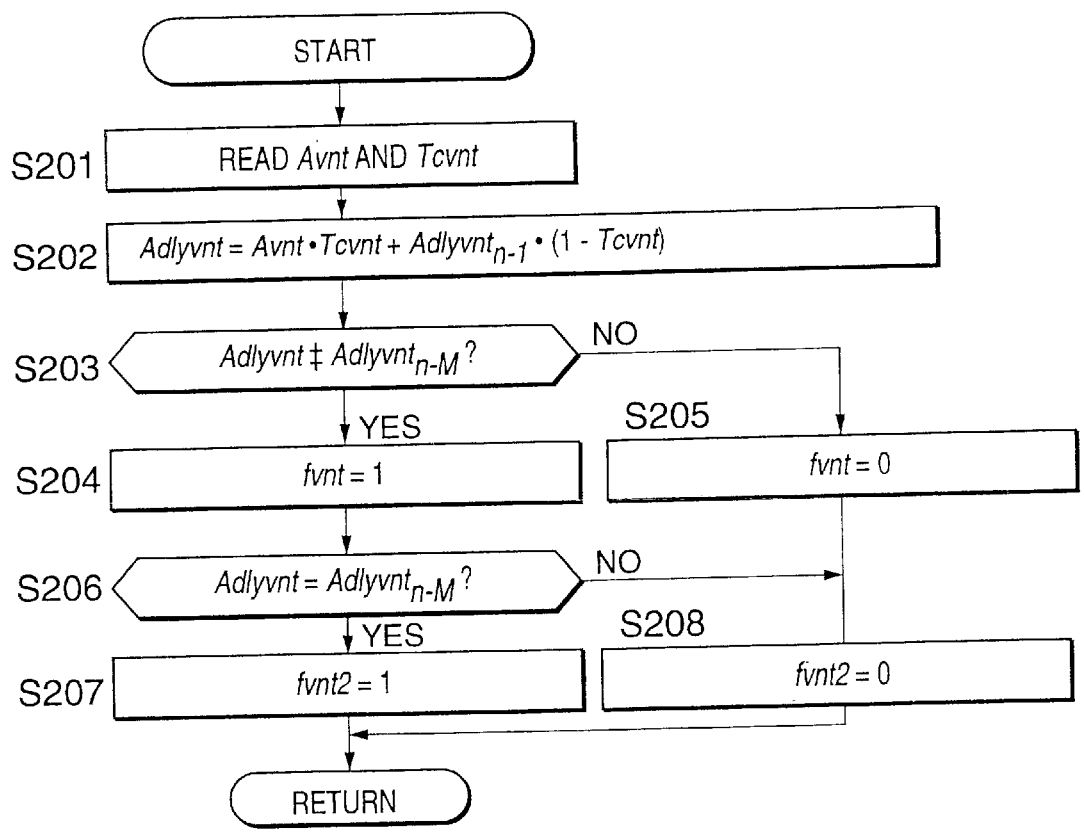
FIG. 35 is a flowchart describing a subroutine for setting a duty selection a signal flag fvnt2 performed the control unit.

In a step S182, duty signal variation flags are set using the subroutine shown in FIG. 35.

Referring to FIG. 35, the control unit 41 first reads the command opening Avnt and the advance correction time constant equivalent value Tcvnt in a step S201.

In a next step S202, a command opening prediction value Adlyvnt is calculated by the following equation (33).

$$Adlyvnt=Avnt \cdot Tcvnt+Adlyvnt_{n-1} \cdot (1-Tcvn) \tag{33}$$

where,

Adlyvnt$_{n-1}$=value of Adlyvnt calculated on the immediately preceding occasion the subroutine was executed.

Here, the relation between the command opening Avnt and the command opening prediction value Adlyvnt corresponds to the relation between the target opening Rvnt and the opening prediction value Cavnt.

In a following step S203, the command opening prediction value Adlyvnt is compared with a command opening prediction value Adlyvnt$_{n-M}$ calculated by the subroutine executed M times ago.

When Adlyvnt≧Adiyvnt$_{n-M}$, the command opening is increasing or constant. In this case, the subroutine sets an operation direction flag fvnt to 1 in a step S204, and proceeds to a step S206.

In the step S206, it is determined whether or not Adlyvnt=Adlyvnt$_{n-M}$. When Adlyvnt=Adlyvnt$_{n-M}$, in a step S207, a duty hold flag fvnt2 is set to 1, and the subroutine is terminated.

When Adlyvnt=Adlyvnt$_{n-M}$ is not satisfied, the routine proceeds to a step S208.

When Adlyvnt<Adlyvnt$_{n-M}$ in the step S203, it shows that the command opening is decreasing. In this case, the subroutine resets the operation direction flag fnvt to zero in a step S205, and the routine proceeds to the step S208.

In the step S208, the duty hold flag fvnt2 is reset to zero, and the subroutine is terminated.

Thus, after setting the two flags fvnt and fvnt2, the control unit 41 reads a duty value temperature correction amount Dty_t in a step S183 of FIG. 34. The duty value temperature correction amount Dty_t is calculated by a routine of FIG. 36 performed independently in synchronism with the REF signal.

Figure 36:
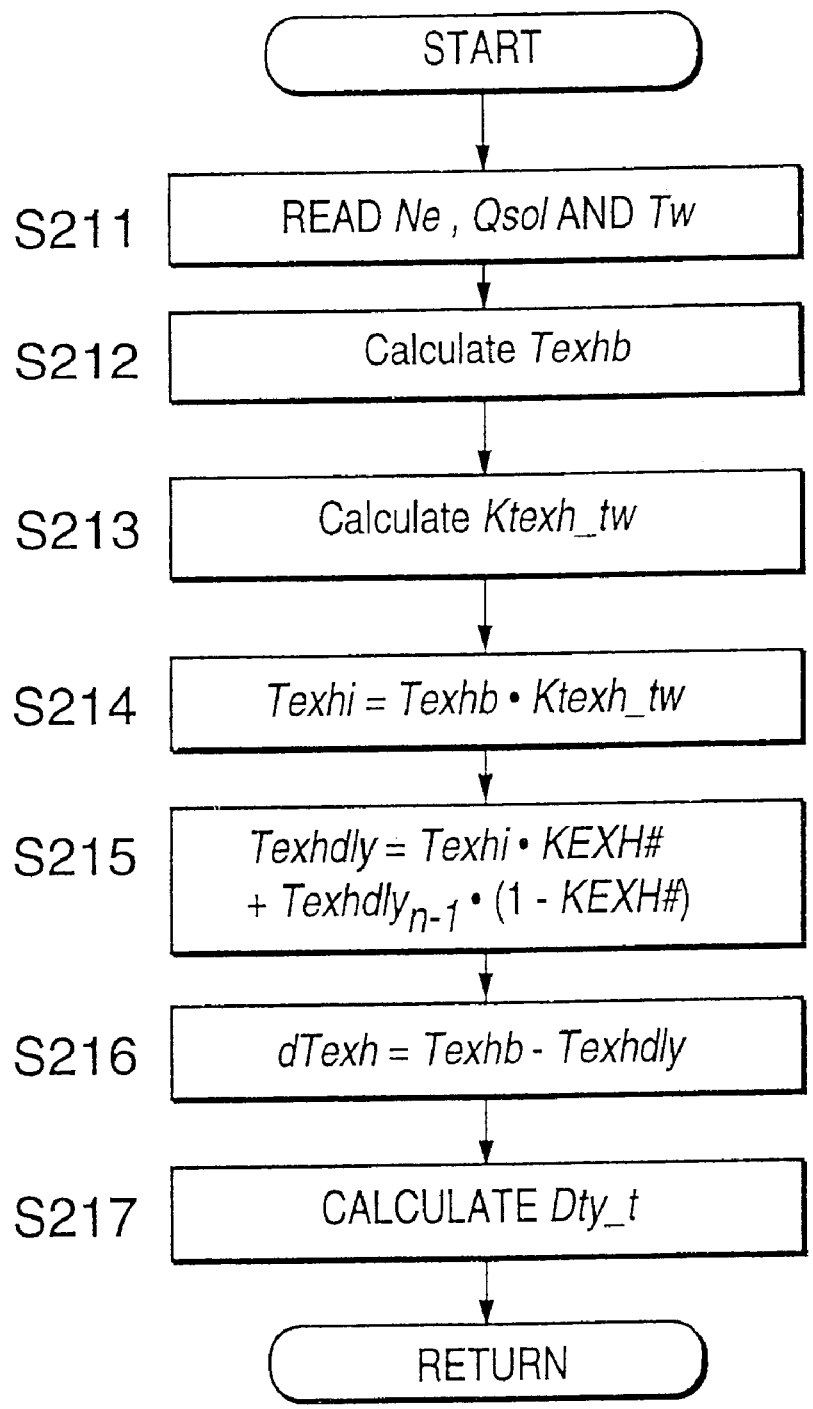
FIG. 36 is a flowchart describing a routine for correcting a temperature correction amount Dty_t of the duty value performed by the control unit.

Referring to FIG. 36, in a step S211, the control unit 41 first reads the engine rotation speed Ne, target fuel injection amount Qsol and cooling water temperature Tw.

Figure 37:
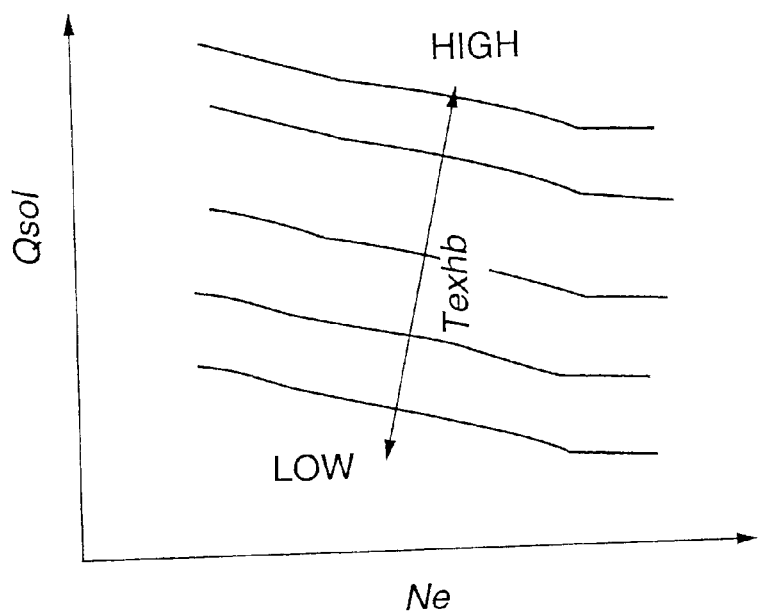
FIG. 37 is a diagram describing the contents of a map of a basic exhaust gas temperature Texhb stored by the control unit.

In a step S212, a basic, exhaust gas temperature Texhb is calculated @ from the engine rotation speed Ne and target fuel injection amount Qsol by looking up a map shown in FIG. 37 previously stored in the memory of the control unit 41. The basic exhaust gas temperature Texhb is the exhaust gas temperature after the diesel engine 1 has completed warming up.

Figure 38:
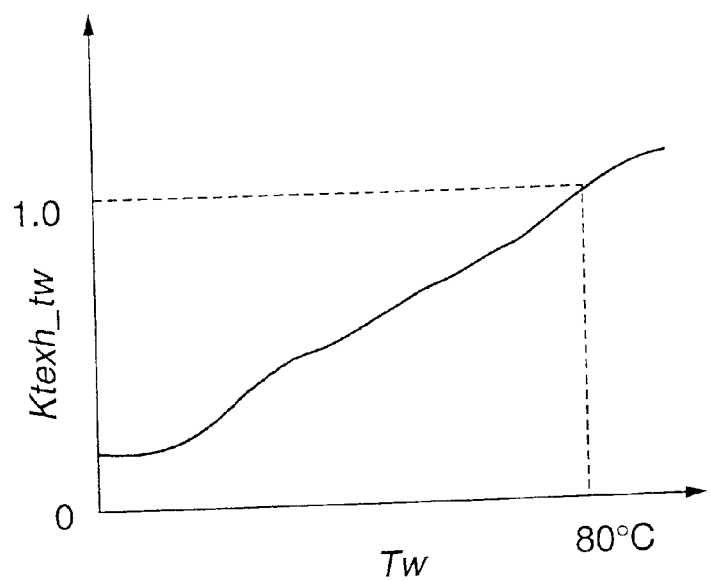
FIG. 38 is a diagram describing the contents of a map of a water temperature correction coefficient Ktexh_Tw stored by the control unit.

In a next step S213, a water temperature correction coefficient Ktexh_Tw is calculated by looking up a map shown in FIG. 38 stored in the control unit 41, based on the cooling water temperature Tw.

In a step S214, an exhaust gas temperature Texhi is calculated by multiplying the basic exhaust gas temperature Texhb by the water temperature correction coefficient Ktexh_Tw.

In a next step S215, a real exhaust gas temperature Texhdly is calculated by adding a first order processing delay to the exhaust gas temperature Texhi by the following equation (34). This value is a value which takes account of the delay due to the heat inertia in the variation of exhaust gas temperature.

$$Texhdly = Texhi \cdot KEXH\# + Texhdly_{n-1} \cdot (1 - KEXH\#) \quad (34)$$

where,

KEXH#=constant, and

Texhdly$_{n-1}$=Texhdly calculated on the immediately preceding occasion when the subroutine was executed.

In a following step S216, a difference dTexh of the basic exhaust gas temperature Texhb and this real exhaust gas temperature Texhdly is calculated.

Figure 39:
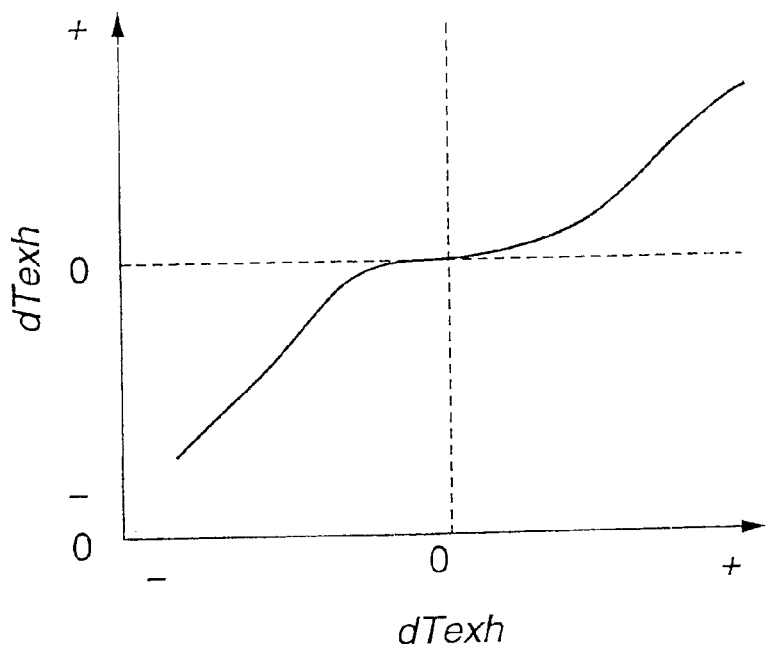
FIG. 39 is a diagram describing the contents of a map of the temperature correction amount Dty_t stored by the control unit.

In a last step S217, the duty value temperature correction amount Dty_t is calculated by looking up a map shown in FIG. 39 previously stored in the memory of the control unit 41, based on the difference dTexh. The meaning of the processing of the steps S216 and S217 will be described in detail later.

After the end of the subroutine, the control unit 41 returns to the subroutine of FIG. 34 and performs processing after the step S184. Steps S184–S189 are steps which add hysteresis processing to the duty value.

Figure 40:
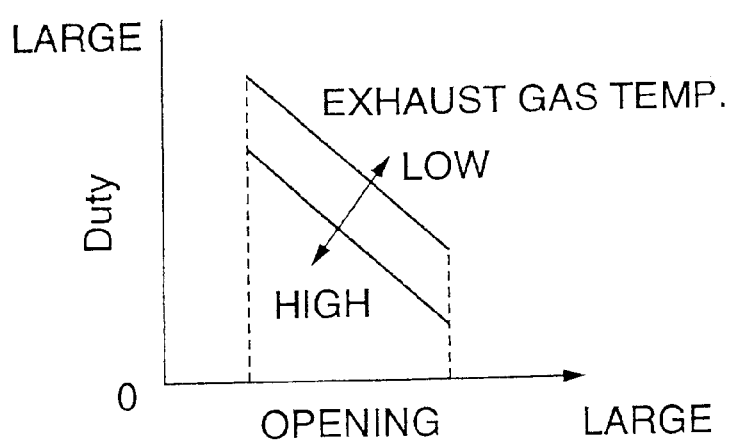
FIG. 40 is a diagram describing the temperature characteristics of an actuator of the turbocharger.
Figure 45:
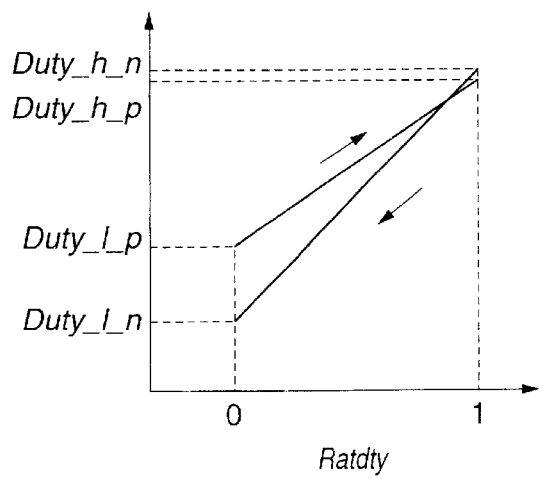
FIG. 45 is a diagram describing a hysteresis in the relation between a command opening linearization processing value and the duty value according to this invention.

Describing this hysteresis processing with reference to FIG. 45, when the linearization processing value Ratdty of the command opening Avnt is increasing, the duty value is made to vary according to a straight line which joins a command signal Duty_l_p when the variable nozzle 53 is fully open, and a command signal Duty_h_p when the variable nozzle 53 is fully closed. On the other hand, when the linearization processing value Ratdty is decreasing, the duty value is made to vary according to a straight line which connects a command signal Duty_l_n when the variable nozzle 53 is fully open, and a command signal Duty_h_n when the variable nozzle 53 is fully closed. In the drawing, two lines intersect in the region where the variable nozzle 53 is nearly closed, but this region is a region which is not used in actual control of the pressure control valve 56. These characteristics are set assuming that the diesel engine 1 has completely warmed up. When the real exhaust gas temperature Texhdly is low, the pressure actuator 54 has the characteristic of opening the variable nozzle 53 larger for the same duty value, as shown in FIG. 40. Hence, it is necessary to apply the temperature correction amount Dty_t calculated in the steps S216, S217 of FIG. 36, to compensate the difference in the characteristic of the pressure actuator 54 due to the exhaust gas temperature.

Figure 41:
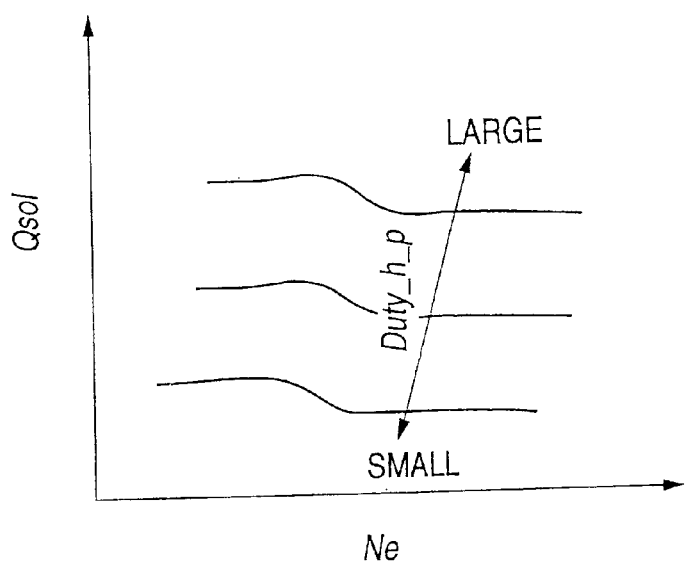
FIG. 41 is a diagram of the contents of a map of a duty value Duty_h when the variable nozzle is fully closed, when the opening of the variable nozzle is constant or increasing, stored by the control unit.

Now, the control unit 41 determines the operation direction flag fvnt in the step S184. When the operation direction flag fvnt is 1, i.e., when the command opening Avnt is increasing or constant, the processing of steps S185, S186 is performed. In the step S185, a duty value Duty_h when the variable nozzle 53 is fully closed, is calculated based on the target fuel injection amount Qsol by looking up a Duty_h_p map shown in FIG. 41.

Figure 42:
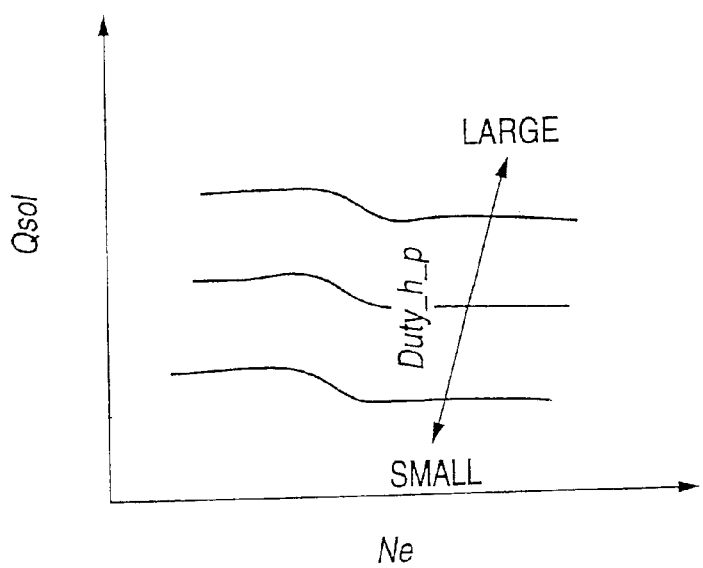
FIG. 42 is a diagram of the contents of a map of a duty value Duty_l when the variable nozzle is fully open, when the opening of the variable nozzle is constant or increasing, stored by the control unit.

In the following step S186, a duty value Duty_l when the variable nozzle 53 is fully open, is calculated by looking up a Duty_l_p map shown in FIG. 42. After this processing, the subroutine proceeds to a step S189.

Figure 43:
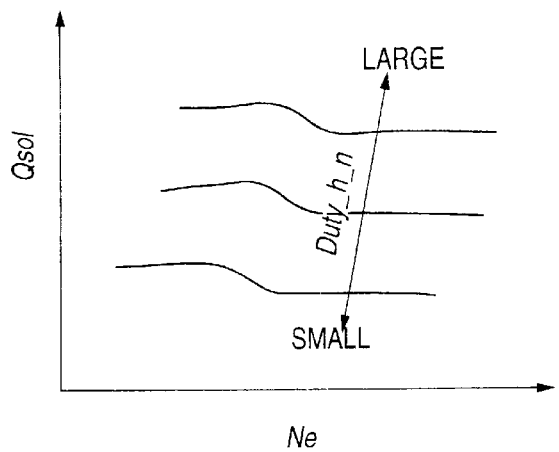
FIG. 43 is similar to FIG. 41, but showing a case where the opening of the variable nozzle is decreasing.
Figure 44:
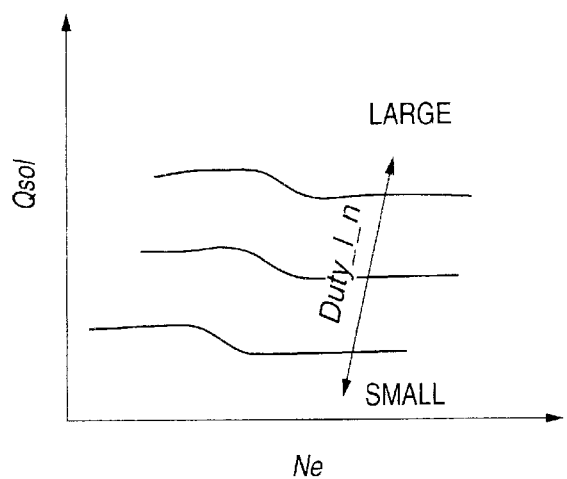
FIG. 44 is similar to FIG. 42, but showing a case where the opening of the variable nozzle is decreasing.

When the operation direction flag fvnt is 0 in the step S184, i.e., when the command opening Avnt is decreasing, the processing of steps S187, S188 is performed. In the step S187, the duty value Duty h when the variable nozzle 53 is fully closed, is calculated based on the target fuel injection amount Qsol by looking up a Duty_h_n map shown in FIG. 43. In the following step S188, the duty value Duty_l when the variable nozzle 53 is fully open, is calculated based on the target fuel injection amount Qsol by looking up a Duty_l_n map shown in FIG. 44.

After this processing, the subroutine proceeds to a step S189.

In the step S189, a command duty basic value Dty_h is calculated by performing linear interpolation processing by the following equation (35) using the duty values Duty_h, Duty_l found by the above processing, the linearization processing value Ratdty of the command opening Avnt, and the temperature correction amount Dty_t.

$$Dty\_h = (Duty\_h - Duty\_l) \cdot Ratdty + Duty\_l + Dty\_t \quad (35)$$

By changing the straight line used for linear interpolation processing in the case where the command opening Avnt, is decreasing, and the case where it is not, the command duty basic value Dty_h is made smaller, for the same linearization processing value Ratdty, in the case where the command opening Avnt is decreasing than in other cases.

In a next step S190, the duty hold flag fvnt2 is determined. When the duty hold flag fvnt2 is 1, i.e., the command opening prediction value Adlyvnt is not changing, a command duty value Dtyv is set equal to the duty value Dtyvnt$_{n-1}$ calculated on the immediately preceding occasion the subroutine was executed, in a step S191. The duty value Dyvnt$_{n-1}$ will be described in detail later.

When the duty maintenance flag fvnt2 is 0, i.e., when the command opening prediction value Adlyvnt is changing, in a step S192, the command duty value Dtyv is set equal to the command duty basic value Dty_h calculated in the step S189.

Figure 46:
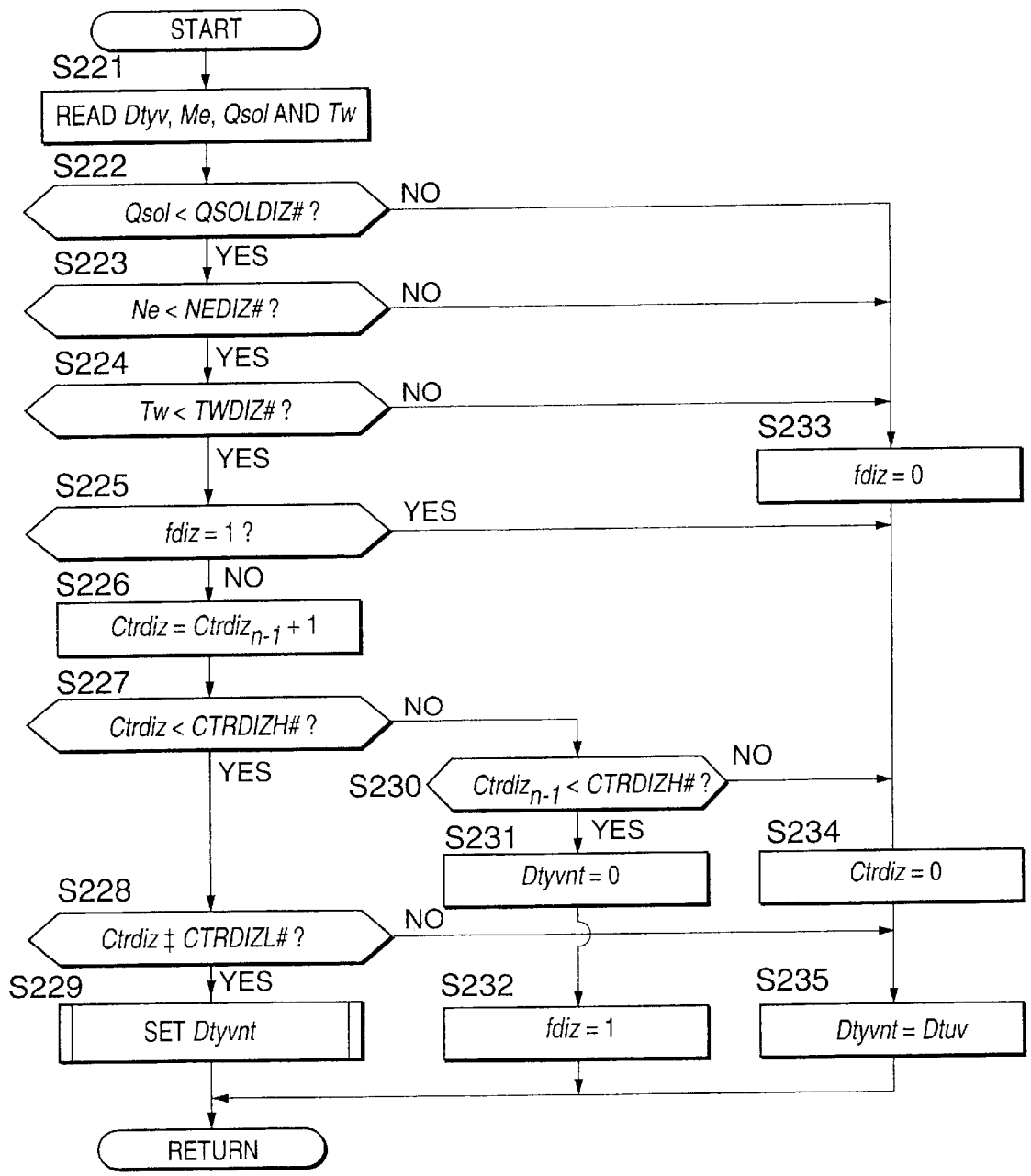
FIG. 46 is a flowchart describing an operation check subroutine performed by the control unit.

Thus, after determining the command duty value Dtyv in the step S191 or step S192, in a final step S193, the control unit 41 performs an operation check on the variable nozzle 53 using the subroutine of FIG. 46 based on the command duty value Dtyv.

Referring to FIG. 46, in a step S221, the control unit 41 first reads the command duty value Dtyv, engine rotation speed Ne, target fuel injection amount Qsol and the cooling water temperature Tw.

In subsequent steps S222–S225, it is determined whether or not operation check conditions are satisfied. An operation check is performed only when all these conditions are satisfied.

In the step S222, it is determined whether or not the target fuel injection. amount Qsol is less than a predetermined value QSOLDIZ#. When this condition is satisfied, it means that the diesel engine 1 is performing fuel cut.

In the step S223, it is determined whether or not the engine rotation speed Ne is less than a predetermined value NEDIZ#. When this condition is satisfied, it means that the rotation speed Ne of the diesel engine 1 Is in an intermediate or low speed region.

In the step S224, it is determined whether or not the cooling water temperature Tw is less than a predetermined value TwDIZ#. When this condition is satisfied, it means that warming up of the diesel engine 1 is not complete.

In the step S225, it is determined whether or not an operation check flag Fdiz is 0. When this condition is satisfied, it means that an operation check has not yet been performed.

When all the conditions are satisfied, an operation check counter value a CtFdiz is incremented in a step S226, and the routine proceeds to a step S227.

If any of the determination results of the steps S222–S224 is not satisfied, the subroutine resets the operation check flag Fdiz to 0 in a step S233, and proceeds to a step S234. However, when the operation check flag Fdiz is 1 in the step S225, it proceeds to the step S234 immediately.

In a step S227, the operation check counter value CtFdiz is compared with a predetermined upper limiting value CTRDIZH#.

When the operation check counter value CtFdiz is smaller than the upper limiting value CTRDIZH#, in a step S228, the operation check counter value CtFdiz is compared with a predetermined lower limiting value CTRDIZL#. When the operation check counter value CtFdiz is not less than the lower limiting value CTRDIZL#, in a step S229, a duty value Dtyvnt is set for checking operation using a subroutine shown in FIG. 47.

The upper limiting value CTRDIZH# is set to, for example, 7 seconds, and the lower limiting value CTRDIZL# is set to, for example, 2 seconds. In this case, the duty value for checking operation is set only in a 5 second interval of the difference between the upper limiting value and lower limiting value.

Here, referring to FIG. 47, a subroutine for setting the duty value for operation check will be described.

The control unit 41, in a step S241, first reads the operation check counter value CtFdiz and engine rotation speed Ne.

Figure 48:
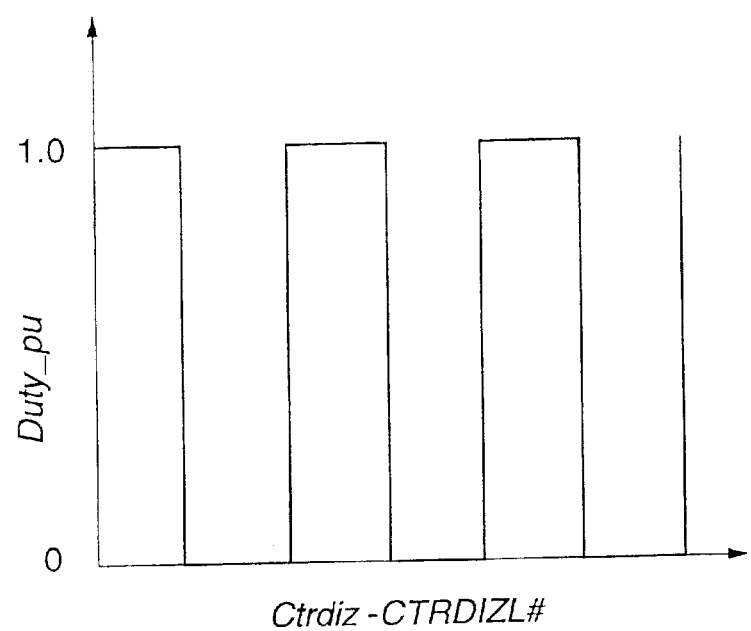
FIG. 48 is a diagram describing the contents of a map of a control pattern value Duty_pu stored by the control unit.

In a following step S242, a control pattern value Duty__pu is set by looking up a map shown in FIG. 48 based on the difference of the operation check counter value CtFdiz and lower limiting value CTRDIZL#. This map is previously stored in the memory of the control unit 71 The control pattern value Duty__pu is set so that it repeatedly varies between 0 and 1 with a short period according to the elapsed time after the operation check counter value CtFdiz exceeds the lower limiting value CTRDIZL#.

Figure 49:
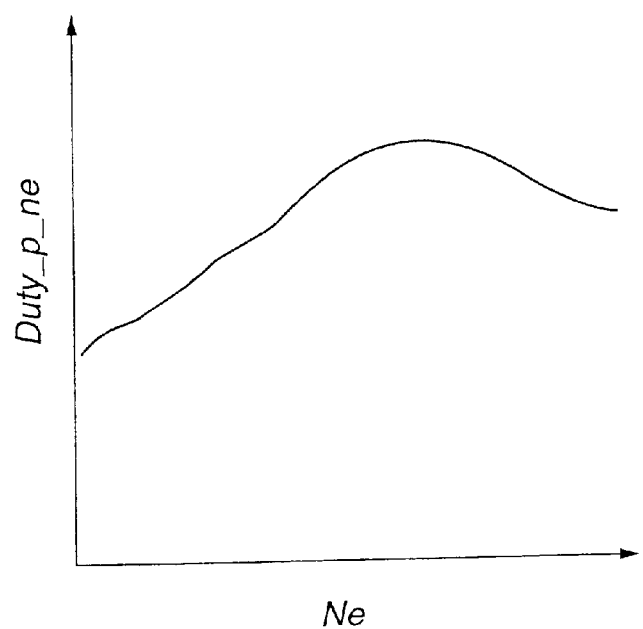
FIG. 49 is a diagram describing the contents of a map of a duty value Duty_p_ne stored by the control unit.

In a next step S243, a duty value Duty__p__ne commanded to the pressure control valve 56 is calculated by looking up a map shown in FIG. 49 previously stored in the memory of the control unit 41, based on the engine rotation speed Ne. The duty value Duty__p__ne is set supposing that the duty for checking the opening and closing operation of the variable nozzle 53 differs according to the engine rotation speed Ne. For example, when the variable nozzle 53 is to be closed, it must close against the exhaust gas pressure. The exhaust gas pressure increases in accordance with the increase in engine rotation speed Ne.

Further, when the engine rotation speed Ne is in the high-speed region, the closing of the variable nozzle 53 to check operation has a major impact on the engine running environment. Therefore, in the high speed region, the duty value Duty__p__ne is decreased as the engine rotation speed Ne increases so as to reduce the impact on the engine running environment.

In a following step S244, the duty value Dtyvnt is calculated by multiplying the duty value Duty__p__ne by the control pattern value Duty__pu, and the subroutine is terminated.

Figure 47:
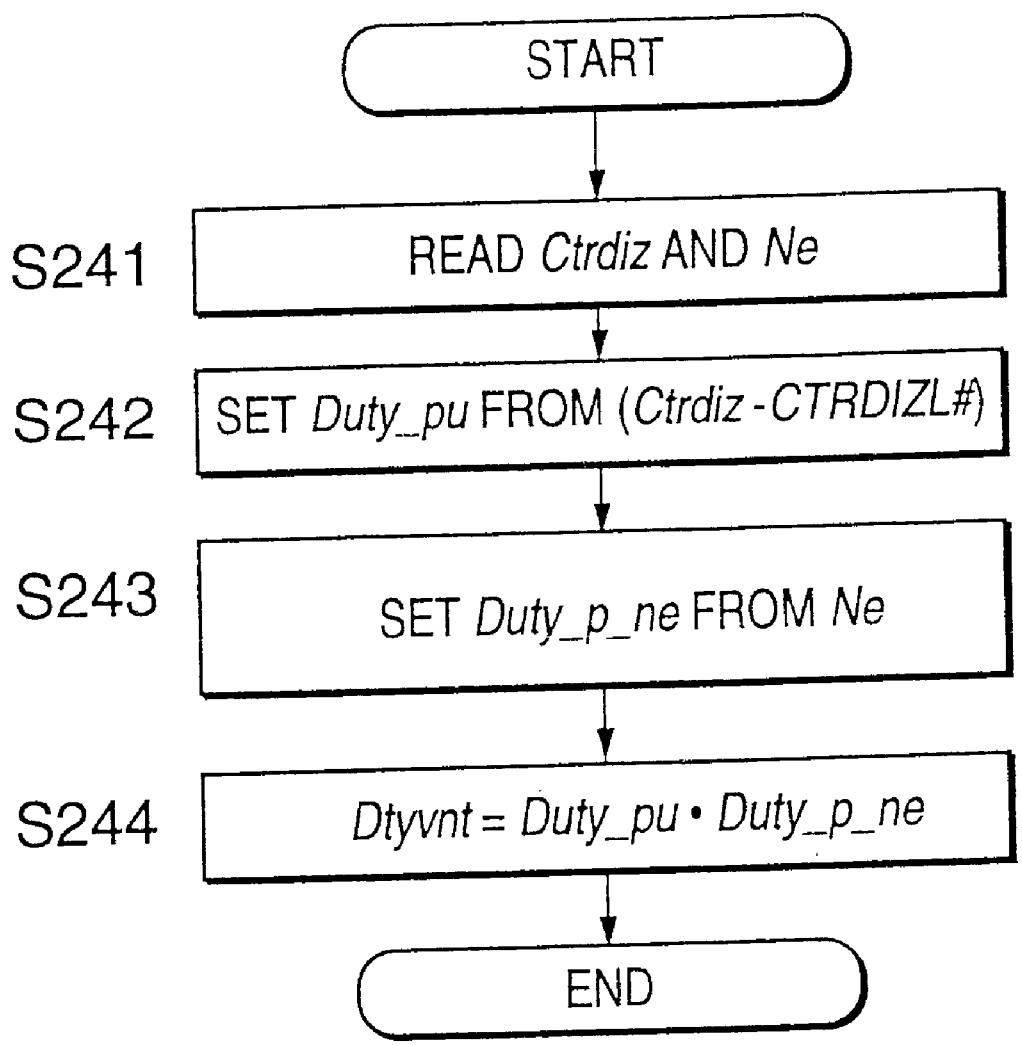
FIG. 47 is a flowchart describing a routine for calculating the duty value Dtyvnt performed by the control unit.

In this way, by terminating the subroutine of FIG. 47, the processing of the step S229 of FIG. 46 is terminated and the subroutine of FIG. 46 is also terminated.

On the other hand, in the step S227 of FIG. 46, when the operation check counter value CtFdiz is not less than the upper limiting value CTRDIZH#, the processing of the step S230 is performed. Here, an immediately preceding value CtFdiz$_{n-1}$ of the operation check counter value CtFdiz operation is compared with the upper limiting value CTRDIZH#. If the immediately preceding value CtFdiz$_{n-1}$ is less than the upper limiting value CTRDIZH#, it means that CTRDIZH# reached the upper limiting value CTRDIZH# for the first time in the repeat execution of this subroutine, the duty value Dtyvnt is set to 0 in a step S231, the operation check flag Fdiz is set to 1 in a step S232, and the subroutine is terminated.

By once setting the duty value Dtyvnt to 0 in the step S231 when the operation check is completed, the variable nozzle 53 fully opens. This operation aims to maintain control precision during ordinary control performed thereafter. By setting the operation check flag Fdiz to 1, the determination result of the step S225 will always be negative in the execution of the subroutine thereafter. It means the operation check of the variable nozzle 53 is performed only once after starting the diesel engine 1.

On the other hand, when the immediately preceding value CtFdiz$_{n-1}$ of the operation check counter value CtFdiz is not less than the upper limiting value CTRDIZH# in the step S230, the subroutine proceeds to the step S234. In the step S234, the operation check counter value CtFdiz is reset to 0, and the routine proceeds to a step S235.

When the operation check counter value CtFdiz is less than the predetermined lower limiting value CTRDIZL# in the step S228, the subroutine also proceeds to the step S235.

In the step S235, the duty value Dtyvnt for operation check is set equal to the command duty value Dtyv determined in the step S191 or step S192, and the subroutine is terminated. In this case therefore, the ordinary control of the variable nozzle 53 is performed.

In particular, when operation of the pressure actuator 54 is unstable such as at low temperatures etc., this operation check of the variable nozzle 53 makes the operation of the variable nozzle 53 smooth and increases reliability in control of turbocharging pressure.

In this way, by ending the subroutine of FIG. 46, the processing of the step S193 of the subroutine of FIG. 34 is terminated and the subroutine of FIG. 34 is also terminated. Further, by terminating the subroutine of FIG. 34, the processing of the step S72 of FIG. 15 is terminated and the main routine of FIG. 15 is also terminated.

As above described, the control unit 41 controls the fresh air amount by performing opening control of the variable nozzle 53 of the turbocharger 50, and it may control the fresh air amount also by performing opening control of the throttle 60. However, if the throttle 60 is closed, fuel cost-performance is impaired as pumping losses increase. Therefore, when the target intake fresh air amount tQac is greater than a minimum value aQac, the fresh air amount is controlled by opening control of the variable nozzle 53, and the fresh air amount is controlled by opening control of the throttle 60 only when the target intake fresh air amount tQac is less than the minimum value aQac. The minimum value aQac is a value corresponding to the intake air amount when the variable nozzle 53 is fully closed.

Figure 69:
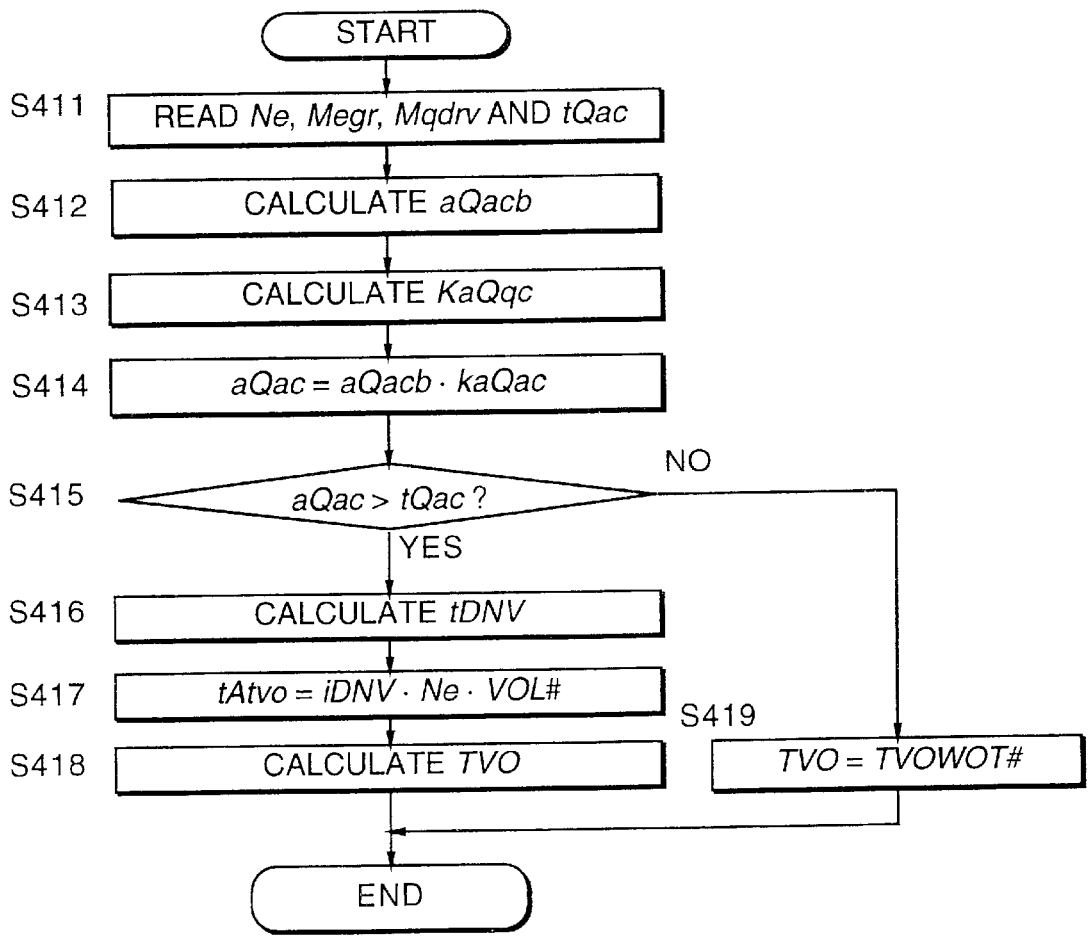
FIG. 69 is a flowchart describing a routine for calculating a target throttle opening TVO performed by the control unit.

The control unit 41 controls the fresh air amount by executing a routine shown in FIG. 69. This routine is performed at an interval of 10 milliseconds.

First, in a step S411, the engine rotation speed Ne, target EGR rate Megr, basic fuel injection amount Mqdrv and target intake fresh air amount tQac are read.

Figure 70:
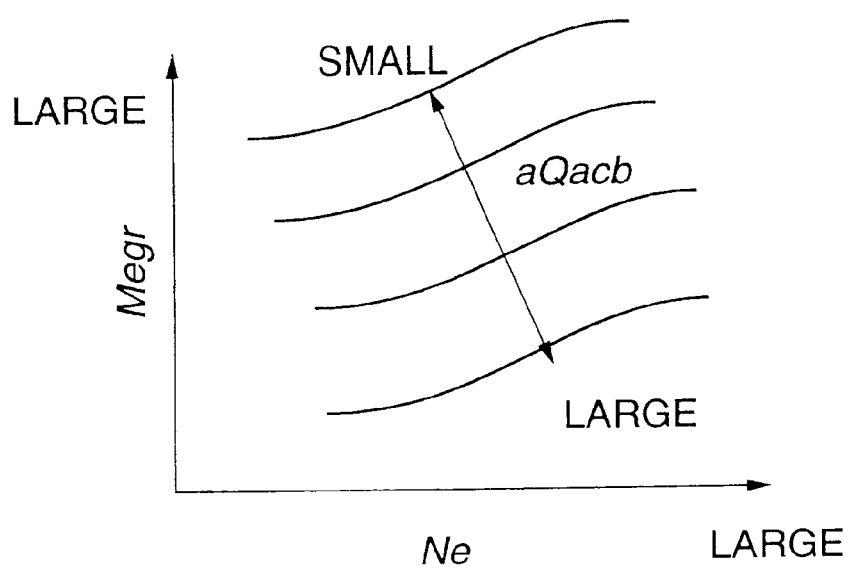
FIG. 70 is a diagram describing the contents of a map of a minimum fresh air amount basic value aQacb stored by the control unit.

In a next step S412, a minimum fresh air amount basic value aQacb at which the variable nozzle 53 of the turbocharger 50 can be controlled, is calculated by looking up a map shown in FIG. 70 from the engine rotation speed Ne and target EGR rate Megr. This map is previously stored in the memory of the control unit 41. According to this map, the minimum fresh air amount basic value aQacb decreases the larger the target EGR rate Megr. Also, the minimum fresh air amount basic value aQacb increases the higher the engine rotation speed Ne.

Figure 71:
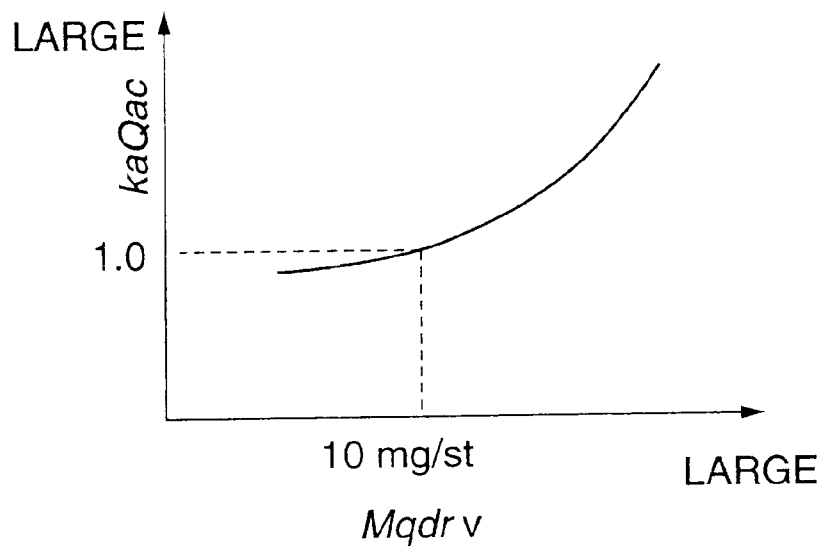
FIG. 71 is a diagram describing the contents of a map of a load correction coefficient kaQqc stored by the control unit.

In a next step S413, a load correction coefficient kaQqc is calculated by looking up a map shown in FIG. 71 from the basic fuel injection amount Mqdrv. The larger the load on the diesel engine 1 represented by the basic fuel injection amount Mqdfv, the higher the turbocharging pressure, and the larger the fresh air amount supplied via the turbocharger 50. Therefore, to increase the minimum fresh air amount basic value aQacb according to the load, the load correction coefficient kaQqc is provided. This map is also previously stored in the memory of the control unit 41. The load correction coefficient kaQqc is set so that it is 1.0 when the basic fuel injection amount Mqdrv is 10 mg per injection of the nozzle 7, as shown in the figure.

In a next step S414, a minimum value aQac is calculated by multiplying the minimum fresh air amount basic value aQacb by the load correction coefficient kaQqc.

In a next step S415, the target intake fresh air amount tQac is compared with the minimum value aQac. When the target intake fresh air amount tQac is not less than the minimum value aQac, a target throttle opening TVO of the throttle 60 is set to a predetermined value TVOWOT# in a step S419, and the routine is terminated. The predetermined value TVOWOT# is a value corresponding to the fully open state of the throttle 60, and when converted to a rotation angle of the throttle 60, it corresponds to approximately 80 degrees.

Figure 72:
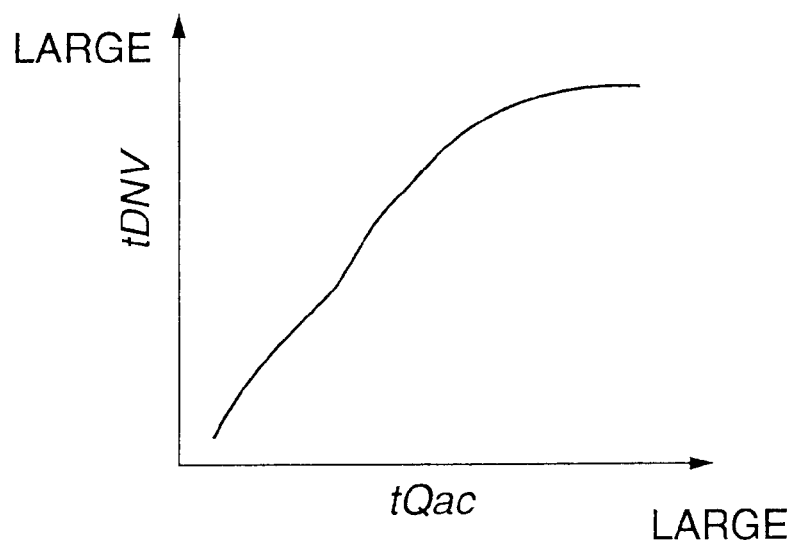
FIG. 72 is a diagram describing the contents of a map of a fresh air amount ratio tDNV stored by the control unit.

On the other hand, when the target intake fresh air amount tQac is less than the minimum value aQac, the target intake fresh air amount tQac cannot be reached even if the variable nozzle 53 is fully closed. In this case, the routine proceeds to a step S416, and a fresh air amount ratio tDNV is a calculated by looking up a map shown in FIG. 72 from the target intake fresh air amount tQac. This map is previously stored in the memory of the control unit 41. The fresh air amount ratio tDNV is a value used for converting the target intake fresh air amount tQac which is a weight flowrate, to a volume flowrate controlled by the throttle 60.

Figure 73:
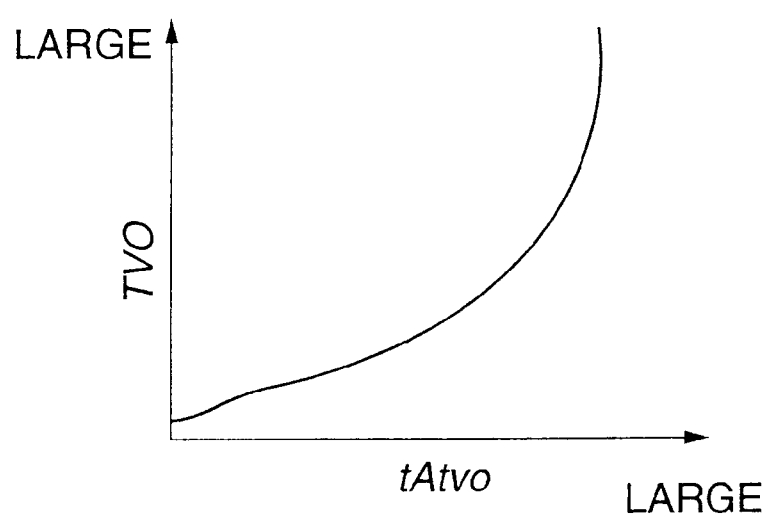
FIG. 73 is a diagram describing the contents of a map of the target throttle opening TVO stored by the control unit.

In a next step S417, a target throttle opening surface area tAtvo is calculated by multiplying the fresh air amount ratio tDNV by the engine rotation speed Ne and engine exhaust gas amount VOL#. Further, the target throttle opening TVO of the throttle 60 is calculated by looking up a map shown in FIG. 73 from the target throttle opening surface area tAtvo in a step S418, and the routine is terminated. This map is also previously stored in the memory of the control unit 41.

The control unit 41 controls the opening of the throttle 60 to the target throttle opening TVO by controlling the throttle actuator 61 based on the target throttle opening TVO calculated in this way.

Figure 68:
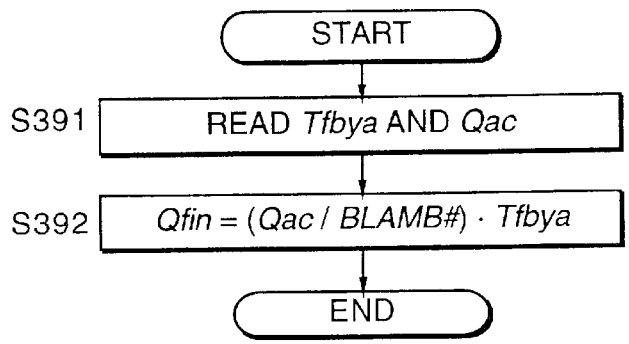
FIG. 68 is a flowchart describing a routine for calculating a final target fuel injection amount Qfin performed by the control unit.

The control unit 41 also controls the injection amount of the fuel injection device 10 by performing the routine of FIG. 68 based on the target equivalence ratio Tfbya This routine is performed in synchronism with the REF signal.

Referring to FIG. 68, in a step S391, the target equivalence ratio Tfbya and cylinder intake fresh air amount Qac are read.

In a next step S392, the final target fuel injection amount Qfin is calculated by the following equation (36), and the routine is terminated $$Qfin = (Qac/BLAMB\#) \cdot Tfbya \tag{36}$$

where,

BLAMB#=14.7.

The control unit 41 controls the fuel injection amount of the nozzle 17 of the fuel injection device 10 by duty control of the three-way valve 25 based on the calculated target final fuel injection amount Qfin.

Hence, in this control device, the control unit 41 first determines the target EGR rate Megr of the EGR valve 6 based on the running conditions, and controls the opening of the EGR valve 6. It then determines the target equivalence ratio Tfbya based on the target excess air factor Tlamb and target EGR rate Megr.

By controlling the variable nozzle 53 of the turbocharger 50 based on this target equivalence ratio Tfbya, the fresh air amount is controlled, and the fuel injection amount of the fuel injection device 10 is also controlled based on the target equivalence ratio Tfbya.

Therefore, the excess air factor and EGR rate can be controlled to an optimum proportion according to running conditions. In other words, the ratio of the EGR rate Megr based on the map of FIG. 12, and the target excess air factor Tlamb based on the map of FIG. 22, is changed to an optimum proportion according to running conditions. Therefore, optimum combustion can be performed even if the diesel engine 1 is in a transient state.

Further, only one of the excess air factor and EGR rate may be varied as necessary. For example, when it is desired to perform rich spike, in the steady state when the EGR rate is constant, the excess air factor can be varied while maintaining the EGR rate constant simply by setting the target excess air factor below 1.0. Likewise, the EGR rate can be varied while maintaining the target excess air factor constant.

Further, the target equivalence ratio Tfbya is calculated taking account of the air in the recirculated exhaust gas due to EGR, so the excess air factor of the diesel engine 1 can be controlled to high precision.

In this control device, the target excess air factor basic value Tlambb is set to be smaller the larger than the basic fuel injection amount Mqdrv. Therefore, when the driver depresses the accelerator pedal, the excess air factor decreases and torque increases. On the other hand, when the depression of the accelerator pedal is small, the excess air factor increases and torque decreases. Therefore, this invention has no adverse effect on the drivability of the vehicle.

Next, referring to FIG. 16, a second embodiment of this invention will be described relating to the pressure control of the turbocharger 50.

Figure 16:
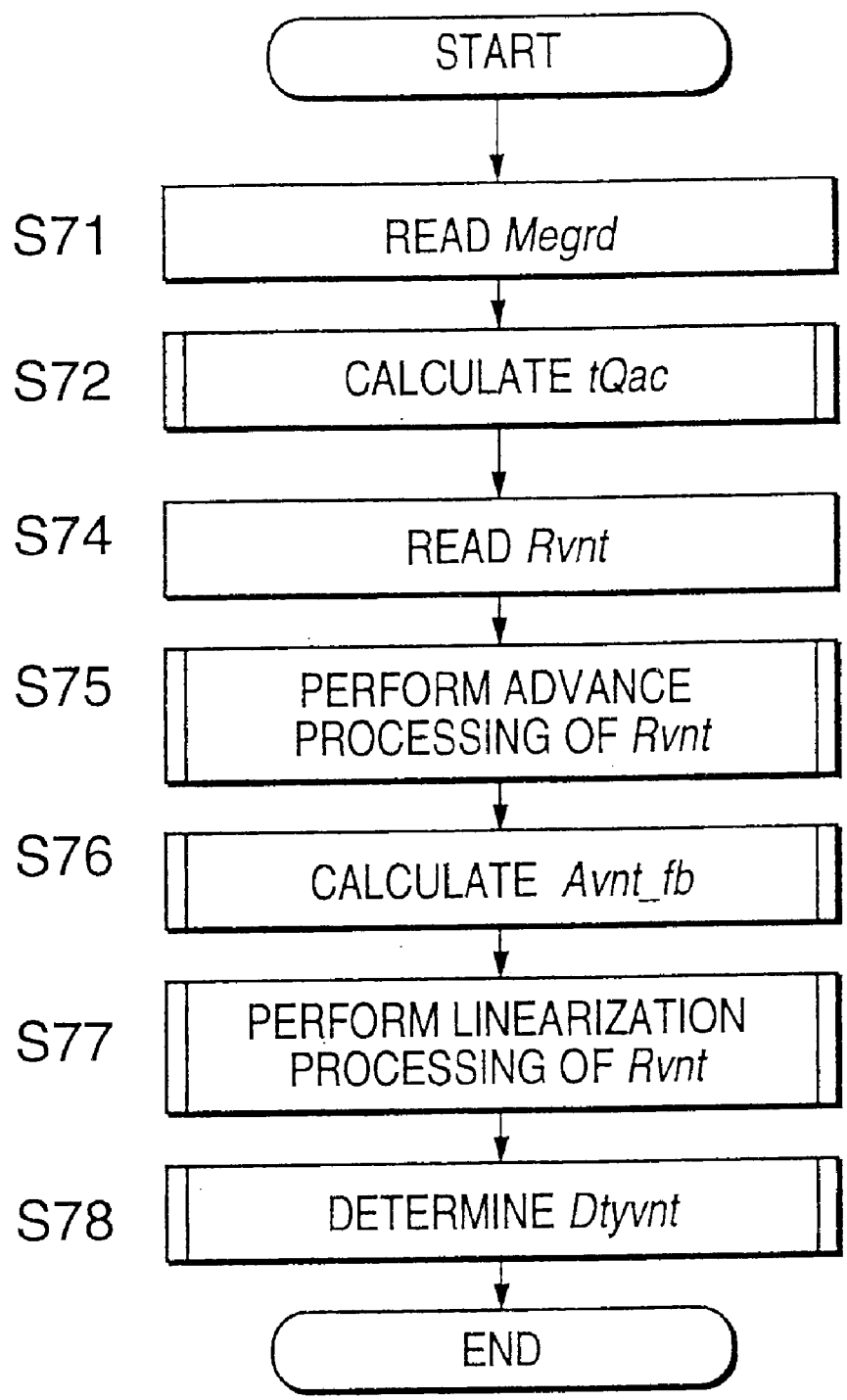
FIG. 16 is similar to FIG. 15, but showing a second embodiment of this invention.

According to this embodiment, a routine shown in FIG. 16 is used instead of the routine of FIG. 15 for calculating the duty value Dtyvnt of the pressure control valve of the turbocharger. As in the case of the routine of FIG. 15, the routine of FIG. 16 is also performed at an interval of 10 milliseconds.

In the routine of FIG. 15, the target opening Rvnt of the variable nozzle 53 was calculated based on the real EGR amount Qec, but in the routine of FIG. 16, the target opening Rvnt is calculated based on the real EGR rate Megrd.

Figure 27:
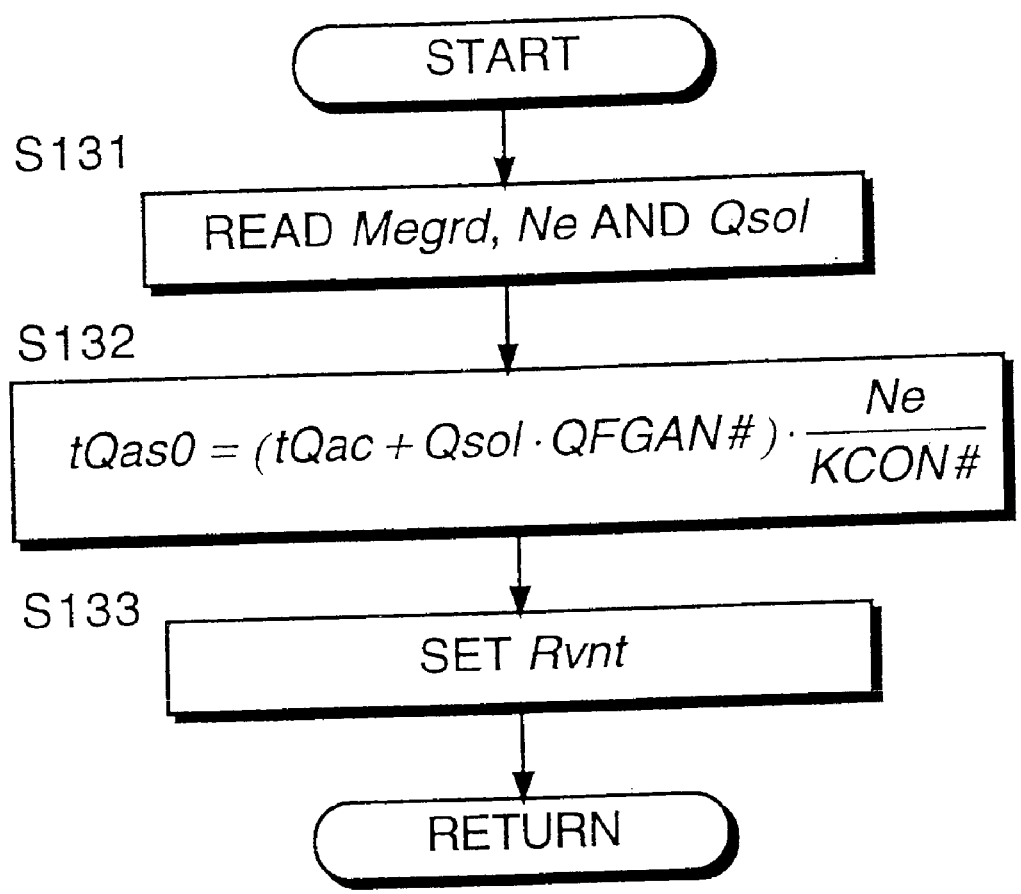
FIG. 27 is similar to FIG. 25, but showing the second embodiment of this invention.

Specifically, in the routine of FIG. 16, the processing of the step S73 of FIG. 15 which calculates the real EGR amount Qec, is omitted. At the same time, the routine shown in FIG. 27 is applied instead of the routine shown in FIG. 25 in the calculation of the target opening Rvnt of the variable nozzle 53. The remaining processing details are identical to those of the first embodiment.

Referring to FIG. 27, in a step S131, the control unit 41 reads the target intake fresh air amount tQac, real EGR rate Megrd, engine rotation speed Ne and target fuel injection amount Qsol.

In a step S132, an identical calculation is performed to that of the step S122 of FIG. 15, and the set intake fresh air amount equivalent value tQas0 is calculated.

Figure 28:
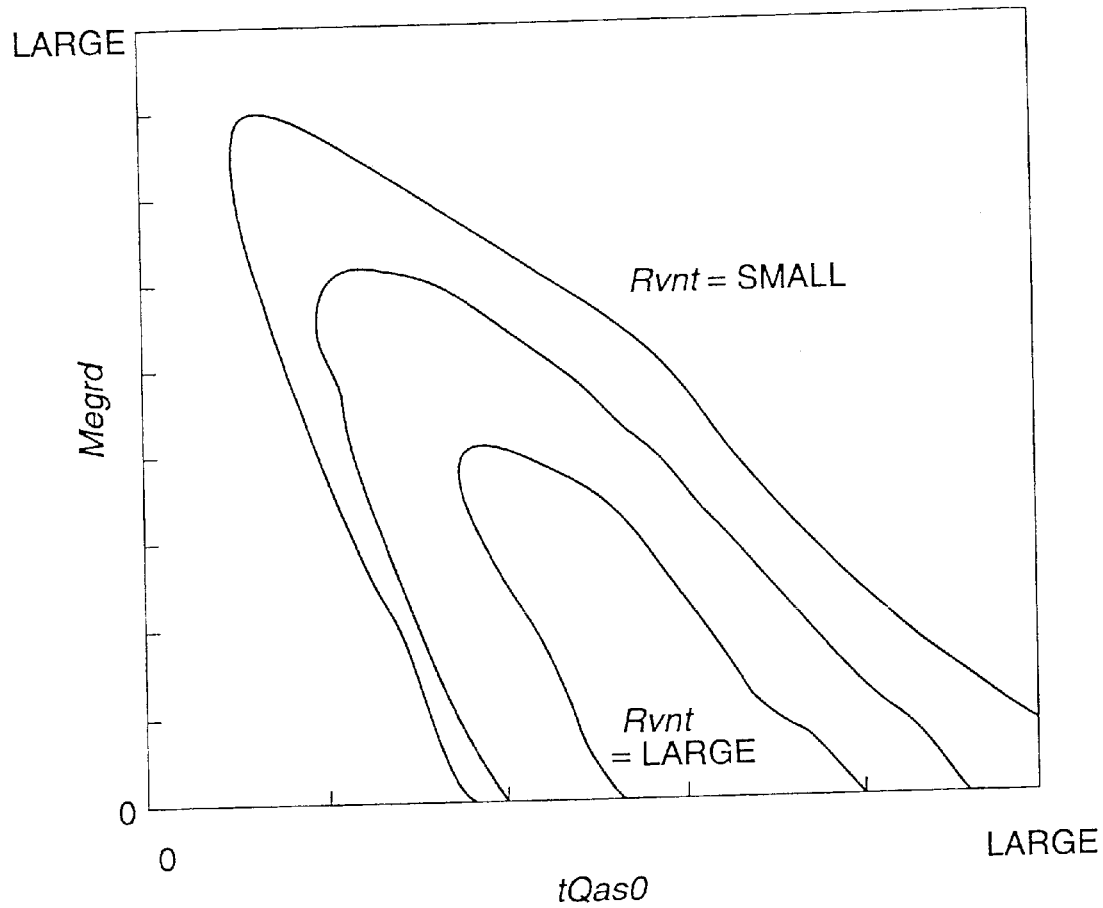
FIG. 28 is similar to FIG. 26, but showing the second embodiment of this invention.

In a step S133, the target opening Rvnt of the variable nozzle 53 is calculated by looking up a map shown in FIG. 28 previously stored in the memory of the control unit 41, based on the set intake fresh air amount equivalent value tQas0 and real EGR rate Megrd.

In the map of FIG. 26 of the first embodiment, the vertical axis represents the EGR rate equivalent value Qes0, but in the map of FIG. 28, the vertical axis represents the real EGR rate Megrd. The two maps differ only with regard to these parameters, and the characteristics of the target opening Rvnt obtained are identical whichever map is used.

The contents of Tokugan Hei 2000-146236, with a filing date of May 18, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, this invention may be applied also to a diesel engine that is provided with a throttle in the exhaust passage 2 instead of the throttle 60 in the intake passage 3. Further, it may be applied not only to a diesel engine which performs low temperature pre-mixture combustion, but also to an ordinary diesel engine wherein diffusion combustion follows the pre-mixture combustion.

The turbocharger is not limited to the turbocharger 50 comprising the variable nozzle 53, and other types of turbocharger may be used. For example, the invention may be applied also to a turbocharger which varies the turbocharging pressure according to the flowrate, and a fixed capacity turbocharger comprising a wastegate valve wherein part of the exhaust gas bypasses the exhaust gas turbine.

This invention can also be applied to an engine using a supercharger. In all of these cases, the fresh air amount may be controlled using parameters similar to the opening of the variable nozzle, such as the opening area of a mechanism which varies the flowrate of the turbocharger or supercharger, or a operating state of an actuator which varies the opening area.

INDUSTRIAL FIELD OF APPLICATION

As described above, this invention enables the control of excess air factor and EGR rate of a diesel engine independently as required. This invention also enables to increases the accuracy of the control of the excess air factor. Thus this invention improves the exhaust emission of the diesel engine of an automobile.

What is claimed is:

1. A control device for an engine, the engine comprising an intake passage which aspirates fresh air, an adjusting mechanism which varies an aspirating amount of fresh air of the intake passage, an exhaust passage which discharges an exhaust gas of the engine, an exhaust gas recirculation valve which recirculates part of the exhaust gas into the intake passage and a fuel supply mechanism which supplies a fuel to the engine, the engine burning the fuel with a mixture of fresh air aspirated by the intake passage and exhaust gas recirculated by the exhaust gas recirculation valve, the device comprising:

a sensor which detects a running condition of the engine;

a sensor which detects the aspirating amount of the fresh air of the intake passage; and a microprocessor programmed to:

determine a target exhaust gas recirculation value of the exhaust gas recirculation valve according to the running condition;

control the exhaust gas recirculation valve based on the target exhaust gas recirculation value;

calculate a first target value according to the running condition, the first target value representing a relation between an amount of air and an amount of the fuel supplied to the engine;

calculate a second target value based on the first target value and the target exhaust gas recirculation value, the second target value representing a relation between an amount of the fresh air aspirated by the intake passage and the amount of the fuel supplied to the engine;

calculate a target amount of the fresh air aspirated by the intake passage from the second target value;

determine a target control value of the adjusting mechanism based on the fresh air target amount and the target exhaust gas recirculation value;

control the adjusting mechanism based on the target control value; and control the fuel supply mechanism based on the second target value.

2. The control device as defined in claim 1, wherein the microprocessor is further programmed to calculate, based on the first target value and the target exhaust gas recirculation value, an amount of a recirculated air which is contained in the exhaust gas recirculated by the exhaust gas recirculation valve, and calculate the second target value by modifying the first target value based on the amount of the recirculated air.

3. The control device as defined in claim 2, wherein the microprocessor is further programmed to calculate the second target value by the following equation:

$$Tfbya=\{Tlamb+Megrd \cdot (Tlamb-1)\}/Tlamb^2$$

where, Tfbya=second target value,

Tlamb=first target value,

Megrd=value obtained by performing a predetermined delay processing on the target exhaust gas recirculation value.

4. The control device as defined in claim 2, wherein the adjusting mechanism comprises a turbocharger which supercharges the fresh air in the intake passage according to a pressure of the exhaust gas in the exhaust gas passage, the turbocharger comprises a variable nozzle which adjusts the exhaust gas pressure, and the microprocessor is further programmed to calculate a target opening value of the variable nozzle from the second target value and the target exhaust gas recirculation value, and control an opening value of the variable nozzle to the target opening value.

5. The control device as defined in claim 4, wherein the adjusting mechanism further comprises a throttle which adjusts a fresh air supply amount to the turbocharger, and the microprocessor is further programmed to calculate a target amount of the fresh air aspirated by the intake passage from the second target value, and control the throttle to a reduced opening when the fresh air target amount is less than a predetermined flowrate.

6. The control device as defined in claim 2, wherein the first target value is an excess air factor which is a ratio of an air-fuel ratio of the mixture and a stoichiometric air-fuel ratio, the running condition detection sensor comprises a sensor which detects a load of the engine, and the excess air factor is set to be smaller the larger the load.

7. The control device as defined in claim 2, wherein the running condition detection sensor, comprises one of a sensor which detects a cooling water temperature of the engine, a sensor which detects a temperature of the fresh air and a sensor which detects an atmospheric pressure, and the microprocessor is further programmed to calculate the first target value based on one of the cooling water temperature, fresh air temperature and atmospheric pressure.

8. The control device as defined in claim 2, wherein the first target value is an excess air factor which is a ratio of an air-fuel ratio of the mixture and a stoichiometric air-fuel ratio, the diesel engine further comprises a catalytic converter which reduces nitrogen oxides in the exhaust gas passage, the microprocessor is further programmed to determine whether or not a condition is satisfied for reducing nitrogen oxides by the catalytic converter, and when the reducing condition is satisfied, the microprocessor temporarily sets the excess air factor to a value less than 1.0.

9. The control device as defined in claim 8, wherein the microprocessor is further programmed to prevent the excess air factor from being less than 1.0 for longer than a predetermined time period.

10. A control device for an engine, the engine comprising an intake passage which aspirates fresh air, an adjusting mechanism which varies an aspirating amount of fresh air of the intake passage, an exhaust passage which discharges an exhaust gas of the engine, an exhaust gas recirculation valve which recirculates part of the exhaust gas into the intake passage and a fuel supply mechanism which supplies a fuel to the engine, the engine burning the fuel with a mixture of fresh air aspirated by the intake passage and exhaust gas recirculated by the exhaust gas recirculation valve, the device comprising:

means for detecting a running condition of the engine;

means for detecting the aspirating amount of the fresh air of the intake passage;

means for determining a target exhaust gas recirculation value of the exhaust gas recirculation valve according to the running condition;

means for controlling the exhaust gas recirculation valve based on the target exhaust gas recirculation value;

means for calculating a first target value according to the running condition, the first target value representing a relation between an amount of air and an amount of the fuel supplied to the engine;

means for calculating a second target value based on the first target value and the target exhaust gas recirculation value, the second target value representing a relation between an amount of the fresh air aspirated by the intake passage and the amount of the fuel supplied to the engine;

means for calculating a target amount of the fresh air aspirated by the intake passage from the second target value;

means for determining a target control value of the adjusting mechanism based on the fresh air target amount and the target exhaust gas recirculation value;

means for controlling the adjusting mechanism based on the target control value; and means for controlling the fuel supply mechanism based on the second target value.

11. A control method for an engine, the engine comprising an intake passage which aspirates fresh air, an adjusting mechanism which varies an aspirating amount of fresh air of the intake passage, an exhaust passage which discharges an exhaust gas of the engine, an exhaust gas recirculation valve which recirculates part of the exhaust gas into the intake passage and a fuel supply mechanism which supplies a fuel to the engine, the engine burning the fuel with a mixture of fresh air aspirated by the intake passage and exhaust gas recirculated by the exhaust gas recirculation valve, the method comprising:

detecting a running condition of the engine;

detecting the aspirating amount of the fresh air of the intake passage;

determining a target exhaust gas recirculation value of the exhaust gas recirculation valve according to the running condition;

controlling the exhaust gas recirculation valve based on the target exhaust gas recirculation value;

calculating a first target value according to the running condition, the first target value representing a relation between an amount of air and an amount of the fuel supplied to the engine;

calculating a second target value based on the first target value and the target exhaust gas recirculation value, the second target value representing a relation between an amount of the fresh air aspirated by the intake passage and the amount of the fuel supplied to the engine;

calculating a target amount of the fresh air aspirated by the intake passage from the second target value;

determining a target control value of the adjusting mechanism based on the fresh air target amount and the target exhaust gas recirculation value;

controlling the adjusting mechanism based on the target control value; and controlling the fuel supply mechanism based on the second target value.

* * * * *